US011509629B2

United States Patent
Teo et al.

(10) Patent No.: US 11,509,629 B2
(45) Date of Patent: Nov. 22, 2022

(54) SECURING ACCESS TO NETWORK DEVICES UTILIZING TWO FACTOR AUTHENTICATION AND DYNAMICALLY GENERATED TEMPORARY FIREWALL RULES

(71) Applicant: CALYPTIX SECURITY CORPORATION, Charlotte, NC (US)

(72) Inventors: Lawrence Chin Shiun Teo, Huntersville, NC (US); Aaron K. Bieber, Pueblo West, CO (US); Nicholas C. Pelone, Charlotte, NC (US); Bryce Chidester, Tigard, OR (US); Benjamin A. Yarbrough, Charlotte, NC (US)

(73) Assignee: Calyptix Security Corporation, Charlotte, NC (US)

( * ) Notice: Subject to any disclaimer, the term of this patent is extended or adjusted under 35 U.S.C. 154(b) by 0 days.

(21) Appl. No.: 17/359,551

(22) Filed: Jun. 26, 2021

(65) Prior Publication Data

US 2022/0029962 A1    Jan. 27, 2022

Related U.S. Application Data

(60) Provisional application No. 63/044,559, filed on Jun. 26, 2020.

(51) Int. Cl.
*G06F 21/31*    (2013.01)
*G06F 21/43*    (2013.01)
(Continued)

(52) U.S. Cl.
CPC ...... *H04L 63/0263* (2013.01); *H04L 63/0236* (2013.01); *H04L 63/0838* (2013.01);
(Continued)

(58) Field of Classification Search
CPC ............ H04L 63/0263; H04L 63/0236; H04L 63/0838; H04L 63/166; H04L 67/025;
(Continued)

(56) References Cited

U.S. PATENT DOCUMENTS 8,065,725 B2    11/2011    Zheng et al.
9,313,196 B2 *   4/2016    Pritchard, Jr. ........ H04L 63/083
(Continued)

FOREIGN PATENT DOCUMENTS

WO    WO-2014173365 A1 *    10/2014    ........... H04L 1/1657

OTHER PUBLICATIONS

"International Search Report" and "Written Opinion of the International Search Authority" (ISA/US) in Calyptix Security Corporation, International Patent Application Serial No. PCT/US2021/039277, dated Nov. 5, 2021 (63 pages).

*Primary Examiner* — Joseph P Hirl
*Assistant Examiner* — Aayush Aryal
(74) *Attorney, Agent, or Firm* — Tillman Wright, PLLC; James D. Wright; David R. Higgins

(57) ABSTRACT

A network security system provides portals which enable automatic creation of a dynamic one-time port forwarding rule for an authorized user's current IP address following two factor authentication of the authorized user. Such a dynamic one-time port forwarding rule is utilized to set up a connection, at which point the dynamic one-time port forwarding rule is removed, preventing any attacker from subsequently taking advantage of it. Such a methodology is advantageous as compared to conventional port forwarding in that it is much more secure. Such a methodology is advantageous as compared to traditional port forwarding with access control both in that a user does not always have to utilize the same device with a static IP address, and in that
(Continued)

the port forwarding rule representing or exposing a potential vulnerability is deleted after a connection is established.

20 Claims, 66 Drawing Sheets

(51) Int. Cl.
*G06F 21/45* (2013.01)
*G06F 21/62* (2013.01)
*H04L 9/40* (2022.01)
*H04L 67/025* (2022.01)

(52) U.S. Cl.
CPC .......... *H04L 63/166* (2013.01); *H04L 67/025* (2013.01); *H04L 2463/082* (2013.01)

(58) Field of Classification Search
CPC .... H04L 2463/082; Y04S 40/20; G06F 21/31; G06F 21/43; G06F 21/45; G06F 21/6218
See application file for complete search history.

(56) References Cited

U.S. PATENT DOCUMENTS

| | | | |
|---|---|---|---|
| 10,547,600 B2 * | 1/2020 | Murthy | H04L 63/0236 |
| 2007/0094491 A1 * | 4/2007 | Teo | G06F 21/577 |
| | | | 713/153 |
| 2011/0219444 A1 * | 9/2011 | Turley | H04L 63/0263 |
| | | | 726/13 |
| 2018/0270066 A1 | 9/2018 | Doyon et al. | |
| 2019/0052630 A1 * | 2/2019 | Lapidous | H04L 63/0853 |
| 2019/0268307 A1 * | 8/2019 | Lancioni | H04L 63/0281 |

* cited by examiner

*Prior Art*

| IP Packet | | |
|---|---|---|
| IP Header | IP Payload | |
| | TCP Segment | |
| | TCP Header | TCP Payload |
| ...<br>Protocol<br>Source IP Address<br>Destination IP Address<br>... | Source Port<br>Destination Port<br>Sequence Number<br>Acknowledgment Num.<br>ACK<br>SYN<br>... | |

*FIG. 5A*

*Prior Art*

| Offsets | Octet | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|
| Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| | | IPv4 Header ||||||||||||||||||||||||||||||||
| 0 | 0 | Version |||| IHL |||| DSCP |||||| ECN || Total Length ||||||||||||||||
| 4 | 32 | Identification |||||||||||||||| Flags ||| Fragment Offset |||||||||||||
| 8 | 64 | Time to Live |||||||| Protocol |||||||| Header Checksum ||||||||||||||||
| 12 | 96 | Source IP Address ||||||||||||||||||||||||||||||||
| 16 | 128 | Destination IP Address ||||||||||||||||||||||||||||||||
| 20 | 160 | Options (If IHL > 5) ||||||||||||||||||||||||||||||||
| 24 | 192 | ||||||||||||||||||||||||||||||||
| 28 | 224 | ||||||||||||||||||||||||||||||||
| 32 | 256 | ||||||||||||||||||||||||||||||||

*FIG. 5B*

*Prior Art*

TCP Header

| Offsets | Octet | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|
| Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | 0 | Source Port ||||||||||||||| Destination Port |||||||||||||||||
| 4 | 32 | Sequence Number ||||||||||||||||||||||||||||||||
| 8 | 64 | Acknowledgment Number (If ACK set) ||||||||||||||||||||||||||||||||
| 12 | 96 | Data Offset |||| Reserved 0 0 0 ||| N S | C W R | E C E | U R G | A C K | P S H | R S T | S Y N | F I N | Window Size ||||||||||||||||
| 16 | 128 | Checksum |||||||||||||||| Urgent Pointer (If URG set) ||||||||||||||||
| 20 | ... | Options (If Data Offset > 5) ||||||||||||||||||||||||||||||||
| ... | | | | | | | | | | | | | | | | | | | | | | | | | | | | | | | | | |

*FIG. 5C*

*Prior Art*

| Offsets | Octet | | | | | | | | | 0 | | | | | | | | 1 | | | | | | | | 2 | | | | | | | | 3 | | | | |
|---|---|---|---|---|---|---|---|---|---|---|---|---|---|---|---|---|---|---|---|---|---|---|---|---|---|---|---|---|---|---|---|---|---|---|---|---|---|
| Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| | | UDP Header |||||||||||||||||||||||||||||||||
| 0 | 0 | Source Port |||||||||||||||| Destination Port ||||||||||||||||
| 4 | 32 | Length |||||||||||||||| Checksum ||||||||||||||||

*FIG. 5D*

*Prior Art*

| IP Packet | | |
|---|---|---|
| IP Header | IP Payload | |
| | TCP Segment | |
| | TCP Header | TCP Payload |
| ⋮<br>Protocol=6<br>srcIP=203.0.113.5<br>destIP=198.51.100.126<br>⋮ | srcPort=5089<br>destPort=5089<br>seqNum=271<br>ackNum=<br>ACK=0<br>SYN=1<br>⋮ | ⋮ |

*FIG. 6A*

User is prompted to set up second factor authentication.

Example.com
https://gatekeeper.example.com/gk/invite?token=abcdef123456

Gatekeeper

Gatekeeper Enrollment

Two-Factor Setup

Your administrator has enabled two-factor authentication. You'll need to set up an authenticator app.

1. Make sure you have your authenticator app.
2. Open your authenticator app and tap "+".
3. Scan your QR code or copy the secret to your clipboard.
4. Enter the six digit verification code labeled "Example" in your authenticator app.

Verification Code:

Submit

*FIG. 13*

| IP Packet | | | |
|---|---|---|---|
| IP Header | IP Payload | | |
| | TCP Segment | | |
| | TCP Header | TCP Payload | |
| ...<br>Protocol=6<br>srcIP=203.0.113.5<br>destIP=198.51.100.126<br>... | srcPort=4519<br>destPort=5089<br>seqNum=271<br>ackNum=<br>ACK=0<br>SYN=1<br>... | ... | |

User's laptop sends initial SYN packet to network security device to set up TCP connection.

*FIG. 23B*

| IP Packet | | | |
|---|---|---|---|
| IP Header | IP Payload | | |
| | | TCP Segment | |
| | | TCP Header | TCP Payload |
| ...<br>Protocol=6<br>srcIP=203.0.113.5<br>destIP=192.168.1.101<br>... | | srcPort=4519<br>destPort=3389<br>seqNum=271<br>ackNum=<br>ACK=0<br>SYN=1<br>... | ... |

Network security device modifies packet header to update destination IP based on one-time port forwarding rule.

*FIG. 23D*

| IP Packet | | |
|---|---|---|
| IP Header | IP Payload | |
| | TCP Segment | |
| | TCP Header | TCP Payload |
| ... <br> Protocol=6 <br> srcIP=192.168.1.101 <br> destIP=203.0.113.5 <br> ... | srcPort=3389 <br> destPort=4519 <br> seqNum=139 <br> ackNum=272 <br> ACK=1 <br> SYN=1 <br> ... | |

User's workstation responds to user's laptop with SYN-ACK packet to set up TCP connection.

*FIG. 23F*

| | IP Packet | | |
|---|---|---|---|
| IP Header | IP Payload | | |
| | | TCP Segment | |
| | TCP Header | TCP Payload | |

IP Header:
...
Protocol=6
srcIP=198.51.100.126
destIP=203.0.113.5
...

TCP Header:
srcPort=5089
destPort=4519
seqNum=139
ackNum=272
ACK=1
SYN=1
...

Network security device modifies packet header for outgoing SYN-ACK packet to update source IP to its own IP address.

*FIG. 23H*

| IP Packet | | |
|---|---|---|
| IP Header | IP Payload | |
| | TCP Segment | |
| | TCP Header | TCP Payload |
| ...<br>Protocol=6<br>srcIP=203.0.113.5<br>destIP=198.51.100.126<br>... | srcPort=4519<br>destPort=5089<br>seqNum=272<br>ackNum=140<br>ACK=1<br>SYN=0<br>... | |

User's laptop responds to received SYN-ACK packet with ACK packet to complete three step handshake and set up TCP connection.

*FIG. 23I*

| IP Packet | | | |
|---|---|---|---|
| IP Header | IP Payload | | |
| | TCP Segment | | |
| | TCP Header | TCP Payload | |
| ...<br>Protocol=6<br>srcIP=203.0.113.5<br>destIP=198.51.100.126<br>... | srcPort=4519<br>destPort=5089<br>seqNum=273<br>ackNum=142<br>ACK=1<br>SYN=0<br>... | ... | |

Subsequent packet is sent by user's laptop.

*FIG. 24A*

|  | IP Packet | | |
|---|---|---|---|
| IP Header | IP Payload | | |
|  | TCP Segment | | |
|  | TCP Header | TCP Payload | |
| ...<br>Protocol=6<br>srcIP=203.0.113.5<br>destIP=192.168.1.101<br>... | srcPort=4519<br>destPort=3389<br>seqNum=273<br>ackNum=142<br>ACK=1<br>SYN=0<br>... | ... | |

Network address translation applied by network security device to change destination IP and port in headers based on NAT mapping in state table.

*FIG. 24D*

Administrative user can view existing portals.

Example.com
← → C 🔒 Secure | https://gatekeeper.example.com:8000/gatekeeper-portals Jane Doe ▾　　Help　　（Logout）

Network Security Device

Gatekeeper

Gatekeeper Portals

| Network | Portal Name | AD Domain | Server | Port | End User URL | |
|---|---|---|---|---|---|---|
| Firewall | Example DC | example.local | dc.example.local | 636 | https://gatekeeper.example.com/gk/ | Edit<br>Manage Rules<br>Manage Users<br>Delete |
| IDS/IPS Settings<br>IDS/IPS Rulesets<br>IDS/IPS Rules | Example DC 2 | example.net | 10.0.0.5 | 389 | https://gatekeeper.example.com:3444/gk2/ | Edit<br>Manage Rules<br>Manage Users<br>Delete |
| Gatekeeper<br>Geo Fence<br>Static Whitelist<br>Static Blacklist<br>Dynamic Blacklist | (Add Portal) | | | | | |

Administrative user can view existing rules.

Example.com
← → C 🔒 Secure | https://gatekeeper.example.com:8000/gatekeeper-rules

Network Security Device                    Jane Doe ▾    Help    Logout

| Network | Gatekeeper |
|---|---|
| Firewall | < Back to Gatekeeper Portals |
| IDS/IPS Settings | Gatekeeper Rules |
| IDS/IPS Rulesets | Portal: Example DC ▾ |
| IDS/IPS Rules | |
| Gatekeeper | |
| Geo Fence | |
| Static Whitelist | |
| Static Blacklist | |
| Dynamic Blacklist | |

| Enabled? | Rule Name | Rule Type | Allowed Users | Hosts | |
|---|---|---|---|---|---|
| Yes | John | RDP | John Doe | 192.168.1.101:3389 | Edit Delete |
| Yes | All | SSH | All authenticated users in Example DC | 192.168.1.2:5088, 192.168.1.3:5088 | Edit Delete |

Add Portal

SECURING ACCESS TO NETWORK DEVICES UTILIZING TWO FACTOR AUTHENTICATION AND DYNAMICALLY GENERATED TEMPORARY FIREWALL RULES

CROSS-REFERENCE TO RELATED APPLICATION

The present application is a U.S. nonprovisional patent application of, and claims priority under 35 U.S.C. § 119(e) to, U.S. provisional patent application 63/044,559, filed Jun. 26, 2020, which provisional patent application is hereby incorporated herein by reference.

COPYRIGHT STATEMENT

Any new and original work of authorship in this document—including any source code—is subject to copyright protection under the copyright laws of the United States and other countries. Reproduction by anyone of this document as it appears in official governmental records is permitted, but otherwise all other copyright rights whatsoever are reserved.

BACKGROUND OF THE INVENTION

The invention generally relates to securing access to networked electronic devices.

Communication and computer networks are increasingly ubiquitous. For example, most computer and communication devices are connected to one or more networks providing access to the conventional Internet. As a more specific example, desktop and laptop computers at homes and offices are commonly connected via Wi-Fi or ethernet to a broadband network (e.g. a fiber optic broadband network, a digital subscriber line (DSL) broadband network, or a satellite broadband network) provided by an internet service provider (ISP), which in turn provides connectivity to the Internet. As another example, phones are commonly connected to a cellular network (e.g. a 3G, 4G, or 5G broadband cellular network) provided by a cellular provider which in turn provides connectivity to the Internet.

Data can be communicated over communication and computer networks utilizing various protocols. These protocols can be characterized as operating at different layers of a protocol stack. The open systems interconnection (OSI) model is a widely recognized model for characterizing communication protocol layers that defines seven distinct layers.

The first and lowest layer of the OSI model is the physical layer. The physical layer is responsible for transmitting and receiving raw bit streams over a physical medium. For example, the physical layer may convert digital bits into electrical, radio, or optical signals for transmission, and convert received electrical, radio, or optical signals into digital bits.

The second layer of the OSI model is the data link layer. The data link layer is responsible for providing for data transfer between two nodes directly connected by a link. It may detect and correct errors that occur at the physical layer. The data link layer is generally characterized as defining protocol data units in the form of frames which are to be communicated over a link. The data link layer is generally understood to pass frames for communication over a link to the physical layer, which is then responsible for transmitting the frames as part of a raw bit stream.

The third layer of the OSI model is the network layer. The network layer is responsible for defining how nodes in a network communicate data to other nodes in the network. The network layer is generally characterized as defining protocol data units in the form of packets for communication over a network. The network layer is generally understood to pass packets for communication over a network to the data link layer, which in turn encapsulates packet data in frames, and passes it on to the physical layer for transmission as part of a raw bit stream.

The fourth layer of the OSI model is the transport layer. The transport layer is generally characterized as defining protocol data units in the form of segments or datagrams for communication. The transport layer is generally responsible for dividing data for communication into smaller data parts which are then each encapsulated as a segment or datagram. The transport layer can provide for flow control and error control. The transport layer can keep track of segments that are communicated, provide for acknowledgment of received segments, and recommunicate segments for which no acknowledgment was received or delivery failed. The transport layer is generally understood to pass segments for communication to the network layer, which in turn encapsulates segment data in packets and passes it on to the data link layer, which then in turn encapsulates packet data in frames, and passes it on to the physical layer for transmission as part of a raw bit stream.

The fifth layer of the OSI model is the session layer. The session layer is generally characterized as establishing, managing, and terminating communication sessions between local and remote applications or services.

The sixth layer of the OSI model is the presentation layer. The presentation layer is generally characterized as translating data between different formats for application-layer entities.

The seventh and final layer of the OSI model is the application layer. The application layer is generally characterized as interfacing and interacting with software application entities that need to communicate or receive data.

While the OSI model is a widely recognized model, many communication protocols do not conform exactly to the OSI model, and data is frequently communicated using protocols that do not map cleanly to the OSI model.

Perhaps the best example of this is the Internet protocol suite, which is the most commonly used protocol suite for network communications. The Internet protocol suite makes heavy use of Internet Protocol (IP) (which can include both IPv4 and IPv6) and Transmission Control Protocol (TCP), and is accordingly sometimes referred to simply as the TCP/IP protocol suite. The Internet protocol suite also makes use of User Datagram Protocol (UDP). Under the OSI model, IP can generally be understood as a networking layer protocol, while TCP and UDP can generally be understood as transport layer protocols.

However, the Internet protocol suite does not map cleanly to the OSI model, and instead generally defines four or five abstraction layers. Classically, the Internet protocol suite is understood as defining an application layer, a transport layer, an internet layer, and a link layer. The internet layer is sometimes characterized as a network layer. The link layer is sometimes understood as being defined above a hardware or physical layer that is not part of the link layer, and is sometimes understood as including a hardware or physical layer. The link layer is sometimes subdivided into a data link layer and a physical layer.

A common layer characterization schema for the Internet protocol suite which will sometimes be used herein includes characterization of an application layer, a transport layer, a network layer, a data link layer, and a physical layer. In this regard, a message from an application at an application layer may be encapsulated inside of one or more segments at a transport layer, which segments are in turn encapsulated inside of one or more packets at an internet or network layer, which packets are then encapsulated inside of one or more frames at a data link layer, which frames are then transmitted as a raw bit stream at a physical layer.

For example, data is commonly communicated over the Internet utilizing TCP segments encapsulated inside of IP packets. As another example, data is also commonly communicated over the Internet utilizing a UDP protocol involving UDP segments or datagrams encapsulated inside of IP packets. In each case, IP packets are themselves encapsulated inside of frames (e.g. Ethernet frames) at the data link layer. Raw bit streams for such frames will be communicated over the physical networks making up a connection at the physical layer in accordance with communication protocols of the physical networks.

It will be appreciated that communication and computer networks allow a user to utilize an electronic device to access remote resources or services. For example, it is very common for a user to have a workstation and laptop which are both connected to the Internet, as illustrated in FIG. 1 (illustrating a user's laptop 20 and workstation 30). Various software applications exist which allow a user to access a remote workstation via the Internet, as illustrated in FIG. 2.

However, with this increasing ubiquity of networked electronic devices has come increasing prevalence of electronic attacks by bad actors. For example, returning to the simplistic system of FIG. 1, an attacker can easily gain access to the exposed remote workstation via the Internet, as illustrated in FIG. 3 with respect to attacker 50.

To avoid exposing networked devices to the Internet, an internal network is sometimes utilized, with a network device such as a router routing communications between a wide area network (WAN) such as the Internet and a smaller local area network (LAN). Devices on the internal network may be assigned an IP address that is used for the internal network, while a router may have an external IP address that can be used by devices on the Internet to communicate with the router or devices on the internal network. Network address translation (NAT) can be utilized for packets communicated from a device on an internal network to translate a source IP address for the internal network to a source IP address for a wide area network such as the Internet, e.g. by a network device such as a router that the IP packet is routed through. Similarly, network address translation can be utilized for packets intended to be communicated to a device on an internal network to translate a destination IP address for a wide area network such as the Internet to a destination IP address for the internal network, e.g. by a network device such as a router that the IP packet is routed through.

FIG. 4A illustrates an exemplary system in which a network security device 10 functions as a router and firewall for an internal network including the user's workstation 30 and a domain controller 40. The network security device 10 can be used to set up a traditional port forwarding rule which forwards network traffic (e.g. network packets) addressed to the Internet Protocol (IP) address of the network security device and a specific port to a specified IP and port (e.g. an internal network IP associated with the user's workstation 30), as illustrated in FIG. 4B. Specifically, FIG. 4B illustrates a port forwarding rule specifying that received packets for port 5089 are to be forwarded to the same port at IP address 192.168.1.101 (which corresponds to the user's workstation 30). This port forwarding rule is generally stored in a port forwarding rule table, as illustrated in FIG. 4B, or it could be stored in a more general firewall rule table.

FIG. 5A figuratively illustrates a schema of an exemplary IP packet communicated over the network path illustrated in FIG. 2. The IP packet includes an IP packet header, and an IP packet payload. The IP packet payload in turn contains a TCP segment which includes a TCP header and a TCP payload. The TCP payload contains application data (which may be encapsulated with one or more other headers, such as an application header).

FIG. 5B illustrates a conventional schema of an IPv4 header, and FIG. 5C illustrates a conventional schema of a TCP header. FIG. 5D illustrates a conventional schema of a UDP header.

As a more specific example, FIG. 6A illustrates an IP packet that is communicated over the network path illustrated in FIG. 6B. The IP header of the IP packet indicates the source and destination IP addresses for the packet, which are the IP addresses for the user's laptop 20 and the network security device 10, respectively. As illustrated, the IP packet contains a TCP segment including a TCP header that identifies a source port, destination port, SYN flag (indicating whether the packet is establishing a new connection) and sequence number of the TCP segment. If the SYN flag is set, it indicates that the packet is establishing a new connection, and that the sequence number is the first sequence number of the connection. The initial sequence number is generally randomly chosen, but subsequent packets will have sequential sequence numbers for acknowledgment purposes. Network communications utilizing a TCP/IP protocol commonly involve use of a positive or negative acknowledgment.

When the packet is received at the network security device 10, the network security device determines that the packet matches a port forwarding rule in its port forwarding rule table and based on that rule forwards the packet to the destination IP address and port specified in the rule, as illustrated in FIG. 6C. Specifically, the network security device 10 forwards the received packet addressed to 198.51.100.126 port 5089 to 192.168.1.101 port 5089, which corresponds to the user's workstation 30, as illustrated in FIG. 6C.

Notably, such conventional use of traditional port forwarding allows an attacker to utilize a defined port forwarding rule such as this to carry out attacks, as illustrated in FIG. 7A with respect to attacker 50. Once the attacker gets in, the attacker may then works towards compromising other systems in the internal network such as the domain controller 40, as illustrated in FIG. 7B. This can be characterized as lateral movement.

One approach which is sometimes used to try to address this vulnerability, is to set up port forwarding with access control such that traffic is only forwarded from a specifically defined source IP address. FIG. 8 illustrates the presence in a port forwarding rule table of such a rule which only forwards packets having a source IP address of 161.32.41.5.

While this makes it more difficult for an attacker at another IP address to take advantage of an open port, this requires a user to consistently have the same IP address. For example, the user's laptop will need to consistently have the same IP address, or have multiple rules defined for multiple consistent IP addresses. However, many Internet Service Providers (ISPs) do not typically provide a static IP address to their customers, and some ISPs may not be willing or able to do so even upon request.

Another conventional way to secure access to devices on an internal network would be to require use of a virtual private network (VPN) client. FIG. 9 illustrates an exemplary system in which VPN software is utilized to enable selective access to an internal network. However, this not only requires a remote user to learn and utilize VPN software, but also can negatively impact application performance. Additionally, for some devices it is prohibitively difficult to configure a VPN for such device. Accordingly, some users would prefer to avoid use of VPN software. Further, there are many devices which may not be able to easily utilize VPN software, such as IP telephones, mobile barcode scanners, self-service kiosks, and industrial control system consoles. The existence of such devices unable to utilize VPN software has sometimes resulted in users exposing user or system interfaces for the devices to unauthorized users (both inside of a local area network and over a wide area network such as the Internet), and such software is commonly subject to software vulnerabilities and inadequate software patching and maintenance practices.

A need exists for improvement in securing access to networked electronic devices. This, and other needs, are addressed by one or more aspects of the invention.

SUMMARY OF THE INVENTION

The invention includes many aspects and features. Moreover, while many aspects and features relate to, and are described in, a particular context, the invention is not limited to use only in this context, as will become apparent from the following summaries and detailed descriptions of aspects, features, and one or more embodiments of the invention.

Accordingly, a first aspect relates to a method providing a technical solution to the technical problem of providing authenticated remote access to an electronic device on an internal network in a manner which obviates the ability of attackers to gain access via an exposed port. The method includes effecting display, to a user who has utilized a web browser loaded on a first device remote from the internal network to navigate to a uniform resource locator corresponding to a network security system portal implemented at a network security system device providing selective access to the internal network, of a login page prompting the user to input first authentication credentials to authenticate, the first authentication credentials comprising a user name and password; receiving, at the network security device, data corresponding to input by the user at the first device representing an attempt to provide the first authentication credentials; authenticating, based on communication with a domain controller of the internal network, that the input by the user at the first device representing an attempt to provide the first authentication credentials matches valid authentication credentials; effecting display, to the user in the web browser loaded on the first device, of a second factor authentication interface prompting the user to input a second factor authentication verification code; receiving, at the network security device, data corresponding to input by the user at the first device representing an attempt to provide the second factor authentication verification code; authenticating the user to the network security system portal based on the received data corresponding to input representing an attempt to provide the second factor authentication verification code by validating that such input is the correct second factor authentication verification code, the second factor authentication verification code having been generated at a mobile device of the user based on a stored second factor authentication secret; after authenticating the user, determining one or more network security system rules for the network security system portal for which the user is an allowed user, determining one or more available hosts associated with the determined one or more security system rules, effecting display, to the user in the web browser loaded on the first device, of an interface of the network security system portal providing a list of devices available to be connected to, each listed device corresponding to one of the determined one or more available hosts, receiving, at the network security device, data corresponding to input by the user at the first device representing a selection of a particular listed available device; based on user selection of the available device, automatically creating a one-time port forwarding rule to set up a transmission control protocol (TCP) connection between the first device and the selected particular device, the one time port forwarding rule being defined to forward packets received at the network security device at a particular port determined based on the respective rule for the available host representing the selected particular device, and the one time port forwarding rule being defined to forward such packets to the IP address and port specified in the respective rule for the available host representing the selected particular device; receiving, at the network security device, an initial SYN packet sent by the first device to the network security device at the particular port to set up the TCP connection between the first device and the particular device; based on the one-time port forwarding rule, updating one or more destination fields of the received SYN packet to be the IP address and port specified in the respective rule for the available host representing the selected particular device, and forwarding the received SYN packet to the particular device; adding, by the network security device to a state table, connection information for the received SYN packet, the connection information including an indication that the connection has not yet been established; receiving, at the network security device, a response SYN-ACK packet sent by the particular device representing a second step of a three-step handshake to set up the TCP connection between the first device and the particular device; updating one or more source fields of the SYN-ACK packet to specify the IP address of the network security device as the source IP address and the particular port as the source port, and forwarding the SYN-ACK packet to the first device; receiving, at the network security device, a response ACK packet sent by the first device representing a third step of a three-step handshake completing set up of the TCP connection between the first device and the particular device; updating one or more destination fields of the received ACK packet to be the IP address and port specified in the respective rule for the available host representing the selected particular device, and forwarding the received ACK packet to the particular device; updating, by the network security device, connection information in its state table for the TCP connection by replacing the indication that the connection has not yet been established with an indication that the TCP connection is established; based on determining that the TCP connection has been established, automatically deleting the one-time port forwarding rule; and thereafter, upon receiving a subsequent packet at the network security device addressed to the particular port from the first device, determining that the subsequent packet belongs to the TCP connection for which connection information exists in the state table, and based thereon updating one or more destination fields of the received subsequent packet to be the IP address and port specified for the connection in the state table, and forwarding the received subsequent packet to the particular device; whereby, automatic creation of a dynamic one-time port forwarding rule for an authorized user's current IP address following two factor authentication of the authorized user is provided which enables authenticated remote access to an electronic device on an internal network in a manner which obviates the ability of attackers to gain access via an exposed port.

In a feature of this aspect, the second factor authentication verification code was generated at a mobile device of the user utilizing an algorithm of a second factor authentication app, the algorithm continually generating second factor authentication verification codes based on a current time and the second factor authentication secret.

In a feature of this aspect, the stored second factor authentication secret is based on a previously captured second factor authentication secret captured at the mobile device of the user.

In a feature of this aspect, the stored second factor authentication secret is based on a previously captured QR code captured at the mobile device of the user utilizing a camera of the mobile device, the QR code having been displayed on the first device after being received from the network security device.

In a feature of this aspect, the stored second factor authentication secret is based on a previously input text code representing a second factor authentication secret captured at the mobile device, the text code having been displayed on the first device after being received from the network security device.

In a feature of this aspect, the stored second factor authentication secret was received at the mobile device from a second factor authentication server as a part of communications initiated by scanning a QR code displayed on the first device after being received from the network security device.

In a feature of this aspect, authenticating the user to the network security system portal based on the received data corresponding to input representing an attempt to provide the second factor authentication verification code by validating that such input is the correct second factor authentication verification code comprises communicating, by the network security device, with a second factor authentication server.

In a feature of this aspect, the method comprises communicating a remote desktop protocol (RDP) file to the first device for establishing an RDP connection between the first device and the particular device.

In a feature of this aspect, the first authentication credentials represent Active Directory credentials.

In a feature of this aspect, authenticating, based on communication with a domain controller of the internal network, that the input by the user at the first device representing an attempt to provide the first authentication credentials matches valid authentication credentials comprises communicating data representing the input by the user from the network security device to the domain controller and receiving back at the network security device from the domain controller an indication of authentication.

In a feature of this aspect, automatically creating a one-time port forwarding rule to set up a transmission control protocol (TCP) connection between the first device and the selected particular device comprises automatically creating a plurality of port forwarding rules to set up one or more transmission control protocol (TCP) connections between the first device and the selected particular device.

In a feature of this aspect, the particular device comprises a camera.

In a feature of this aspect, the particular device comprises a digital video recorder.

In a feature of this aspect, the particular device comprises an irrigation controller.

In a feature of this aspect, the particular device comprises a Sharepoint server.

In a feature of this aspect, the particular device comprises a work portal.

In a feature of this aspect, the particular device comprises a water system.

In a feature of this aspect, the particular device comprises a solar panel energy device.

In a feature of this aspect, the particular device comprises a supervisory control and data acquisition system device.

In a feature of this aspect, the particular device comprises a web server.

In a feature of this aspect, the particular device comprises a file server.

In a feature of this aspect, the particular device comprises an HVAC control system.

In a feature of this aspect, the particular device comprises a database server with sensitive data.

Another aspect relates to a method providing a technical solution to the technical problem of providing authenticated remote access to an electronic device on an internal network in a manner which obviates the ability of attackers to gain access via an exposed port. The method includes effecting display, to a user who has utilized a web browser loaded on a first device remote from the internal network to navigate to a uniform resource locator corresponding to a network security system portal implemented at a network security system device providing selective access to the internal network, of a login page prompting the user to input first authentication credentials to authenticate, the first authentication credentials comprising a user name and password; receiving, at the network security device, data corresponding to input by the user at the first device representing an attempt to provide the first authentication credentials; authenticating, based on communication with a domain controller of the internal network, that the input by the user at the first device representing an attempt to provide the first authentication credentials matches valid authentication credentials; effecting display, to the user in the web browser loaded on the first device, of a second factor authentication interface prompting the user to input a second factor authentication verification code; receiving, at the network security device, data corresponding to input by the user at the first device representing an attempt to provide the second factor authentication verification code; authenticating the user to the network security system portal based on the received data corresponding to input representing an attempt to provide the second factor authentication verification code by validating that such input is the correct second factor authentication verification code, the second factor authentication verification code having been generated at a mobile device of the user based on a stored second factor authentication secret; after authenticating the user, determining one or more network security system rules for the network security system portal for which the user is an allowed user, determining one or more available hosts associated with the determined one or more security system rules, effecting display, to the user in the web browser loaded on the first device, of an interface of the network security system portal providing a list of devices available to be connected to, each listed device corresponding to one of the determined one or more available hosts, receiving, at the network security device, data corresponding to input by the user at the first device representing a selection of a particular listed available device; based on user selection of the available device, automatically creating a one-time port forwarding rule to set up a connection between the first device and the selected particular device, the one-time port forwarding rule being defined to forward packets received at the network security device at a particular port determined based on the respective rule for the available host representing the selected particular device, and the one time port forwarding rule being defined to forward such packets to the IP address and port specified in the respective rule for the available host representing the selected particular device; receiving, at the network security device, an initial packet sent by the first device to the network security device at the particular port to set up the connection between the first device and the particular device; based on the one-time port forwarding rule, updating one or more destination fields of the received initial packet to be the IP address and port specified in the respective rule for the available host representing the selected particular device, and forwarding the received initial packet to the particular device; adding, by the network security device to a state table, connection information for the received initial packet, the connection information including an indication that the connection has been established; based on determining that the connection has been established, automatically deleting the one-time port forwarding rule; and thereafter, upon receiving a subsequent packet at the network security device addressed to the particular port from the first device, determining that the subsequent packet belongs to the connection for which connection information exists in the state table, and based thereon updating one or more destination fields of the received subsequent packet to be the IP address and port specified for the connection in the state table, and forwarding the received subsequent packet to the particular device; whereby, automatic creation of a dynamic one-time port forwarding rule for an authorized user's current IP address following two factor authentication of the authorized user is provided which enables authenticated remote access to an electronic device on an internal network in a manner which obviates the ability of attackers to gain access via an exposed port.

Another aspect relates to a method providing a technical solution to the technical problem of providing authenticated remote access to a remote electronic device in a manner which obviates the ability of attackers to gain access. The method includes effecting display, to a user who has utilized a web browser loaded on a first device remote from the internal network to navigate to a uniform resource locator corresponding to a network security system portal implemented at a network security system device providing selective access to one or more remote electronic resources, of a login page prompting the user to input first authentication credentials to authenticate, the first authentication credentials comprising a user name and password; receiving, at the network security device, data corresponding to input by the user at the first device representing an attempt to provide the first authentication credentials; authenticating, based on communication with a domain controller of the internal network, that the input by the user at the first device representing an attempt to provide the first authentication credentials matches valid authentication credentials; effecting display, to the user in the web browser loaded on the first device, of a second factor authentication interface prompting the user to input a second factor authentication verification code; receiving, at the network security device, data corresponding to input by the user at the first device representing an attempt to provide the second factor authentication verification code; authenticating the user to the network security system portal based on the received data corresponding to input representing an attempt to provide the second factor authentication verification code by validating that such input is the correct second factor authentication verification code, the second factor authentication verification code having been generated at a mobile device of the user based on a stored second factor authentication secret; after authenticating the user, determining one or more network security system rules for the network security system portal for which the user is an allowed user, determining one or more available hosts associated with the determined one or more security system rules, effecting display, to the user in the web browser loaded on the first device, of an interface of the network security system portal providing a list of devices available to be connected to, each listed device corresponding to one of the determined one or more available hosts, receiving, at the network security device, data corresponding to input by the user at the first device representing a selection of a particular listed available device; based on user selection of the available device, automatically creating a one-time firewall rule to set up a transmission control protocol (TCP) connection between the first device and the selected particular device, the one-time firewall rule being defined to allow packets received at the network security device addressed to the selected particular device at a particular port determined based on the respective rule for the available host representing the selected particular device; receiving, at the network security device, an initial SYN packet sent by the first device addressed to the particular device at the particular port to set up the TCP connection between the first device and the particular device; based on the one-time port firewall rule, allowing the received SYN packet to pass through on its way to the particular device; adding, by the network security device to a state table, connection information for the received SYN packet, the connection information including an indication that the connection has not yet been established; receiving, at the network security device, a response SYN-ACK packet sent by the particular device representing a second step of a three-step handshake to set up the TCP connection between the first device and the particular device; allowing the received SYN-ACK packet to pass through on its way to the first device; receiving, at the network security device, a response ACK packet sent by the first device representing a third step of a three-step handshake completing set up of the TCP connection between the first device and the particular device; allowing the received ACK packet to pass through on its way to the particular device; updating, by the network security device, connection information in its state table for the TCP connection by replacing the indication that the connection has not yet been established with an indication that the TCP connection is established; based on determining that the TCP connection has been established, automatically deleting the one-time port forwarding rule; and thereafter, upon receiving a subsequent packet at the network security device addressed to the particular device at the particular port from the first device, determining that the subsequent packet belongs to the TCP connection for which connection information exists in the state table, and based thereon allowing the received subsequent packet to pass through on its way to the particular device; whereby, automatic creation of a dynamic one-time firewall rule for an authorized user's current IP address following two factor authentication of the authorized user is provided which enables authenticated remote access to a remote electronic device in a manner which obviates the ability of attackers to gain access via an exposed port.

In a feature of this aspect, the method involves use of IPv6 addresses.

In a feature of this aspect, the method involves use of IPv4 addresses.

Another aspect relates to a method providing a technical solution to the technical problem of providing authenticated remote access to a remote electronic device in a manner which obviates the ability of attackers to gain access. The method includes effecting display, to a user who has utilized a web browser loaded on a first device remote from the internal network to navigate to a uniform resource locator corresponding to a network security system portal implemented at a network security system device providing selective access to one or more remote electronic resources, of a login page prompting the user to input first authentication credentials to authenticate, the first authentication credentials comprising a user name and password; receiving, at the network security device, data corresponding to input by the user at the first device representing an attempt to provide the first authentication credentials; authenticating, based on communication with a domain controller of the internal network, that the input by the user at the first device representing an attempt to provide the first authentication credentials matches valid authentication credentials; effecting display, to the user in the web browser loaded on the first device, of a second factor authentication interface prompting the user to input a second factor authentication verification code; receiving, at the network security device, data corresponding to input by the user at the first device representing an attempt to provide the second factor authentication verification code; authenticating the user to the network security system portal based on the received data corresponding to input representing an attempt to provide the second factor authentication verification code by validating that such input is the correct second factor authentication verification code, the second factor authentication verification code having been generated at a mobile device of the user based on a stored second factor authentication secret; after authenticating the user, determining one or more network security system rules for the network security system portal for which the user is an allowed user, determining one or more available hosts associated with the determined one or more security system rules, effecting display, to the user in the web browser loaded on the first device, of an interface of the network security system portal providing a list of devices available to be connected to, each listed device corresponding to one of the determined one or more available hosts, receiving, at the network security device, data corresponding to input by the user at the first device representing a selection of a particular listed available device; based on user selection of the available device, automatically creating a one-time firewall rule to set up a connection between the first device and the selected particular device, the one-time firewall rule being defined to allow packets received at the network security device addressed to the selected particular device at a particular port determined based on the respective rule for the available host representing the selected particular device; receiving, at the network security device, an initial packet sent by the first device to the particular device at the particular port to set up the connection between the first device and the particular device; based on the one-time port firewall rule, allowing the received initial packet to pass through on its way to the particular device; adding, by the network security device to a state table, connection information for the received initial packet, the connection information including an indication that the connection has been established; based on determining that the connection has been established, automatically deleting the one-time port forwarding rule; and thereafter, upon receiving a subsequent packet at the network security device addressed to the particular device at the particular port from the first device, determining that the subsequent packet belongs to the connection for which connection information exists in the state table, and based thereon allowing the received subsequent packet to pass through on its way to the particular device; whereby, automatic creation of a dynamic one-time firewall rule for an authorized user's current IP address following two factor authentication of the authorized user is provided which enables authenticated remote access to a remote electronic device in a manner which obviates the ability of attackers to gain access via an exposed port.

Another aspect relates to a method providing a technical solution to the technical problem of providing authenticated remote access to a remote electronic device in a manner which obviates the ability of attackers to gain access. The method includes effecting display, to a user who has utilized a web browser loaded on a first device remote from the internal network to navigate to a uniform resource locator corresponding to a network security system portal implemented at a network security system device providing selective access to one or more remote electronic resources, of a login page prompting the user to input first authentication credentials to authenticate, the first authentication credentials comprising a user name and password; receiving, at the network security device, data corresponding to input by the user at the first device representing an attempt to provide the first authentication credentials; authenticating, based on communication with a domain controller of the internal network, that the input by the user at the first device representing an attempt to provide the first authentication credentials matches valid authentication credentials; effecting display, to the user in the web browser loaded on the first device, of a second factor authentication interface prompting the user to input a second factor authentication verification code; receiving, at the network security device, data corresponding to input by the user at the first device representing an attempt to provide the second factor authentication verification code; authenticating the user to the network security system portal based on the received data corresponding to input representing an attempt to provide the second factor authentication verification code by validating that such input is the correct second factor authentication verification code, the second factor authentication verification code having been generated at a mobile device of the user based on a stored second factor authentication secret; after authenticating the user, determining one or more network security system rules for the network security system portal for which the user is an allowed user, determining one or more available hosts associated with the determined one or more security system rules, effecting display, to the user in the web browser loaded on the first device, of an interface of the network security system portal providing a list of devices available to be connected to, each listed device corresponding to one of the determined one or more available hosts, receiving, at the network security device, data corresponding to input by the user at the first device representing a selection of a particular listed available device; based on user selection of the available device, automatically creating a plurality of one-time firewall rules to set up a transmission control protocol (TCP) connection between the first device and the selected particular device, each one-time firewall rule being defined to allow packets received at the network security device addressed to the selected particular device at a particular port determined based on the respective rule for the available host representing the selected particular device; receiving, at the network security device, an initial SYN packet sent by the first device addressed to the particular device at the particular port to set up the TCP connection between the first device and the particular device; based on a first one of the plurality of one-time port firewall rules, allowing the received SYN packet to pass through on its way to the particular device; adding, by the network security device to a state table, connection information for the received SYN packet, the connection information including an indication that the connection has not yet been established; receiving, at the network security device, a response SYN-ACK packet sent by the particular device representing a second step of a three-step handshake to set up the TCP connection between the first device and the particular device; allowing the received SYN-ACK packet to pass through on its way to the first device; receiving, at the network security device, a response ACK packet sent by the first device representing a third step of a three-step handshake completing set up of the TCP connection between the first device and the particular device; allowing the received ACK packet to pass through on its way to the particular device; updating, by the network security device, connection information in its state table for the TCP connection by replacing the indication that the connection has not yet been established with an indication that the TCP connection is established; based on determining that the TCP connection has been established, automatically deleting the first one of the plurality of one-time port forwarding rules; and thereafter, upon receiving a subsequent packet at the network security device addressed to the particular device at the particular port from the first device, determining that the subsequent packet belongs to the TCP connection for which connection information exists in the state table, and based thereon allowing the received subsequent packet to pass through on its way to the particular device; whereby, automatic creation of a plurality of dynamic one-time firewall rules for an authorized user's current IP address following two factor authentication of the authorized user is provided which enables authenticated remote access to a remote electronic device in a manner which obviates the ability of attackers to gain access via an exposed port.

In a feature of this aspect, each firewall rule of the created plurality of firewall rules is identical to each other firewall rule of the created plurality of firewall rules.

In a feature of this aspect, each firewall rule of the created plurality of firewall rules is automatically deleted after a defined timeout interval elapses if it has not already been automatically deleted.

Another aspect relates to a method providing a technical solution to the technical problem of providing authenticated remote access to a remote electronic device in a manner which obviates the ability of attackers to gain access via an exposed port. The method includes receiving, at the network security device, data corresponding to input by the user at a first device representing an attempt to provide first authentication credentials; authenticating that the input by the user at the first device representing an attempt to provide the first authentication credentials matches valid authentication credentials; effecting, by the network security device, prompting of the user to input a second factor authentication verification code; receiving, at the network security device, data corresponding to input by the user at the first device representing an attempt to provide the second factor authentication verification code; authenticating the user for a network security system portal based on the received data corresponding to input representing an attempt to provide the second factor authentication verification code by validating that such input is the correct second factor authentication verification code; after authenticating the user, determining one or more network security system rules for the network security system portal for which the user is an allowed user, determining one or more available hosts associated with the determined one or more security system rules, effecting display, to the user at the first device, of an interface of the network security system portal providing a list of devices available to be connected to, each listed device corresponding to one of the determined one or more available hosts, receiving, at the network security device, data corresponding to input by the user at the first device representing a selection of a particular listed available device; based on user selection of the available device, automatically creating a one-time port forwarding rule to set up a connection between the first device and the selected particular device, the one-time port forwarding rule being defined to forward packets received at the network security device at a particular port determined based on the respective rule for the available host representing the selected particular device, and the one time port forwarding rule being defined to forward such packets to the IP address and port specified in the respective rule for the available host representing the selected particular device; receiving, at the network security device, one or more initialization packets sent by the first device to the particular device at the particular port to set up the connection between the first device and the particular device; based on the one-time port forwarding rule, allowing the received one or more initialization packets to pass through on their way to the particular device; adding, by the network security device to a state table, connection information for the connection based on one or more of the one or more received initialization packets, the connection information including an indication that the connection has been established; based on determining that the connection has been established, automatically deleting the one-time port forwarding rule; and thereafter, upon receiving a subsequent packet at the network security device addressed to the particular port from the first device, determining that the subsequent packet belongs to the connection for which connection information exists in the state table, and based thereon updating one or more destination fields of the received subsequent packet to be the IP address and port specified for the connection in the state table, and forwarding the received subsequent packet to the particular device; whereby, automatic creation of a dynamic one-time port forwarding rule for an authorized user's current IP address following two factor authentication of the authorized user is provided which enables authenticated remote access to an electronic device in a manner which obviates the ability of attackers to gain access via an exposed port.

Another aspect relates to a method providing a technical solution to the technical problem of providing authenticated remote access to a remote electronic device in a manner which obviates the ability of attackers to gain access via an exposed port. The method includes receiving, at the network security device, data corresponding to input by the user at a first device representing an attempt to provide first authentication credentials; authenticating that the input by the user at the first device representing an attempt to provide the first authentication credentials matches valid authentication credentials; effecting, by the network security device, prompting of the user to input a second factor authentication verification code; receiving, at the network security device, data corresponding to input by the user at the first device representing an attempt to provide the second factor authentication verification code; authenticating the user for a network security system portal based on the received data corresponding to input representing an attempt to provide the second factor authentication verification code by validating that such input is the correct second factor authentication verification code; after authenticating the user, determining one or more network security system rules for the network security system portal for which the user is an allowed user, determining one or more available hosts associated with the determined one or more security system rules, effecting display, to the user at the first device, of an interface of the network security system portal providing a list of devices available to be connected to, each listed device corresponding to one of the determined one or more available hosts, receiving, at the network security device, data corresponding to input by the user at the first device representing a selection of a particular listed available device; based on user selection of the available device, automatically creating a one-time firewall rule to set up a connection between the first device and the selected particular device, the one-time firewall rule being defined to allow packets received at the network security device addressed to an address of the particular device at a particular port determined based on the respective rule for the available host representing the selected particular device; receiving, at the network security device, one or more initialization packets sent by the first device to the particular device at the particular port to set up the connection between the first device and the particular device; based on the one-time firewall rule, allowing the received one or more initialization packets to pass through on their way to the particular device; adding, by the network security device to a state table, connection information for the connection based on one or more of the one or more received initialization packets, the connection information including an indication that the connection has been established; based on determining that the connection has been established, automatically deleting the one-time port firewall rule; and thereafter, upon receiving a subsequent packet at the network security device addressed to the particular device at the particular port from the first device, determining that the subsequent packet belongs to the connection for which connection information exists in the state table, and based thereon allowing the received packet to pass through on its way to the particular device; whereby, automatic creation of a dynamic one-time firewall rule for an authorized user's current IP address following two factor authentication of the authorized user is provided which enables authenticated remote access to an electronic device in a manner which obviates the ability of attackers to gain access via an exposed port.

Another aspect relates to a method providing a technical solution to the technical problem of providing authenticated remote access to a remote electronic device in a manner which obviates the ability of attackers to gain access via an exposed port. The method includes receiving, at the network security device, data corresponding to input by the user at a first device representing an attempt to provide first authentication credentials; authenticating that the input by the user at the first device representing an attempt to provide the first authentication credentials matches valid authentication credentials; effecting, by the network security device, prompting of the user to input a second factor authentication verification code; receiving, at the network security device, data corresponding to input by the user at the first device representing an attempt to provide the second factor authentication verification code; authenticating the user for a network security system portal based on the received data corresponding to input representing an attempt to provide the second factor authentication verification code by validating that such input is the correct second factor authentication verification code; after authenticating the user, determining one or more network security system rules for the network security system portal for which the user is an allowed user, determining one or more available hosts associated with the determined one or more security system rules, effecting display, to the user at the first device, of an interface of the network security system portal providing a list of devices available to be connected to, each listed device corresponding to one of the determined one or more available hosts, receiving, at the network security device, data corresponding to input by the user at the first device representing a selection of a particular listed available device; based on user selection of the available device, automatically creating a temporary port forwarding rule to set up a connection between the first device and the selected particular device, the temporary port forwarding rule being defined to forward packets received at the network security device at a particular port determined based on the respective rule for the available host representing the selected particular device, and the temporary port forwarding rule being defined to forward such packets to the IP address and port specified in the respective rule for the available host representing the selected particular device; receiving, at the network security device, one or more initialization packets sent by the first device to the particular device at the particular port to set up the connection between the first device and the particular device; based on the one-time port forwarding rule, allowing the received one or more initialization packets to pass through on their way to the particular device; adding, by the network security device to a state table, connection information for the connection based on one or more of the one or more received initialization packets, the connection information including an indication that the connection has been established; based on determining that a timeout interval for the temporary port forwarding rule has elapsed, automatically deleting the one-time port forwarding rule; and thereafter, upon receiving a subsequent packet at the network security device addressed to the particular port from the first device, determining that the subsequent packet belongs to the connection for which connection information exists in the state table, and based thereon updating one or more destination fields of the received subsequent packet to be the IP address and port specified for the connection in the state table, and forwarding the received subsequent packet to the particular device; whereby, automatic creation of a dynamic one-time port forwarding rule for an authorized user's current IP address following two factor authentication of the authorized user is provided which enables authenticated remote access to an electronic device in a manner which obviates the ability of attackers to gain access via an exposed port.

Another aspect relates to a method providing a technical solution to the technical problem of providing authenticated remote access to an electronic device on an internal network in a manner which obviates the ability of attackers to gain access via an exposed port. The method includes effecting display, to a user who has utilized a web browser loaded on a first device remote from the internal network to navigate to a uniform resource locator corresponding to a network security system portal implemented at a network security system device providing selective access to the internal network, of a login page prompting the user to input first authentication credentials to authenticate, the first authentication credentials comprising a user name and password; receiving, at the network security device, data corresponding to input by the user at the first device representing an attempt to provide the first authentication credentials; authenticating, based on communication with a domain controller of the internal network, that the input by the user at the first device representing an attempt to provide the first authentication credentials matches valid authentication credentials; effecting display, to the user in the web browser loaded on the first device, of a second factor authentication interface prompting the user to input a second factor authentication verification code; receiving, at the network security device, data corresponding to input by the user at the first device representing an attempt to provide the second factor authentication verification code; authenticating the user to the network security system portal based on the received data corresponding to input representing an attempt to provide the second factor authentication verification code by validating that such input is the correct second factor authentication verification code, the second factor authentication verification code having been generated at a mobile device of the user based on a stored second factor authentication secret; after authenticating the user, determining one or more network security system rules for the network security system portal for which the user is an allowed user, determining one or more available hosts associated with the determined one or more security system rules, effecting display, to the user in the web browser loaded on the first device, of an interface of the network security system portal providing a list of devices available to be connected to, each listed device corresponding to one of the determined one or more available hosts, receiving, at the network security device, data corresponding to input by the user at the first device representing a selection of a particular listed available device; based on user selection of the available device, automatically creating a one-time port forwarding rule to set up a user datagram protocol (UDP) connection between the first device and the selected particular device, the one time port forwarding rule being defined to forward packets received at the network security device at a particular port determined based on the respective rule for the available host representing the selected particular device, and the one time port forwarding rule being defined to forward such packets to the IP address and port specified in the respective rule for the available host representing the selected particular device; receiving, at the network security device, an initial packet sent by the first device to the network security device at the particular port to set up the UDP connection between the first device and the particular device; based on the one-time port forwarding rule, updating one or more destination fields of the received initial packet to be the IP address and port specified in the respective rule for the available host representing the selected particular device, and forwarding the received initial packet to the particular device; adding, by the network security device to a state table, connection information for the received initial packet, the connection information including an indication that the connection has been established; based on determining that the UDP connection has been established, automatically deleting the one-time port forwarding rule; and thereafter, upon receiving a subsequent packet at the network security device addressed to the particular port from the first device, determining that the subsequent packet belongs to the UDP connection for which connection information exists in the state table, and based thereon updating one or more destination fields of the received subsequent packet to be the IP address and port specified for the connection in the state table, and forwarding the received subsequent packet to the particular device; whereby, automatic creation of a dynamic one-time port forwarding rule for an authorized user's current IP address following two factor authentication of the authorized user is provided which enables authenticated remote access to an electronic device on an internal network in a manner which obviates the ability of attackers to gain access via an exposed port.

A method providing a technical solution to the technical problem of providing authenticated remote access to an electronic device on an internal network in a manner which obviates the ability of attackers to gain access via an exposed port, the method comprising: effecting display, to a user who has utilized a web browser loaded on a first device remote from the internal network to navigate to a uniform resource locator corresponding to a network security system portal implemented at a network security system device providing selective access to the internal network, of a login page prompting the user to input first authentication credentials to authenticate, the first authentication credentials comprising a user name and password; receiving, at the network security device, data corresponding to input by the user at the first device representing an attempt to provide the first authentication credentials; authenticating, based on communication with an identity provider of the internal network, that the input by the user at the first device representing an attempt to provide the first authentication credentials matches valid authentication credentials; effecting display, to the user in the web browser loaded on the first device, of a second factor authentication interface prompting the user to input a second factor authentication verification code; receiving, at the network security device, data corresponding to input by the user at the first device representing an attempt to provide the second factor authentication verification code; authenticating the user to the network security system portal based on the received data corresponding to input representing an attempt to provide the second factor authentication verification code by validating that such input is the correct second factor authentication verification code; after authenticating the user, determining one or more network security system rules for the network security system portal for which the user is an allowed user, determining one or more available hosts associated with the determined one or more security system rules, effecting display, to the user in the web browser loaded on the first device, of an interface of the network security system portal providing a list of devices available to be connected to, each listed device corresponding to one of the determined one or more available hosts, receiving, at the network security device, data corresponding to input by the user at the first device representing a selection of a particular listed available device; based on user selection of the available device, querying a server to obtain an IP address for the selected particular device, and receiving an IP address for the selected particular device; automatically creating a one-time port forwarding rule to set up a transmission control protocol (TCP) connection between the first device and the selected particular device, the one-time port forwarding rule being defined to forward packets received at the network security device at a particular port determined based on the respective rule for the available host representing the selected particular device, and the one time port forwarding rule being defined to forward such packets to the received IP address for the available host representing the selected particular device at a port specified in the respective rule for the available host representing the selected particular device; receiving, at the network security device, an initial SYN packet sent by the first device to the network security device at the particular port to set up the TCP connection between the first device and the particular device; based on the one-time port forwarding rule, updating one or more destination fields of the received SYN packet to be the received IP address for the available host representing the selected particular device, and forwarding the received SYN packet to the particular device; adding, by the network security device to a state table, connection information for the received SYN packet, the connection information including an indication that the connection has not yet been established; receiving, at the network security device, a response SYN-ACK packet sent by the particular device representing a second step of a three-step handshake to set up the TCP connection between the first device and the particular device; updating one or more source fields of the SYN-ACK packet to specify the IP address of the network security device as the source IP address and the particular port as the source port, and forwarding the SYN-ACK packet to the first device; receiving, at the network security device, a response ACK packet sent by the first device representing a third step of a three-step handshake completing set up of the TCP connection between the first device and the particular device; updating one or more destination fields of the received ACK packet to be the IP address and port specified in the respective rule for the available host representing the selected particular device, and forwarding the received ACK packet to the particular device; updating, by the network security device, connection information in its state table for the TCP connection by replacing the indication that the connection has not yet been established with an indication that the TCP connection is established; based on determining that the TCP connection has been established, automatically deleting the one-time port forwarding rule; and thereafter, upon receiving a subsequent packet at the network security device addressed to the particular port from the first device, determining that the subsequent packet belongs to the TCP connection for which connection information exists in the state table, and based thereon updating one or more destination fields of the received subsequent packet to be the IP address and port specified for the connection in the state table, and forwarding the received subsequent packet to the particular device; whereby, automatic creation of a dynamic one-time port forwarding rule for an authorized user's current IP address following two factor authentication of the authorized user is provided which enables authenticated remote access to an electronic device on an internal network in a manner which obviates the ability of attackers to gain access via an exposed port.

In a feature of this aspect, the method further comprises comparing an IP address associated with a login attempt to a whitelist to determine whether or not access should be granted.

In a feature of this aspect, the method further comprises comparing an IP address associated with a login attempt to a blacklist to determine whether or not access should be granted.

In a feature of this aspect, the method further comprises determining a country associated with an IP address associated with a login attempt to a whitelist to determine whether or not access should be granted.

In a feature of this aspect, the method further comprises determining a country associated with an IP address associated with a login attempt to a blacklist to determine whether or not access should be granted.

In a feature of this aspect, the method further comprises comparing an IP address of the first device to a whitelist to determine whether or not access should be granted.

In a feature of this aspect, the method further comprises comparing an IP address of the first device to a blacklist to determine whether or not access should be granted.

In a feature of this aspect, the method further comprises determining a country associated with an IP address of the first device to a whitelist to determine whether or not access should be granted.

In a feature of this aspect, the method further comprises determining a country associated with an IP address of the first device to a blacklist to determine whether or not access should be granted.

Another aspect relates to a system as disclosed.

Another aspect relates to a system for implementing a disclosed method.

Another aspect relates to one or more computer readable media containing computer executable instructions for performing a disclosed method.

In addition to the aforementioned aspects and features of the invention, it should be noted that the invention further encompasses the various logical combinations and subcombinations of such aspects and features. Thus, for example, claims in this or a divisional or continuing patent application or applications may be separately directed to any aspect, feature, or embodiment disclosed herein, or combination thereof, without requiring any other aspect, feature, or embodiment.

BRIEF DESCRIPTION OF THE DRAWINGS

One or more preferred embodiments of the invention now will be described in detail with reference to the accompanying drawings, wherein the same elements are referred to with the same reference numerals.

FIG. 5A figuratively illustrates a schema of an exemplary IP packet communicated over the network path illustrated in FIG. 2.

FIG. 5B illustrates a conventional schema of an IPv4 header.

FIG. 5C illustrates a conventional schema of a TCP header.

FIG. 5D illustrates a conventional schema of a UDP header.

FIGS. 6A-6B illustrate an IP packet that is communicated over the network path illustrated in FIG. 6B.

FIGS. 12-14 illustrate an exemplary process for setting up second factor authentication.

FIGS. 19-21A illustrate an exemplary second factor authentication process.

FIG. 22 illustrates an interface for a network security system portal allowing a user to select an available device to connect to.

FIGS. 23A-K illustrate establishment of a connection utilizing a one-time port forwarding rule.

FIGS. 24A-D illustrate communication of a subsequent packet over an established connection.

FIGS. 28-34 illustrate exemplary interfaces of an administrative site.

DETAILED DESCRIPTION

Figure 1:
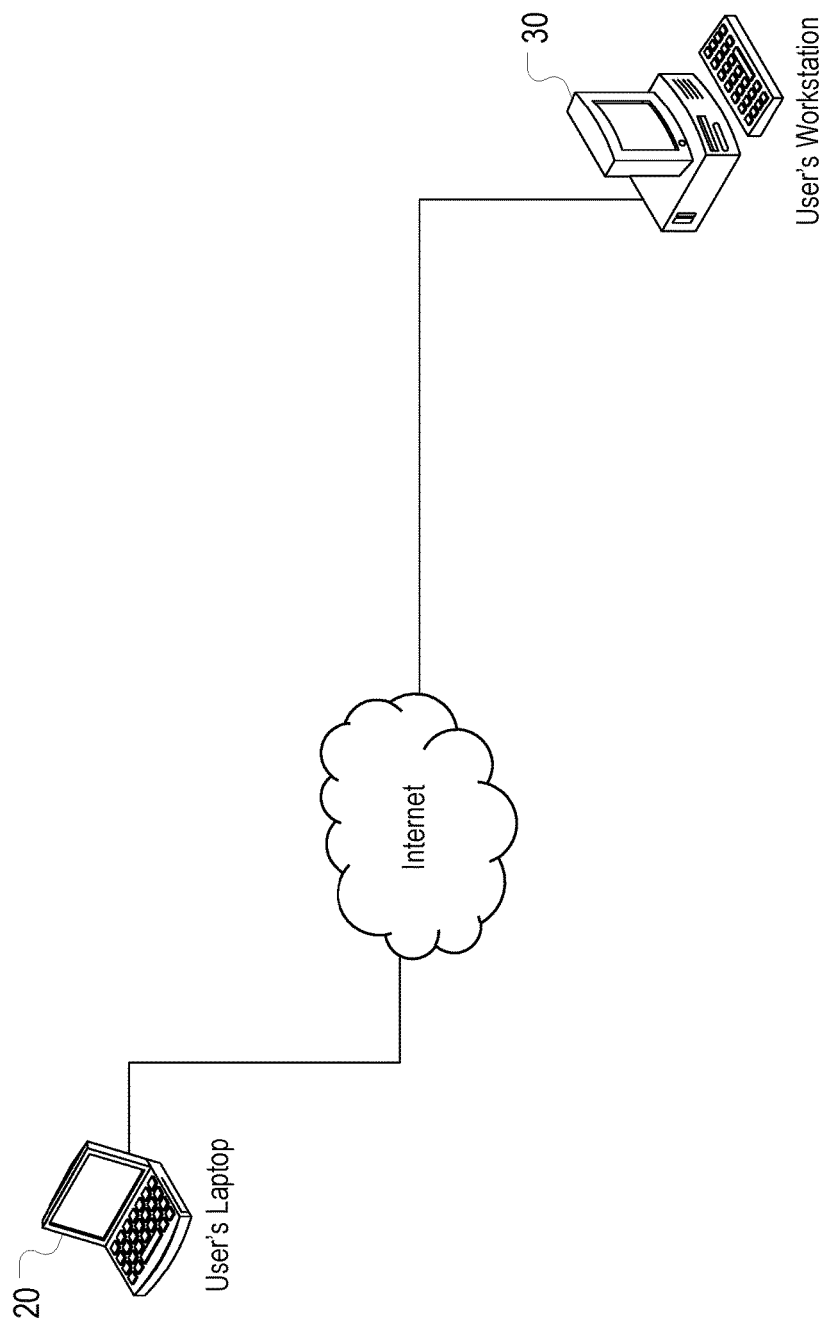
FIGS. 1-3 illustrate prior art systems and methods.
Figure 2:
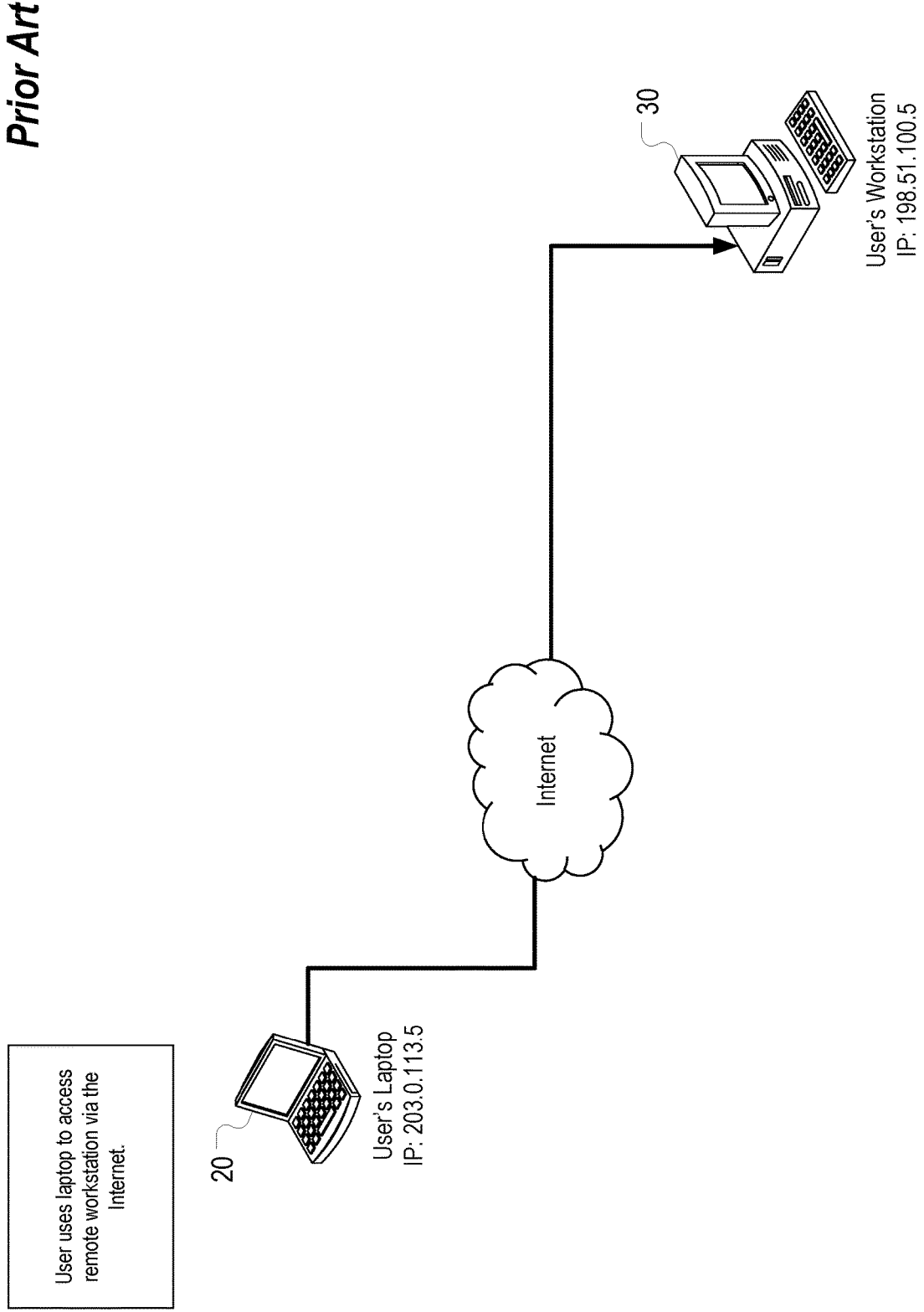
Figure 3:
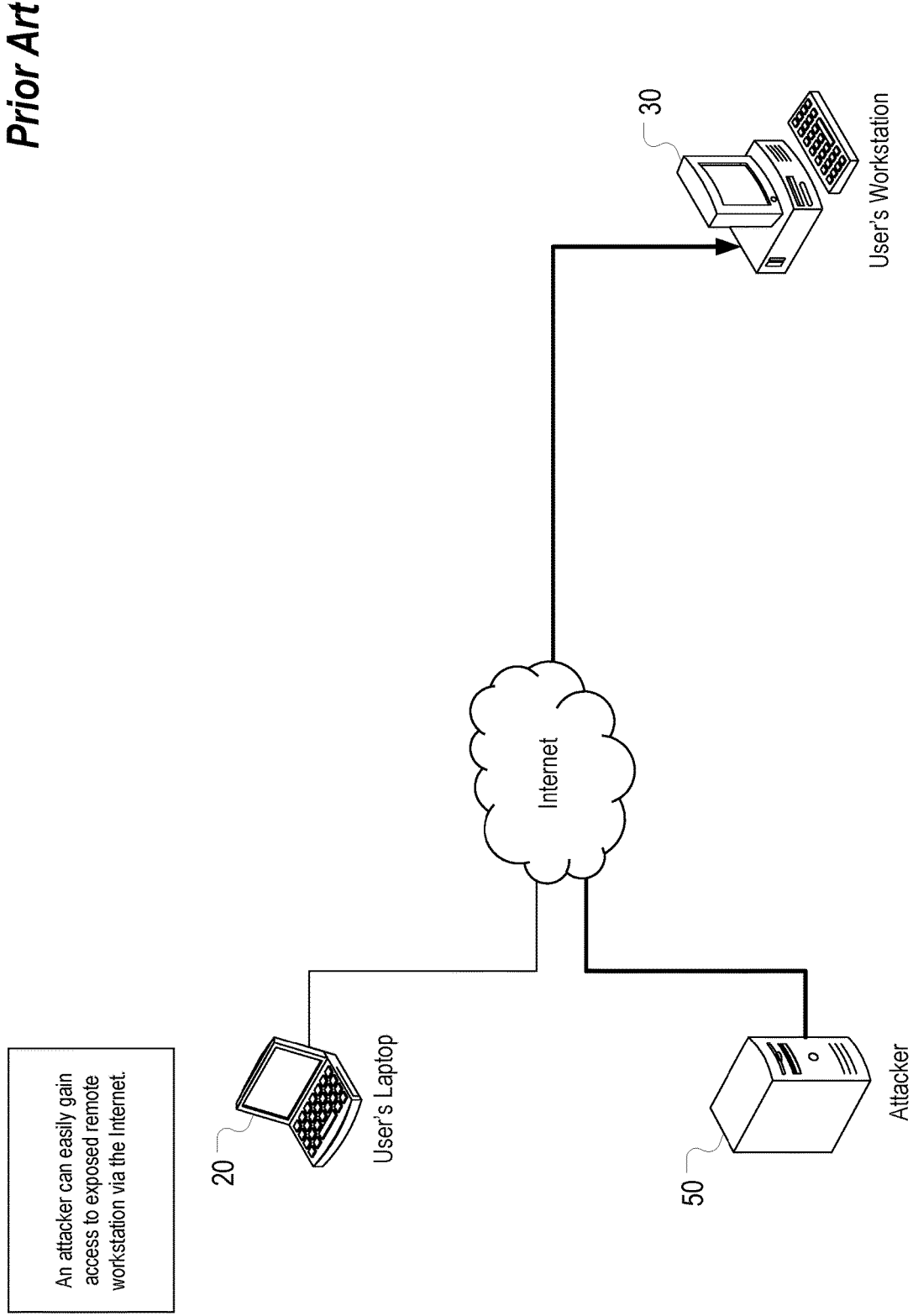
Figure 4A:
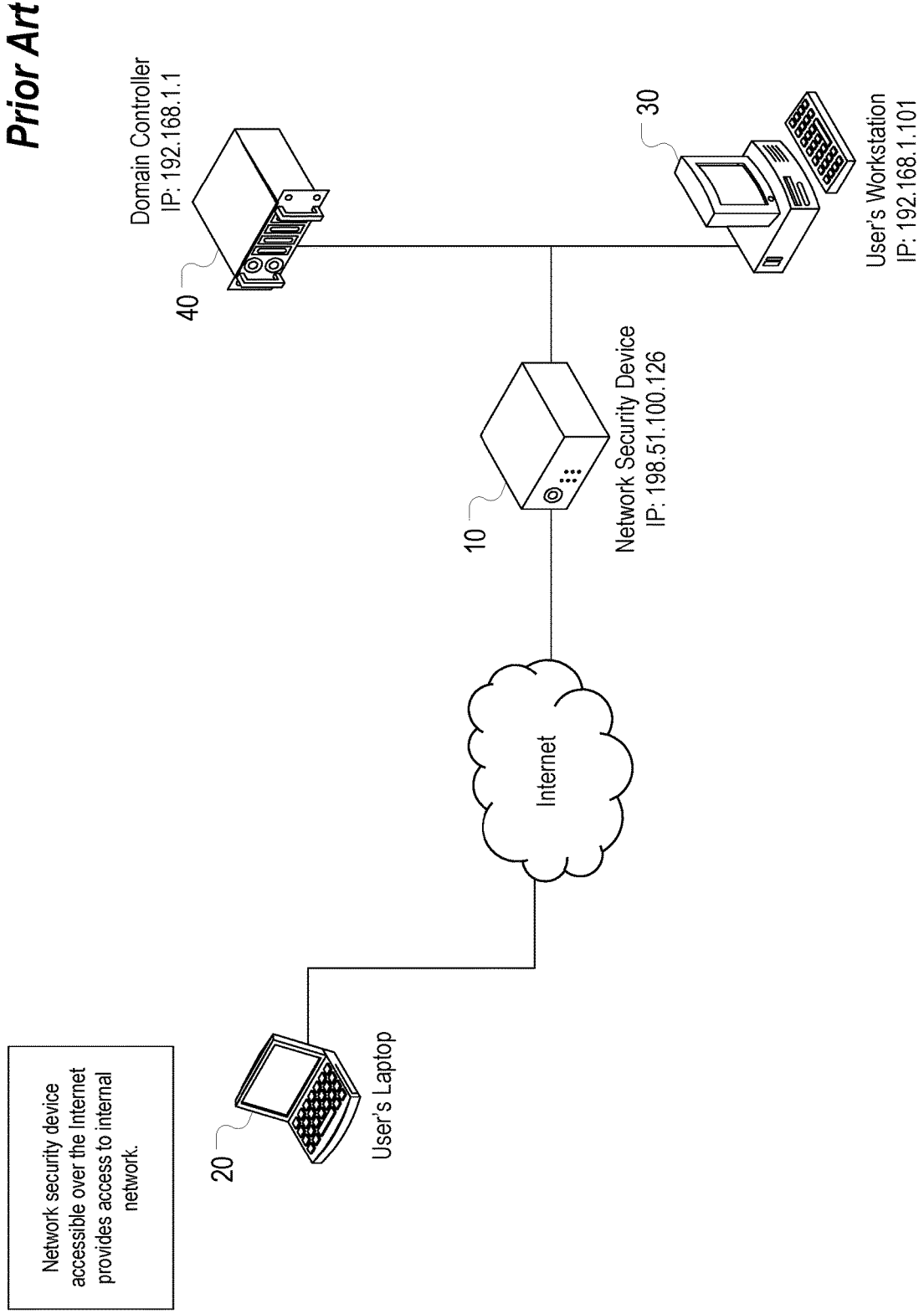
FIG. 4A illustrates an exemplary system in which a network security device functions as a router and firewall for an internal network including the user's workstation and a domain controller.
Figure 4B:
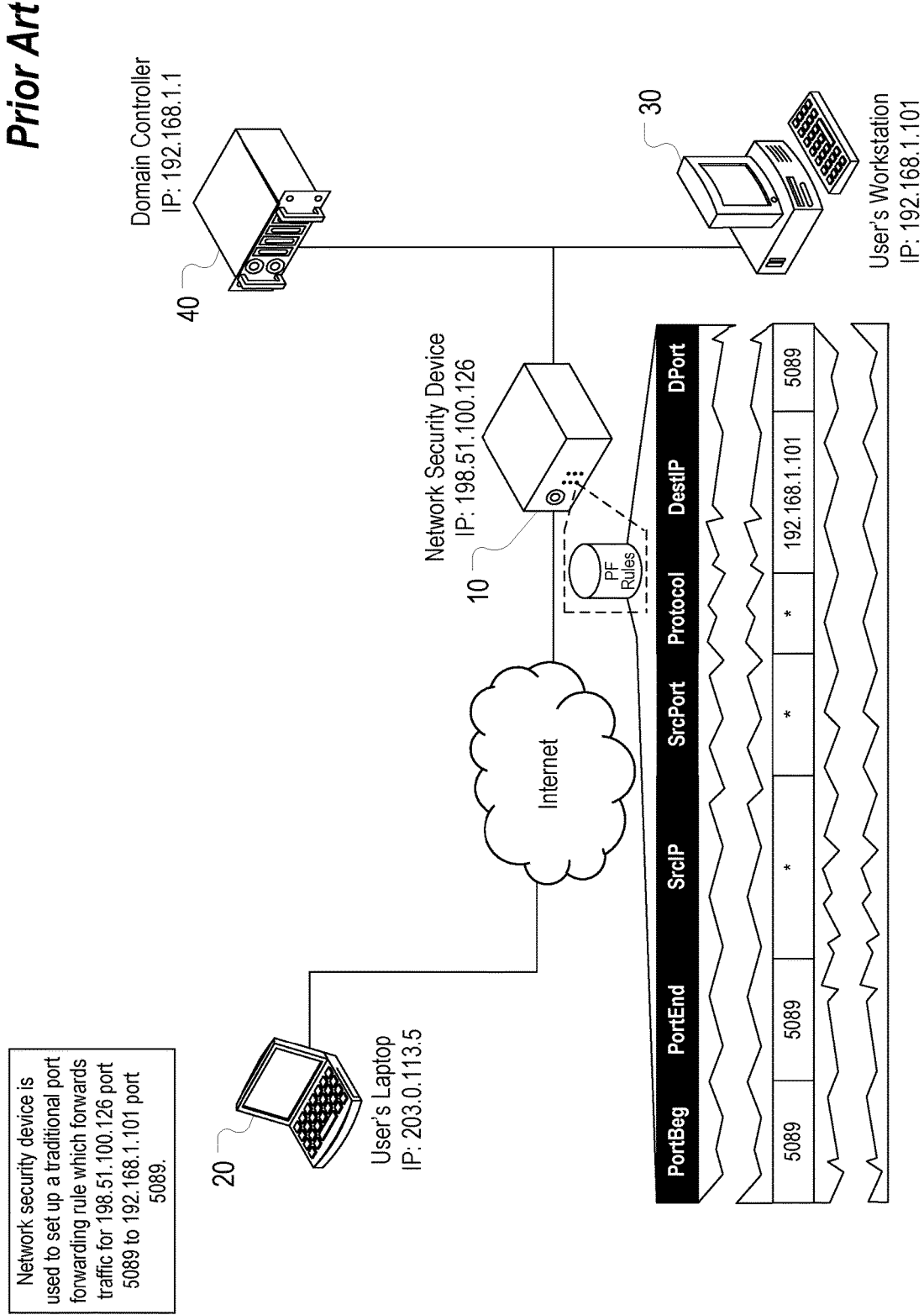
FIG. 4B illustrates a port forwarding rule specifying that received packets for port 5089 are to be forwarded to the same port at IP address 192.168.1.101 (which corresponds to the user's workstation).
Figure 6B:
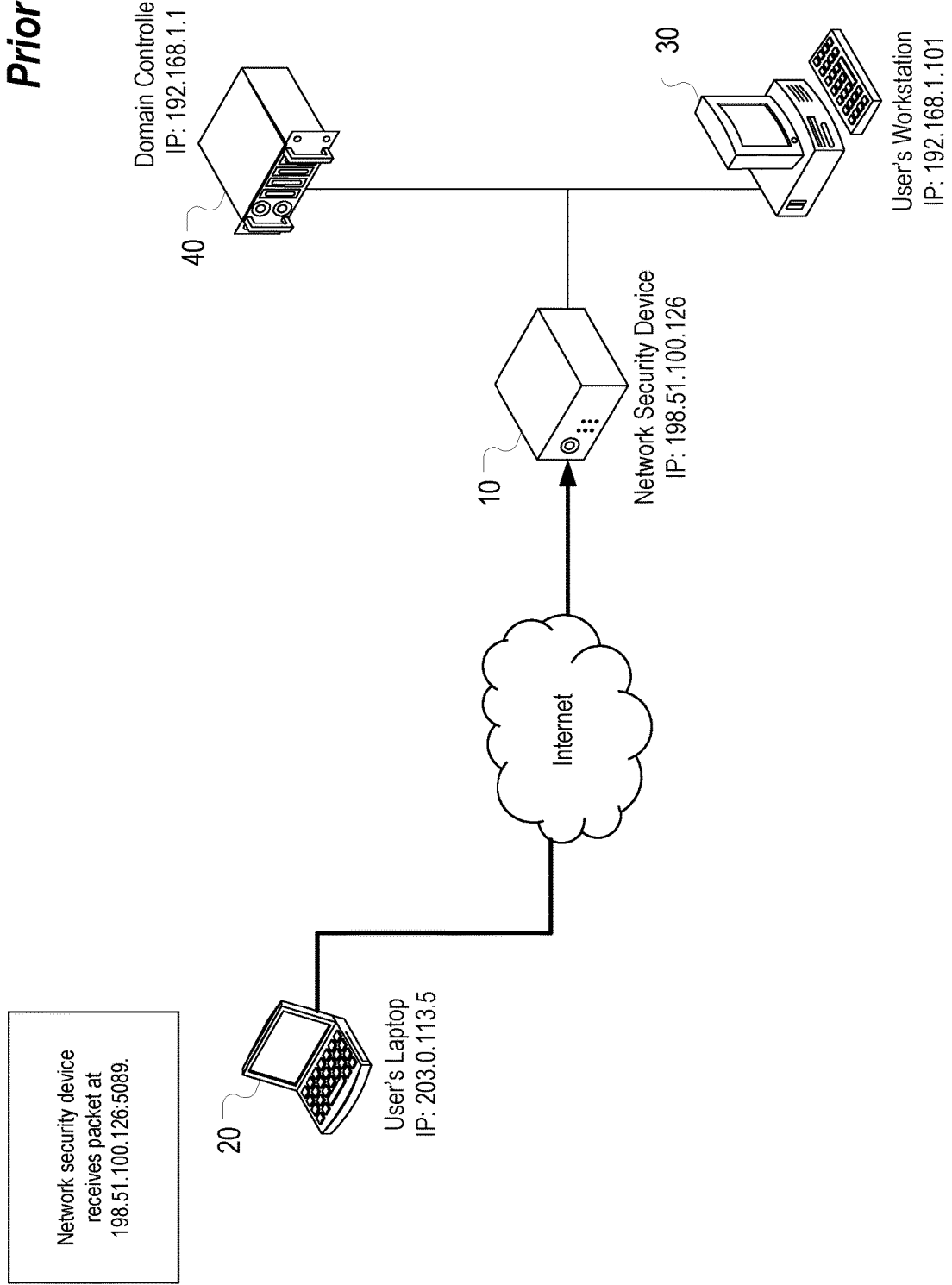
Figure 6C:
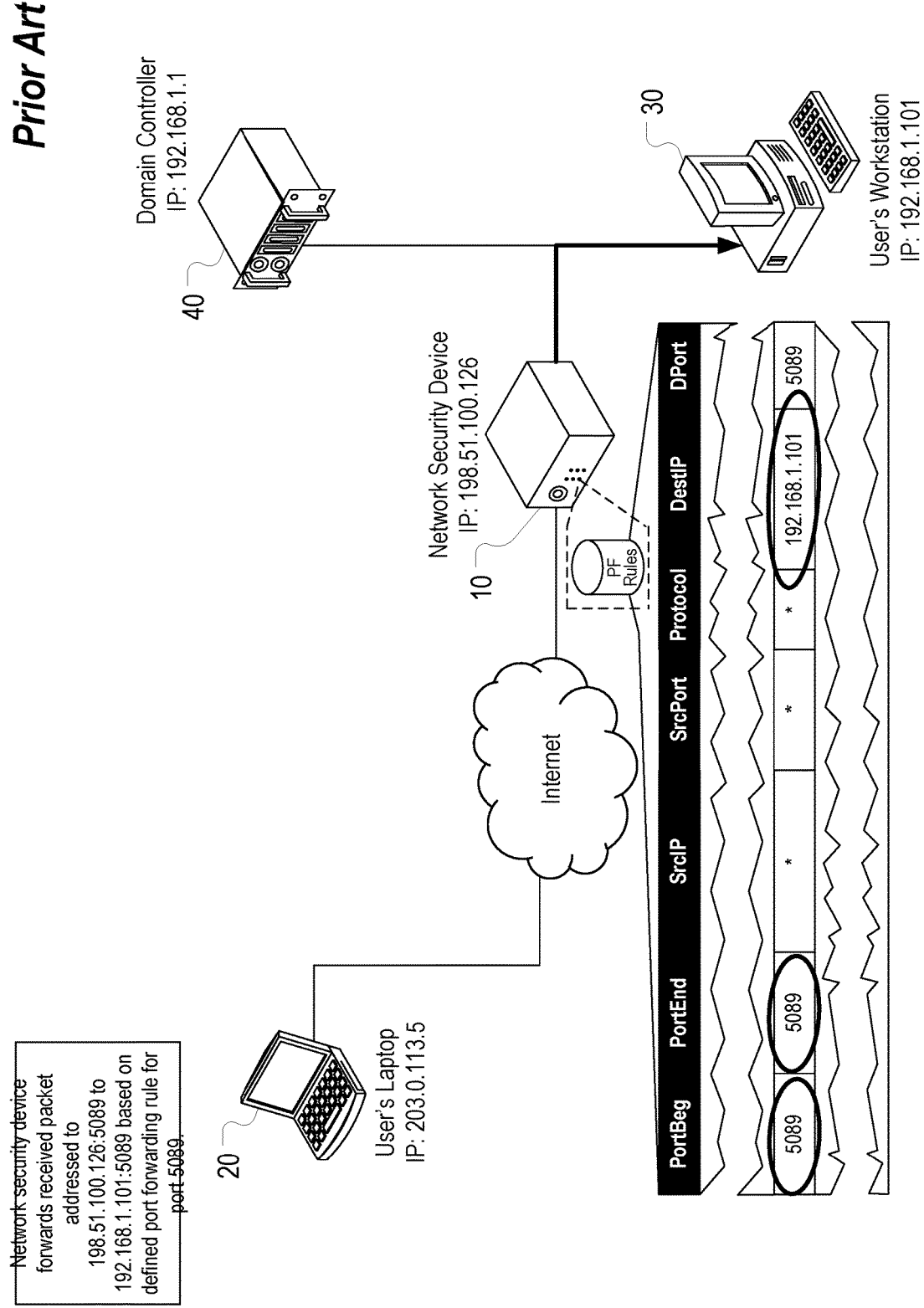
FIG. 6C illustrates a network security device forwarding a received packet based on a defined port forwarding rule.
Figure 7A:
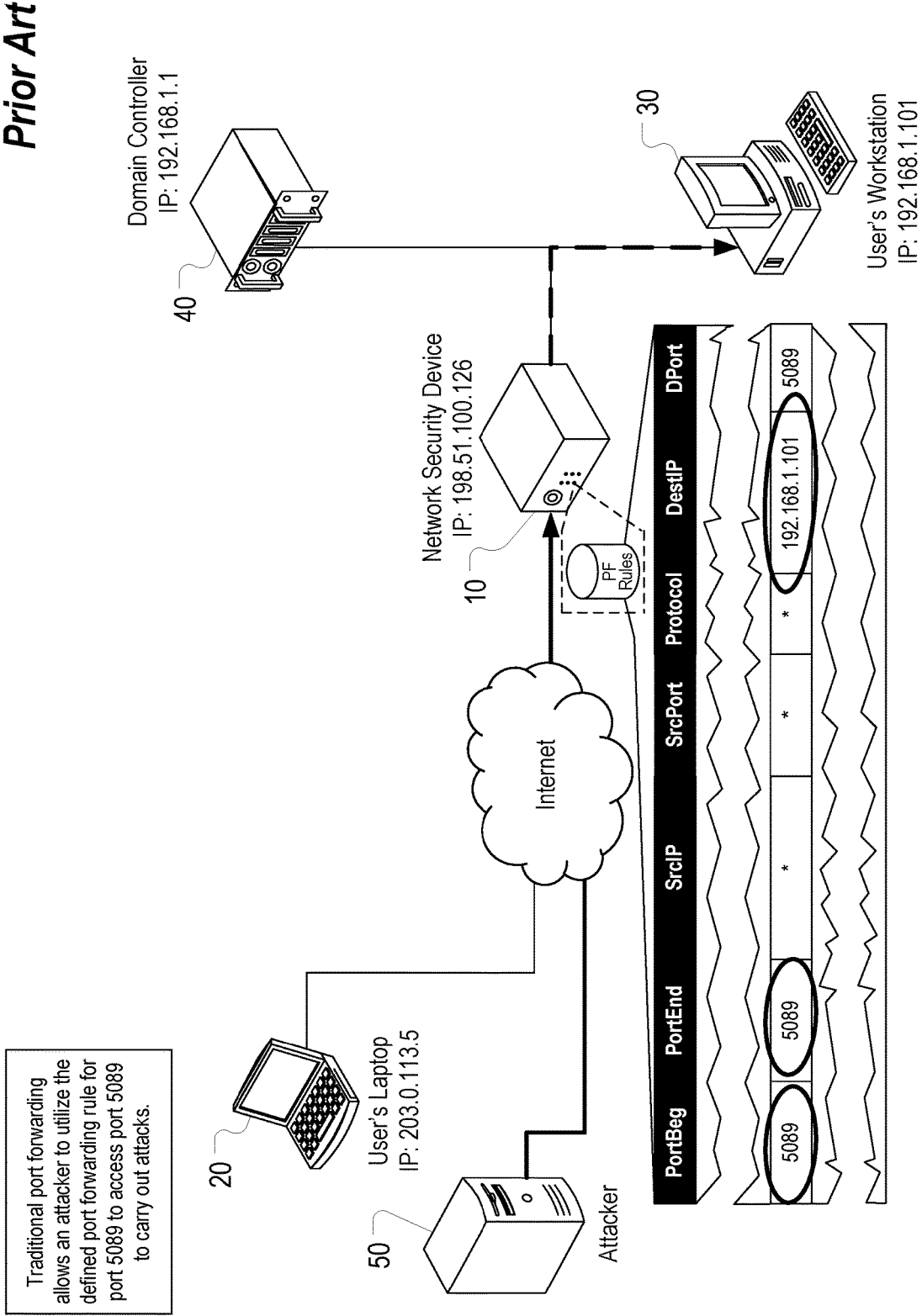
FIG. 7A illustrates that conventional use of traditional port forwarding allows an attacker to utilize a defined port forwarding rule such as this to carry out attacks.
Figure 7B:
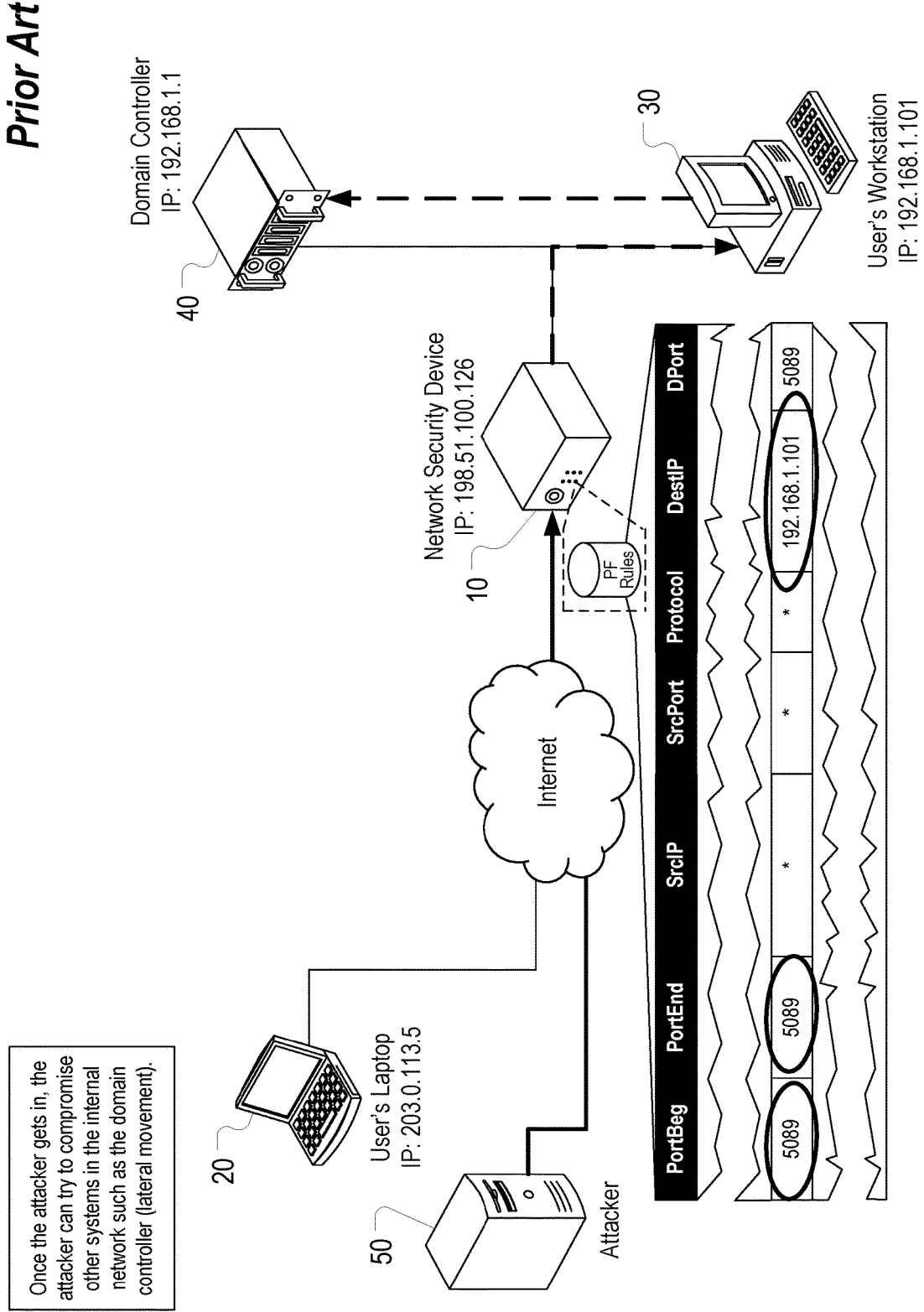
FIG. 7B illustrates how once an attacker gets in, the attacker can try to compromise other systems in the internal network such as a domain controller.
Figure 8:
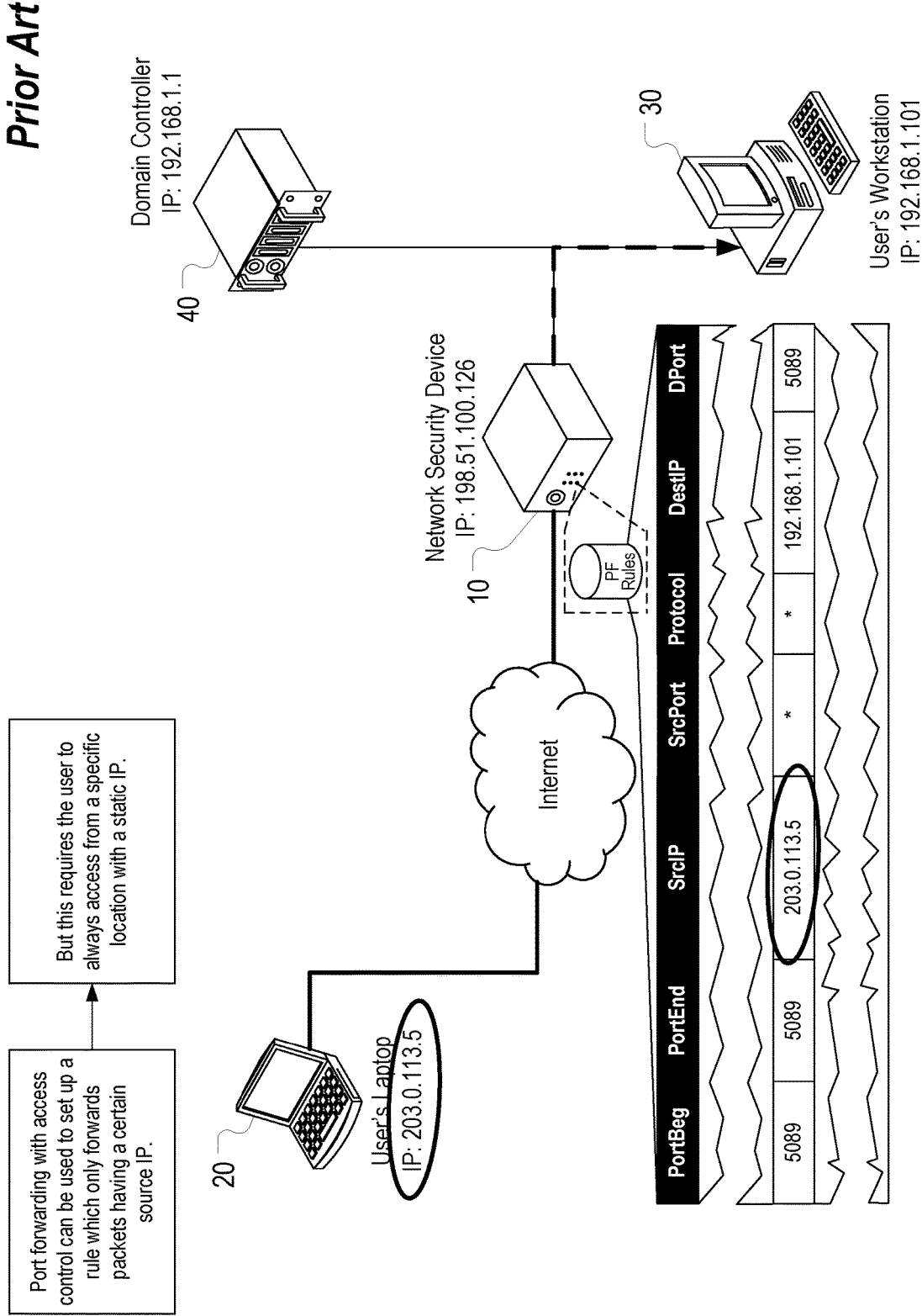
FIG. 8 illustrates the presence in a port forwarding rule table of a rule which only forwards packets having a particular source IP address.
Figure 9:
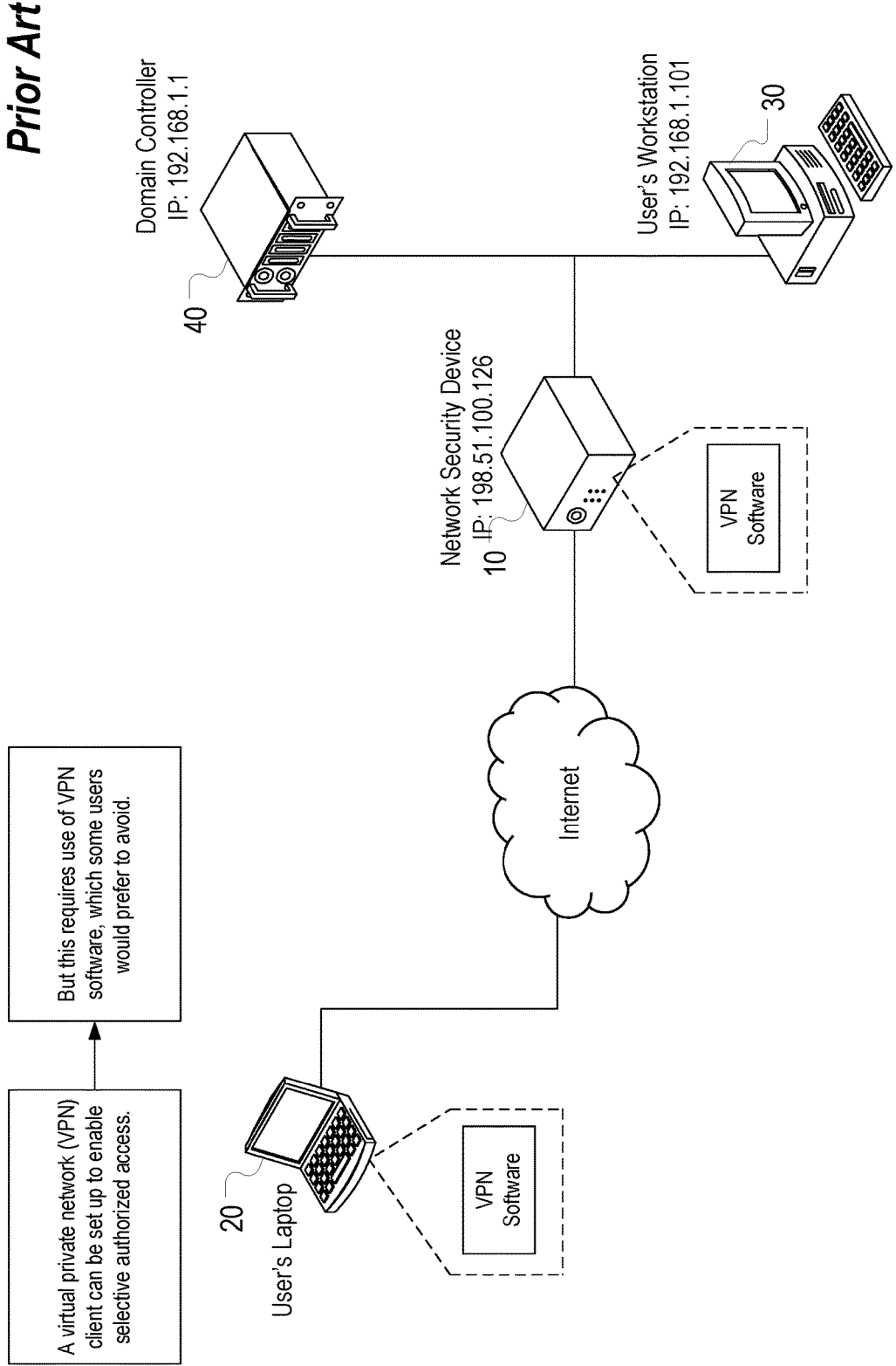
FIG. 9 illustrates an exemplary system in which VPN software is utilized to enable selective access to an internal network.

As a preliminary matter, it will readily be understood by one having ordinary skill in the relevant art ("Ordinary Artisan") that the invention has broad utility and application. Furthermore, any embodiment discussed and identified as being "preferred" is considered to be part of a best mode contemplated for carrying out the invention. Other embodiments also may be discussed for additional illustrative purposes in providing a full and enabling disclosure of the invention. Furthermore, an embodiment of the invention may incorporate only one or a plurality of the aspects of the invention disclosed herein; only one or a plurality of the features disclosed herein; or combination thereof. As such, many embodiments are implicitly disclosed herein and fall within the scope of what is regarded as the invention.

Accordingly, while the invention is described herein in detail in relation to one or more embodiments, it is to be understood that this disclosure is illustrative and exemplary of the invention, and is made merely for the purposes of providing a full and enabling disclosure of the invention. The detailed disclosure herein of one or more embodiments is not intended, nor is to be construed, to limit the scope of patent protection afforded the invention in any claim of a patent issuing here from, which scope is to be defined by the claims and the equivalents thereof. It is not intended that the scope of patent protection afforded the invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once but not necessarily every time during performance of the claimed method.

Furthermore, it is important to note that, as used herein, "comprising" is open-ended insofar as that which follows such term is not exclusive. Additionally, "a" and "an" each generally denotes "at least one" but does not exclude a plurality unless the contextual use dictates otherwise. Thus, reference to "a picnic basket having an apple" is the same as "a picnic basket comprising an apple" and "a picnic basket including an apple", each of which identically describes "a picnic basket having at least one apple" as well as "a picnic basket having apples"; the picnic basket further may contain one or more other items beside an apple. In contrast, reference to "a picnic basket having a single apple" describes "a picnic basket having only one apple"; the picnic basket further may contain one or more other items beside an apple. In contrast, "a picnic basket consisting of an apple" has only a single item contained therein, i.e., one apple; the picnic basket contains no other item.

When used herein to join a list of items, "or" denotes "at least one of the items" but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers"; the picnic basket further may contain one or more other items beside cheese and crackers.

When used herein to join a list of items, "and" denotes "all of the items of the list". Thus, reference to "a picnic basket having cheese and crackers" describes "a picnic basket having cheese, wherein the picnic basket further has crackers", as well as describes "a picnic basket having crackers, wherein the picnic basket further has cheese"; the picnic basket further may contain one or more other items beside cheese and crackers.

The phrase "at least one" followed by a list of items joined by "and" denotes an item of the list but does not require every item of the list. Thus, "at least one of an apple and an orange" encompasses the following mutually exclusive scenarios: there is an apple but no orange; there is an orange but no apple; and there is both an apple and an orange. In these scenarios if there is an apple, there may be more than one apple, and if there is an orange, there may be more than one orange. Moreover, the phrase "one or more" followed by a list of items joined by "and" is the equivalent of "at least one" followed by the list of items joined by "and".

Referring now to the drawings, one or more preferred embodiments of the invention are next described. The following description of one or more preferred embodiments is merely exemplary in nature and is in no way intended to limit the invention, its implementations, or uses.

As noted above, conventional use of traditional port forwarding allows an attacker to utilize a defined port forwarding rule to carry out attacks, and conventional port forwarding with access control limiting access to a specified IP requires a user to utilize a remote device that consistently has the same IP address.

In accordance with one or more preferred implementations, a network security methodology is utilized which allows for automatic creation of a dynamic one-time firewall rule (e.g. a port forwarding rule or a whitelist rule) for an authorized user's current IP address following two factor authentication of the authorized user. Such a dynamic one-time port forwarding rule is utilized to set up a connection, at which point the dynamic one-time port forwarding rule is removed, preventing any attacker from subsequently taking advantage of it.

Figure 10A:
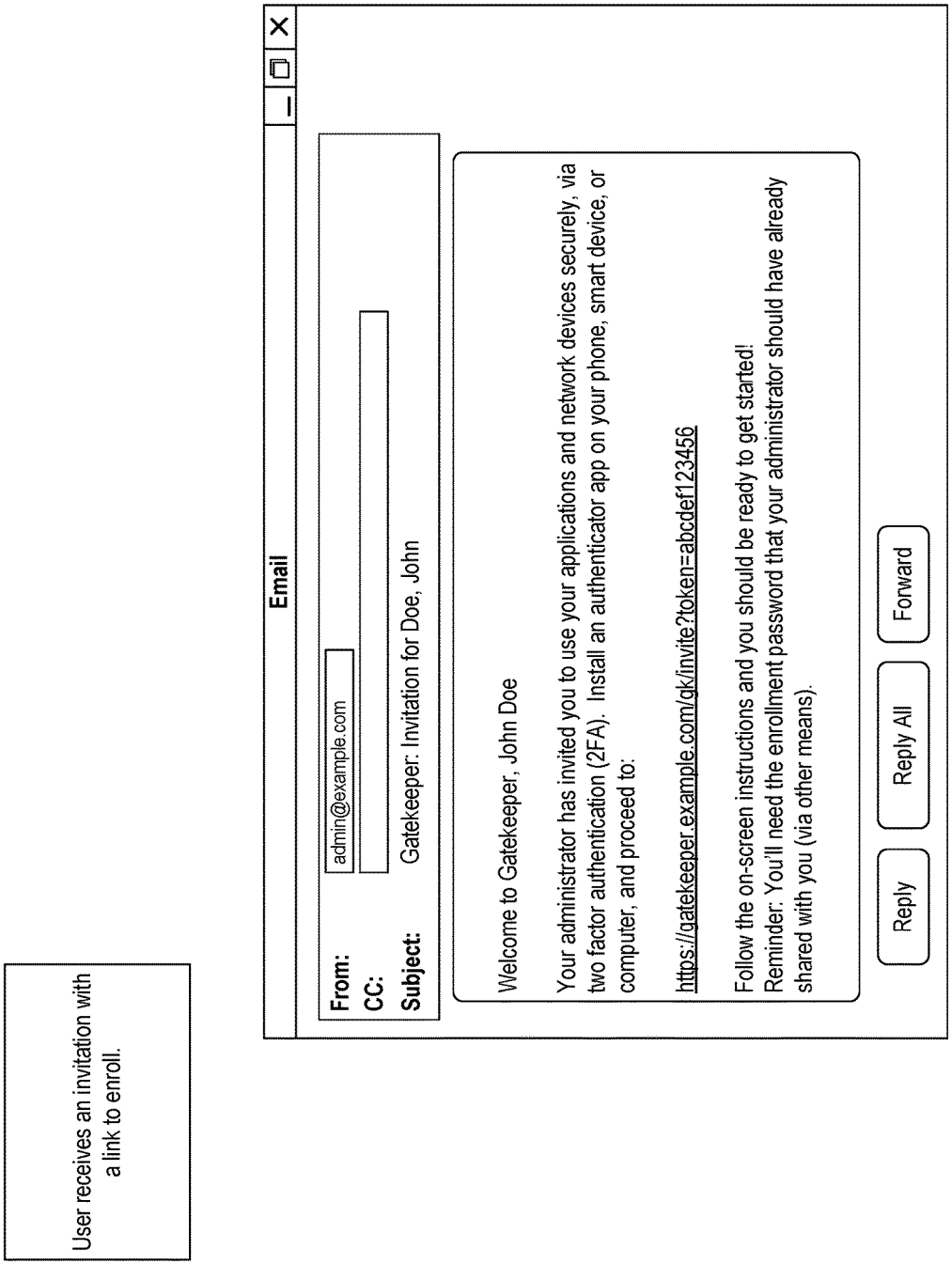
FIG. 10A illustrates an exemplary email invitation for a network security system.

In accordance with one or more preferred implementations, a potential user must first enroll with a network security system. FIG. 10A illustrates an exemplary email invitation for such a network security system. The email invitation indicates the need to install a second factor authentication (2FA) application. Exemplary second factor authentication apps include, by way of nonlimiting example, Google Authenticator and Authy. The email invitation further includes a link to a web site which will walk the user through the enrollment process. In accordance with one or more preferred implementations, an invitation may be made in another way, e.g. via text message, printed message, mailed letter, or even oral or audio communication.

Figure 10B:
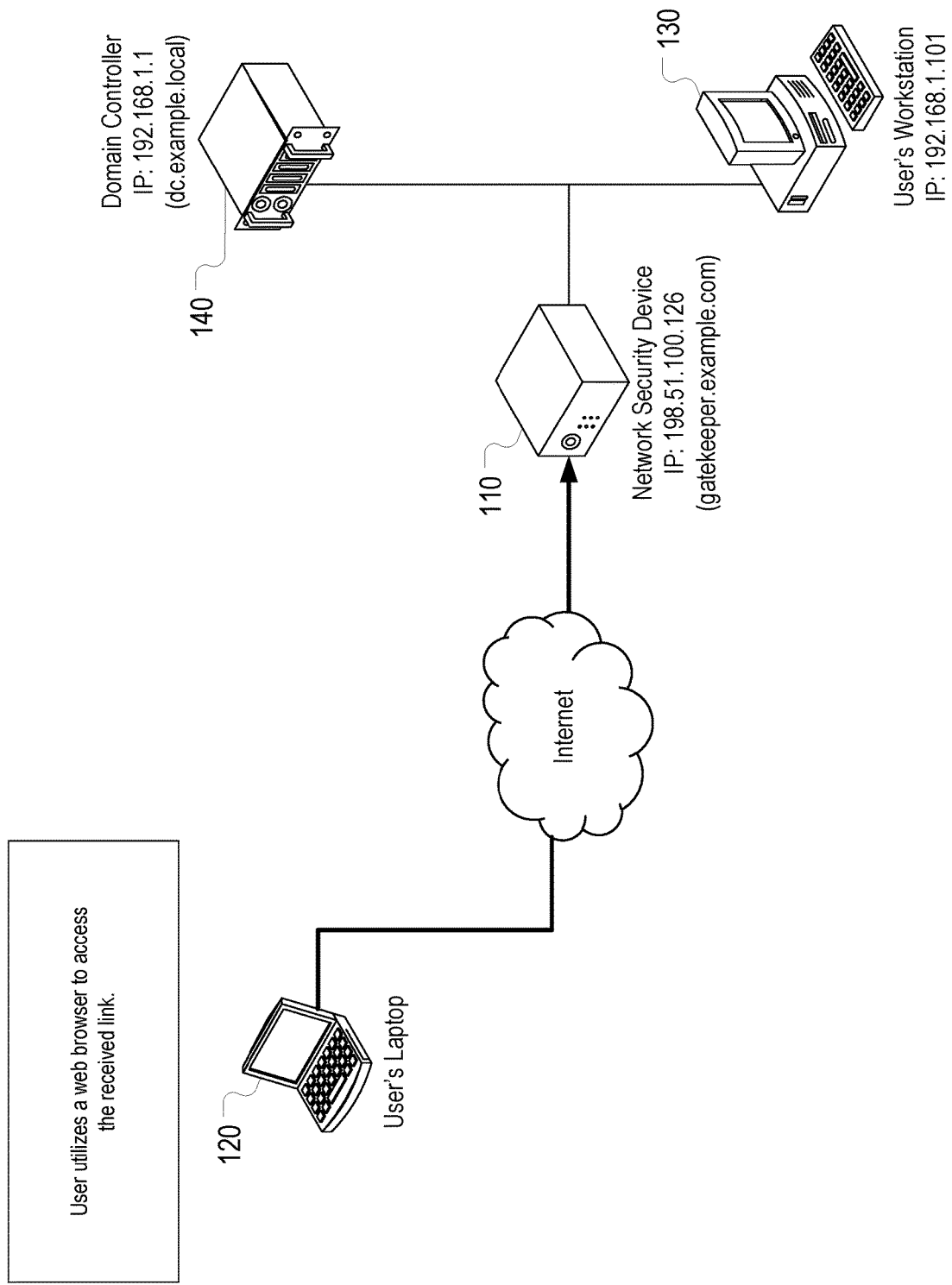
FIG. 10B illustrates a user utilizing a web browser of a laptop to access, via the Internet, a received link.

After receiving the invitation, the user can utilize a web browser to access the received link. For example, FIG. 10B illustrates a user utilizing a web browser of a laptop 120 to access, via the Internet, the received link. The received link points to a web site hosted at the network security device 110, although in accordance with one or more preferred implementations, an enrollment site may be hosted at a different machine than a network security device which provides access to an internal network. In this case, the network security device provides selective network access to and from an internal network including a domain controller 140 and the user's workstation 130.

Figure 10C:
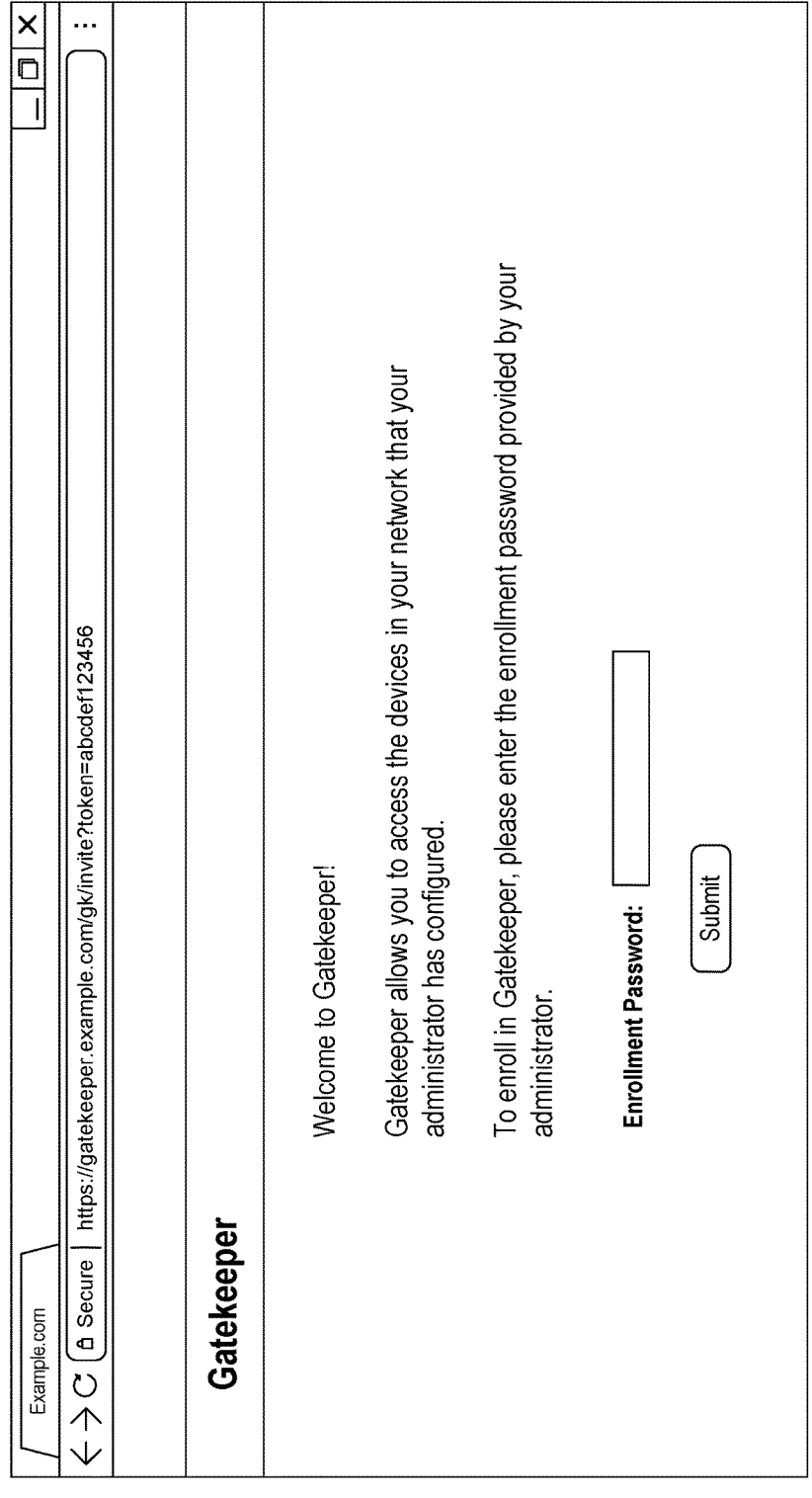
FIG. 10C illustrates a user being prompted for an enrollment password to begin an enrollment process.

Upon accessing the enrollment page using the received link, the user is prompted for an enrollment password to begin the enrollment process, as illustrated in FIG. 10C. This enrollment password may have been provided by an administrator via email, text message, automated phone call, printed message, mailed letter, or even oral or audio communication.

Figure 11A:
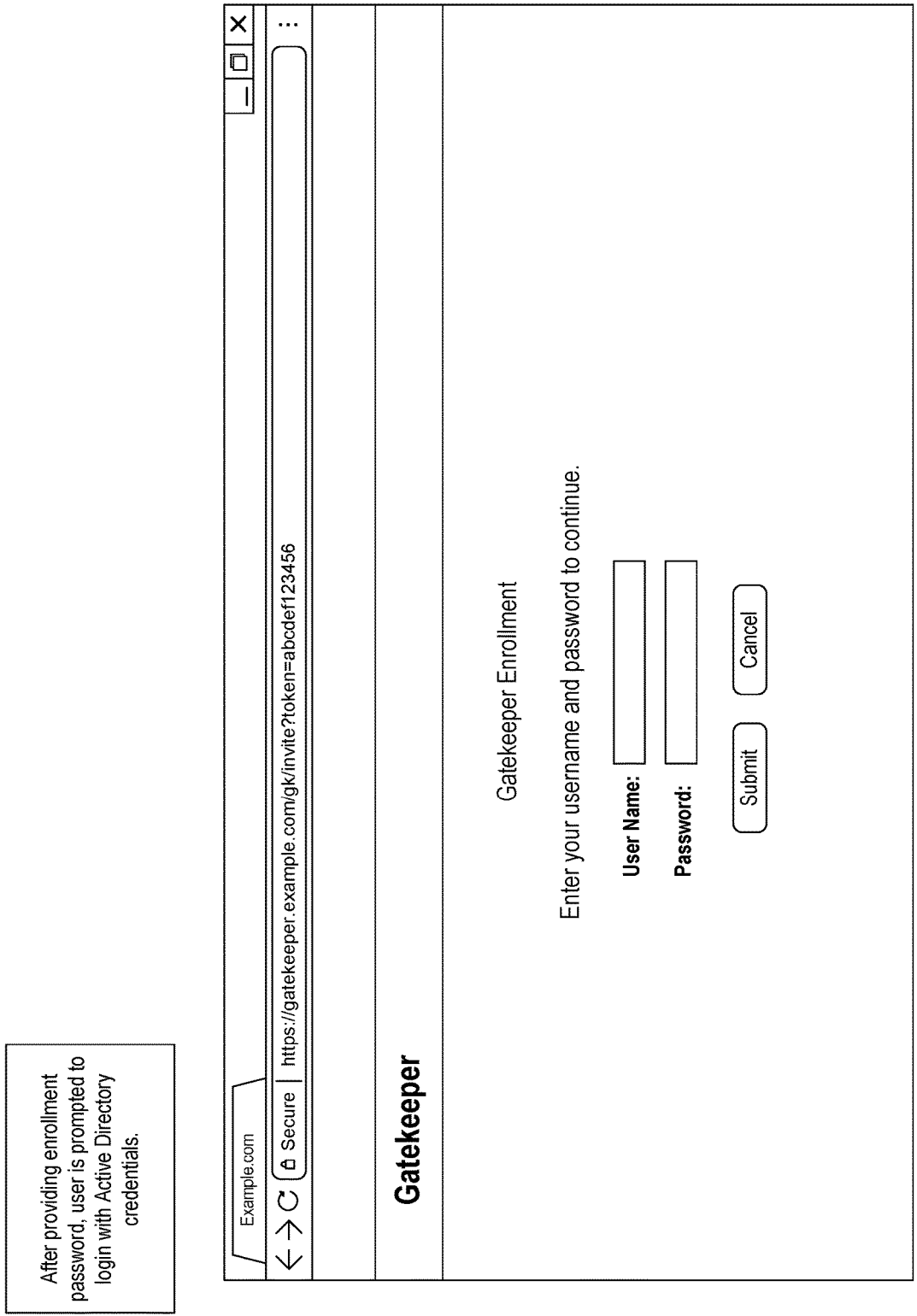
FIGS. 11A-B illustrate a user being prompted to login with Active Directory credentials.
Figure 11B:
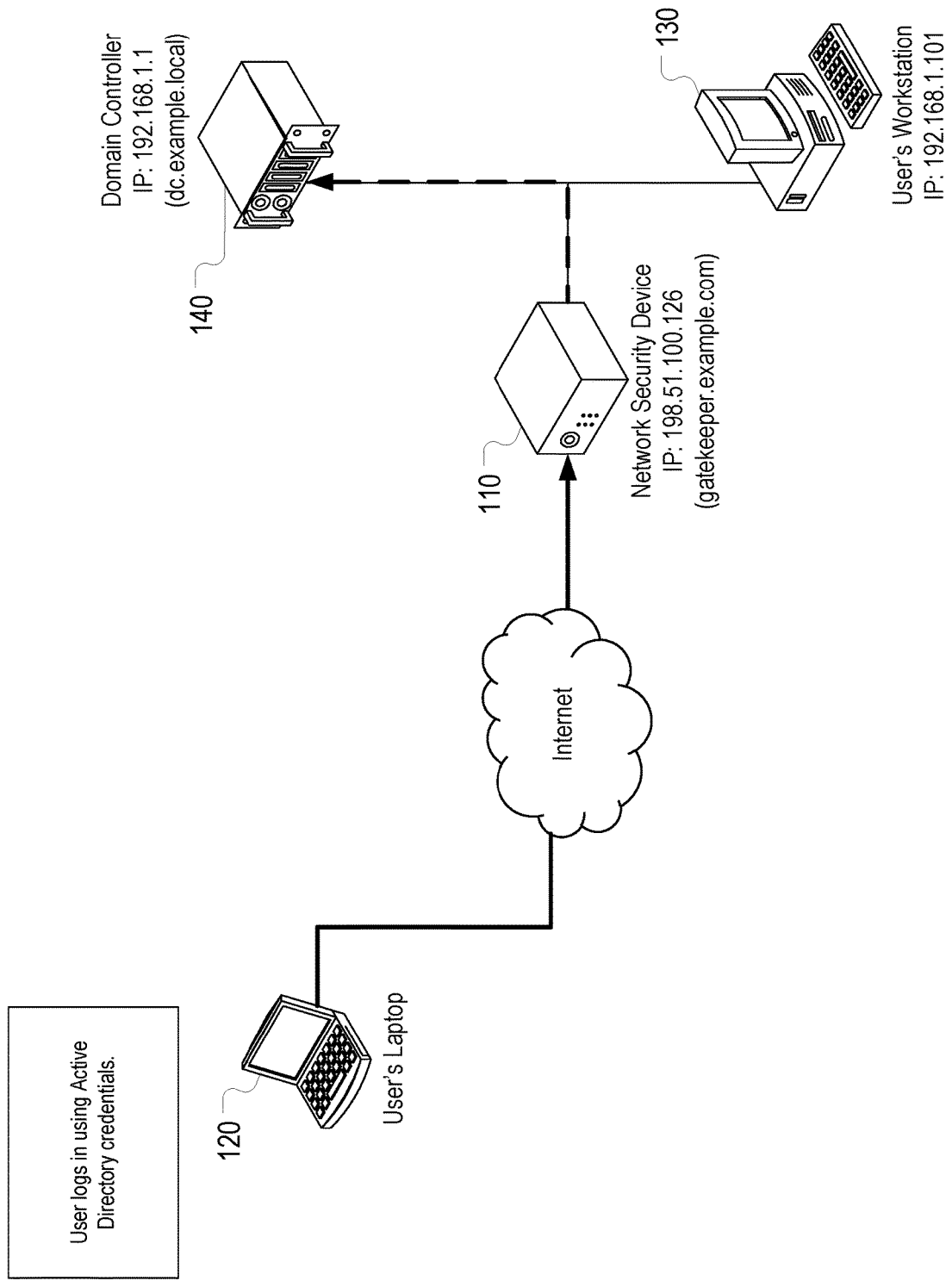

After providing the correct enrollment password, the user is prompted to login with his or her Active Directory (AD) credentials, as illustrated in FIG. 11A and FIG. 11B. Active Directory is a directory service by Microsoft Corporation for Windows domain networks which is included in most Windows Server operating systems as a set of processes and services. In accordance with one or more preferred implementations, various other credentials may be utilized.

Figure 12:
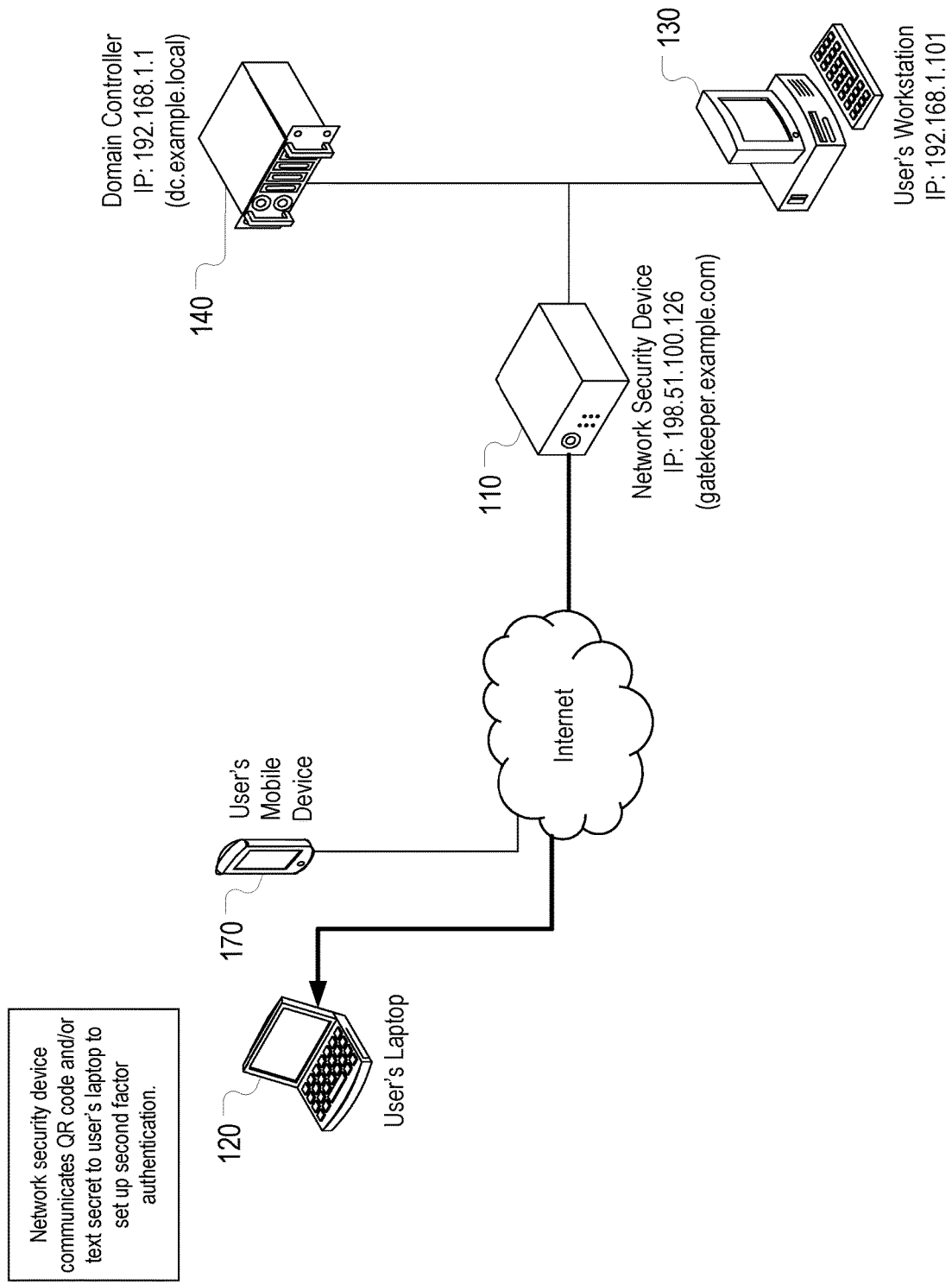

After the user logs in with his or her Active Directory credentials, the network security device effects communication of a QR code and/or text secret to the user's laptop to set up second factor authentication, as illustrated in FIG. 12, and the user is prompted to set up second factor authentication on a web page forming part of the enrollment process, as illustrated in FIG. 13.

In order to do so, an authenticator app needs to be installed on another electronic device of the user, e.g. a mobile device such as a phone or tablet. The user can scan a QR code displayed on the web page forming part of the enrollment process, or can manually enter a displayed text key.

Figure 14:
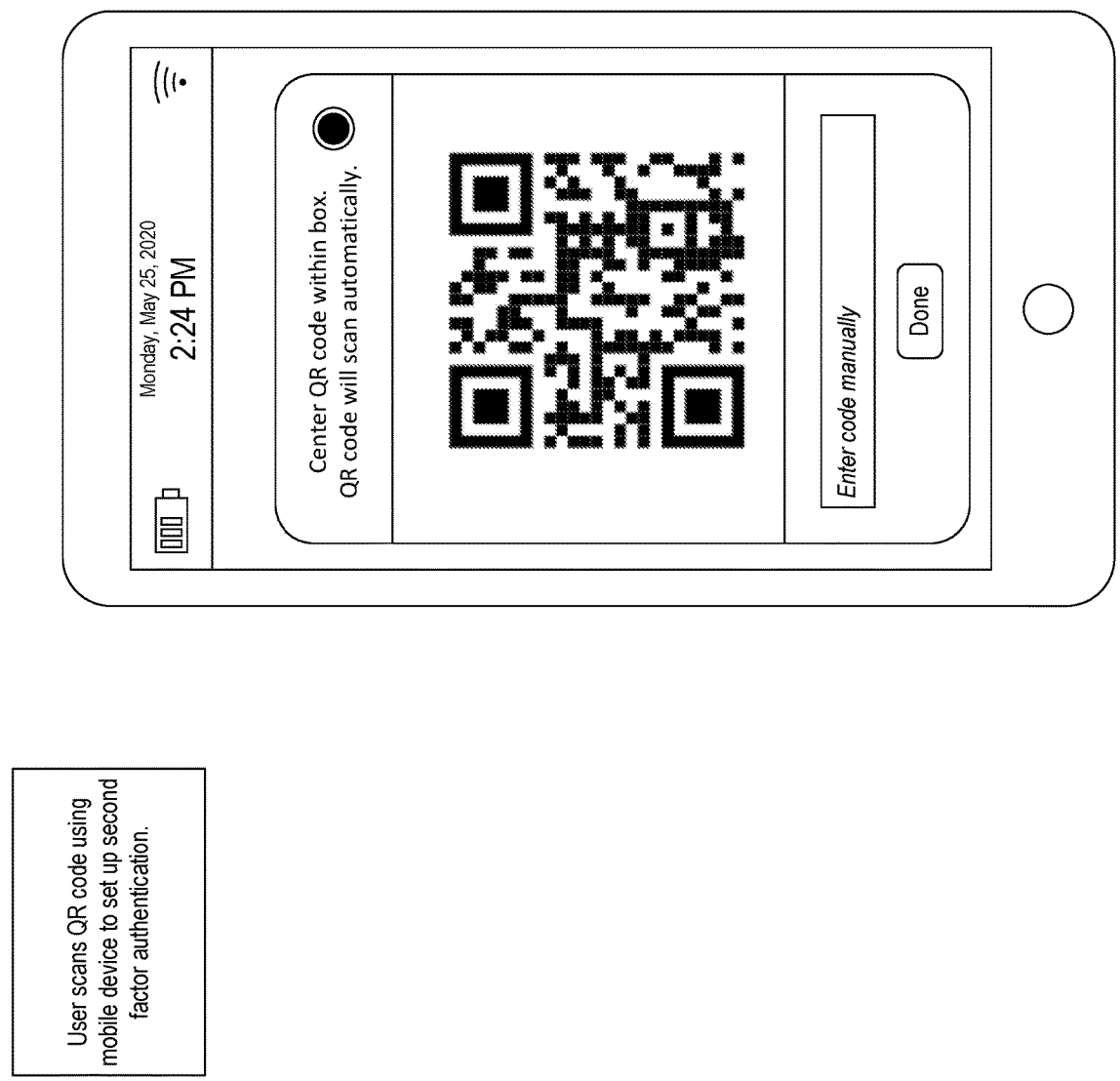

FIG. 14 illustrates an exemplary interface of an authenticator app running on the user's mobile device which allows the user to scan the QR code displayed on the web page forming part of the enrollment process, or manually enter the displayed text key. Here, as illustrated in FIG. 14, the user scans the QR code using the authenticator app and the camera of his or her mobile device 170 to set up second factor authentication. Based on the scanned QR code, the user's mobile device 170 stores data representing the scanned secret for use in generating authentication codes based thereon. In particular, the second factor authentication app is configured to utilize an algorithm to generate pseudo-random fixed-length codes based on the stored secret and a current time. These pseudo-random fixed-length codes represent continually changing second factor authentication verification codes that can be used to authenticate the holder of the secret.

Alternatively, in accordance with one or more preferred implementations, a secret or token for use in generating authentication codes may be received from another device other than a network security device, e.g. a second factor authentication server, or an identity manager server used in conjunction with the network security device.

In accordance with one or more preferred implementations, the network security device 110 or an associated server maintains a second factor authentication secret or token, which can be utilized to allow the network security device 110 or an associated server to subsequently validate a received verification code. For example, the network security device 110 may store a copy of the secret or token sent to the user which can be used together with an algorithm to generate the same pseudo-random fixed-length code at a particular time as the second factor authentication app loaded on the user's mobile device 170.

Figure 15:
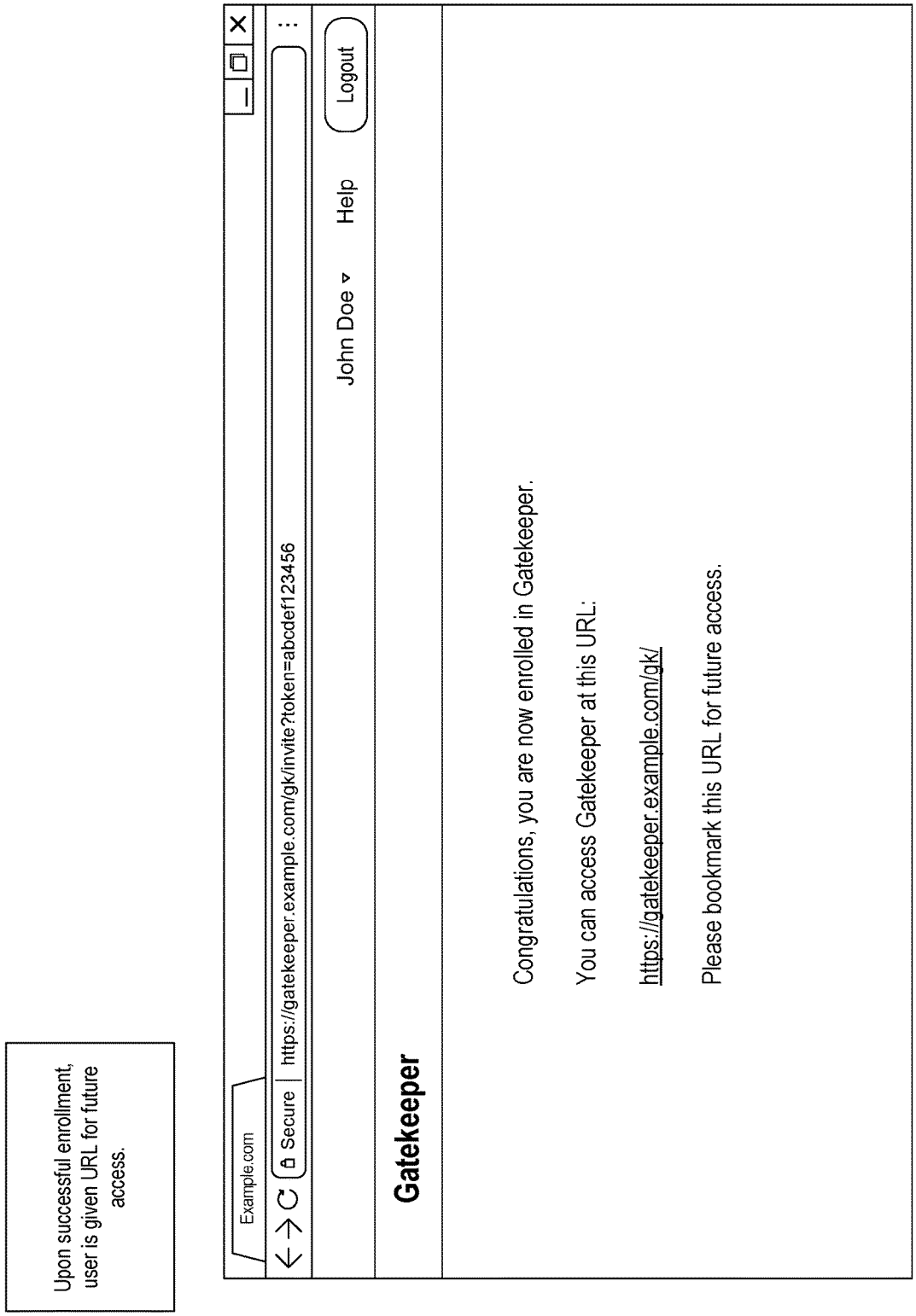
FIG. 15 illustrates an exemplary enrollment completion interface including a URL for accessing a network security system portal.

Thereafter, upon successful enrollment, the user is presented, in a web page forming part of the enrollment process which is displayed on the user's laptop 120, a uniform resource locator (URL) for future access to a network security system portal, as illustrated in FIG. 15.

Subsequently, the user can utilize this URL to access the network security system portal and initiate a connection to one or more electronic devices on an internal network the network security device 110 provides access to.

In accordance with one or more alternative implementations, a user may utilize such a URL to access a network security system portal that will not permit the user to initiate a connection to any electronic device.

In accordance with one or more alternative implementations, a network security device can prompt a user to install client software on his or her remote device to provide one or more alternative methods (rather than a web browser) to access and initiate a connection, such as a progressive web application or other software client capable of connecting to the network security device via API, SSH or other user interface.

In the illustrated and described example, the network security device 110 both handles and implements the enrollment process, and acts as a portal for providing access to an internal network. In accordance with one or more preferred implementations, a separate enrollment server, service, or platform may be utilized. In accordance with one or more preferred implementations, a network security device provides routing functionality, network address translation (NAT) functionality, firewall functionality, port forwarding functionality, and innovative functionality as disclosed herein. In accordance with one or more preferred implementations, some or all of this functionality may be handled by separate devices. In accordance with one or more preferred implementations, a network security device may communicate with other devices, such as a router, to implement methodologies disclosed herein. In accordance with one or more preferred implementations, a network security device is a router. In accordance with one or more preferred implementations, a network security device is a specially configured device with hardware and software designed to implement routing functionality, network address translation (NAT) functionality, firewall functionality, port forwarding functionality, and innovative functionality disclosed herein.

Figure 16:
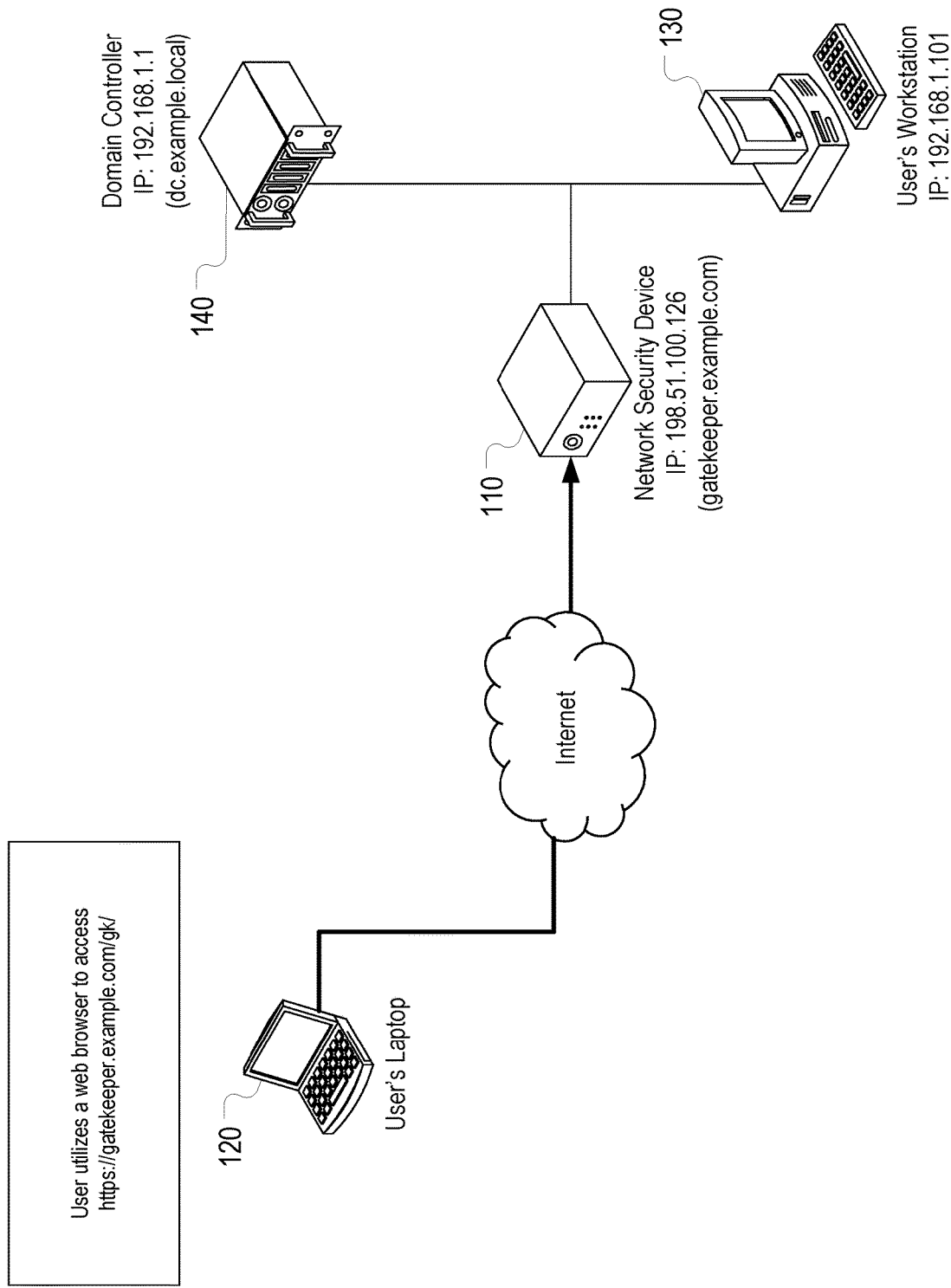
FIG. 16 illustrates a user utilizing a web browser to access a URL and connect to a network security device.
Figure 17:
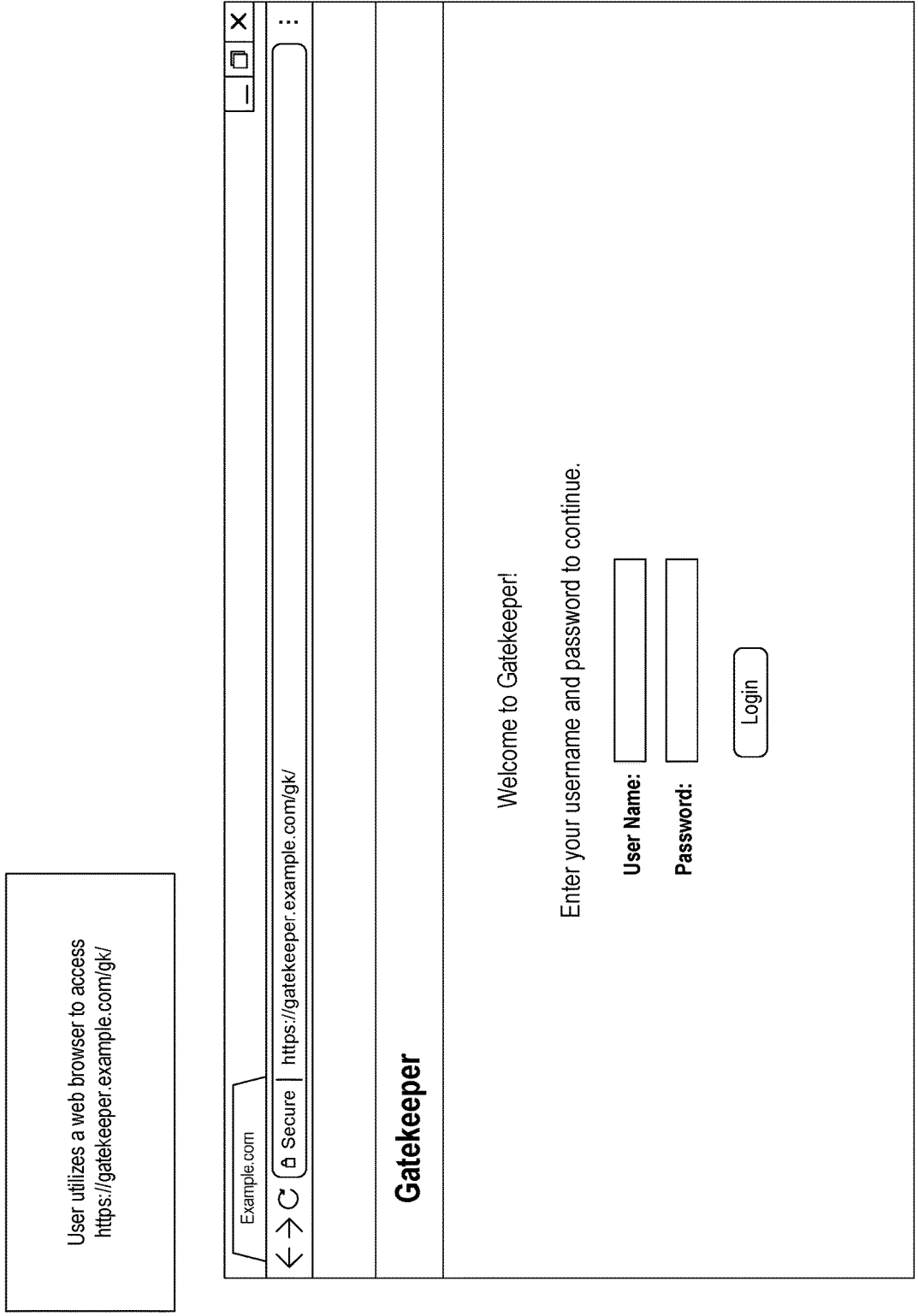
FIG. 17 illustrates an interface of a first authentication page of a network security system portal.

FIG. 16 illustrates a user utilizing a web browser to access the URL and connect to the network security device 110, and FIG. 17 illustrates an interface of a first authentication page of a network security system portal presented to the user upon accessing the URL, which prompts the user to login. In accordance with one or more preferred implementations, the URL represents a web address which resolves via a Domain Name System (DNS) lookup utilizing a DNS server to an IP address of the network security device, in this case 198.51.100.126. In accordance with one or more preferred implementations, the URL specifies a port (in this case 443).

Figure 18:
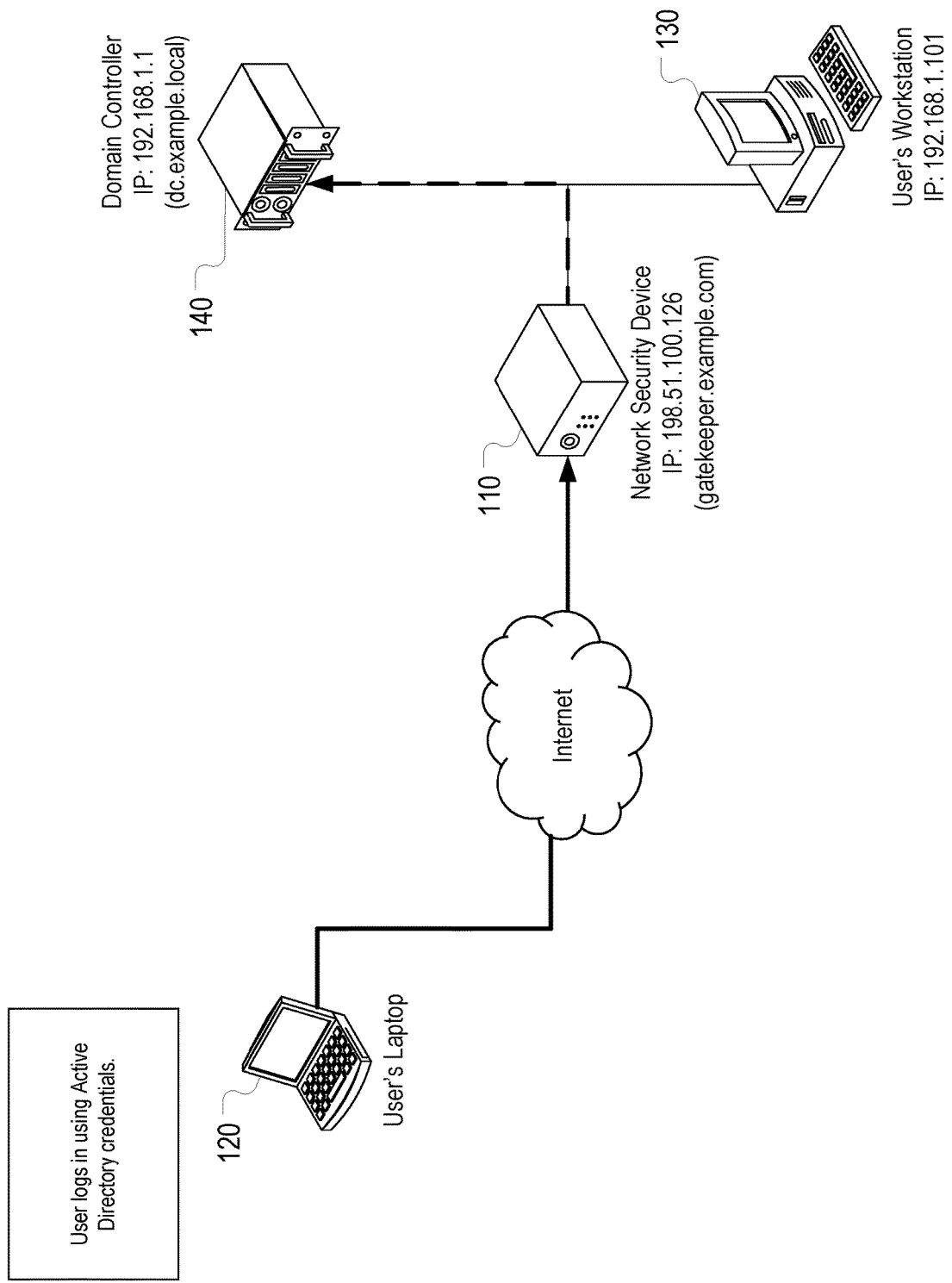
FIG. 18 illustrates use of a domain controller to authenticate a user who logs in using Active Directory credentials.

Utilizing his or her laptop 120 and the interface of the first authentication page loaded in the web browser, the user logs in with his or her AD credentials, i.e. a user name and password. Data representing this user input is communicated from the user's laptop 120 to the network security device 110 via the internet, and is used to confirm the input credentials based on credentials stored at or accessible by the domain controller 140, as illustrated in FIG. 18 (preferably, the network security device 110 does not store or save AD credentials). In accordance with one or more preferred implementations, AD credentials provided by a user are received at the network security device 110, and then forwarded to the domain controller 140 for authentication. In accordance with one or more preferred implementations, AD credentials provided by a user are received at a network security device which is configured to validate AD credentials without communication with a domain controller. In accordance with one or more preferred implementations, credentials other than AD credentials may be utilized, which may be validated by a network security device, a domain controller, or another device on the internal network or elsewhere (e.g. a device accessible via the Internet or a cloud device).

Figure 19:
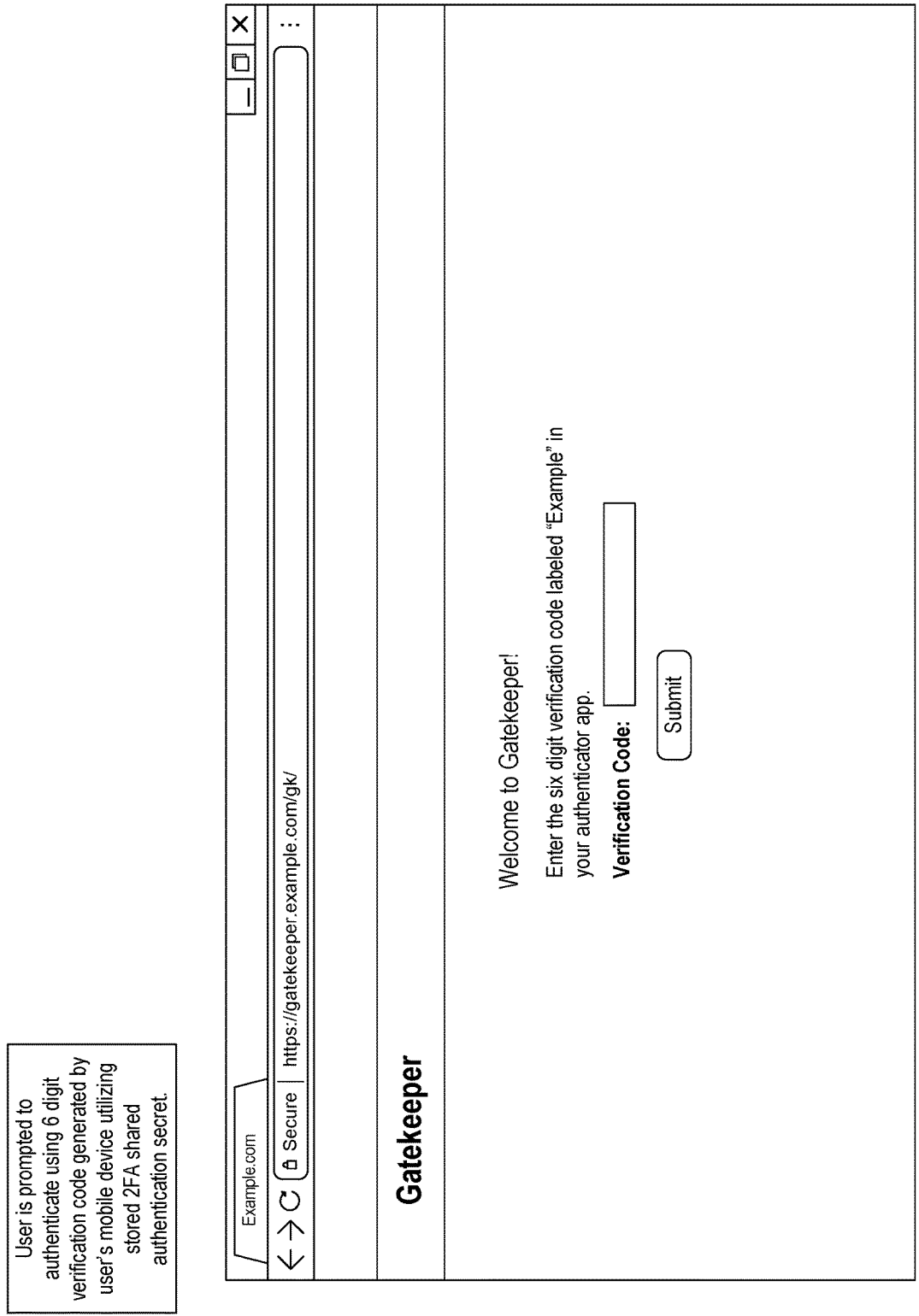

After the user's AD credentials have been validated, an interface of a second authentication page of the network security system portal is presented which prompts the user to input a second factor authentication verification code to confirm his or her identify, as illustrated in FIG. 19.

Figure 20A:
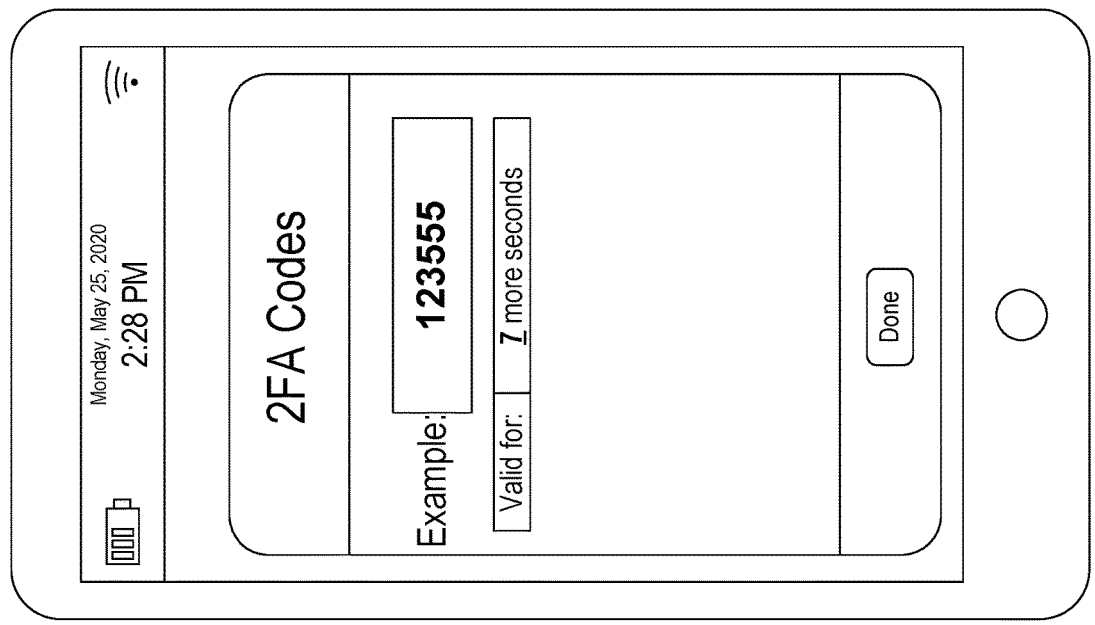

The user opens the second factor authentication app loaded on his or her mobile device 170 that he or she previously configured for use with the network security system, and utilizes the second factor authentication app to obtain the current verification code for authenticating with the network security system portal, as illustrated in FIG. 20A. As detailed above, the second factor authentication app is configured to utilize an algorithm to generate pseudo-random fixed-length codes based on the stored second factor authentication secret or token and a current time. These pseudo-random fixed-length codes represent continually changing second factor authentication verification codes that can be used to authenticate the holder of the secret or token.

Figure 20B:
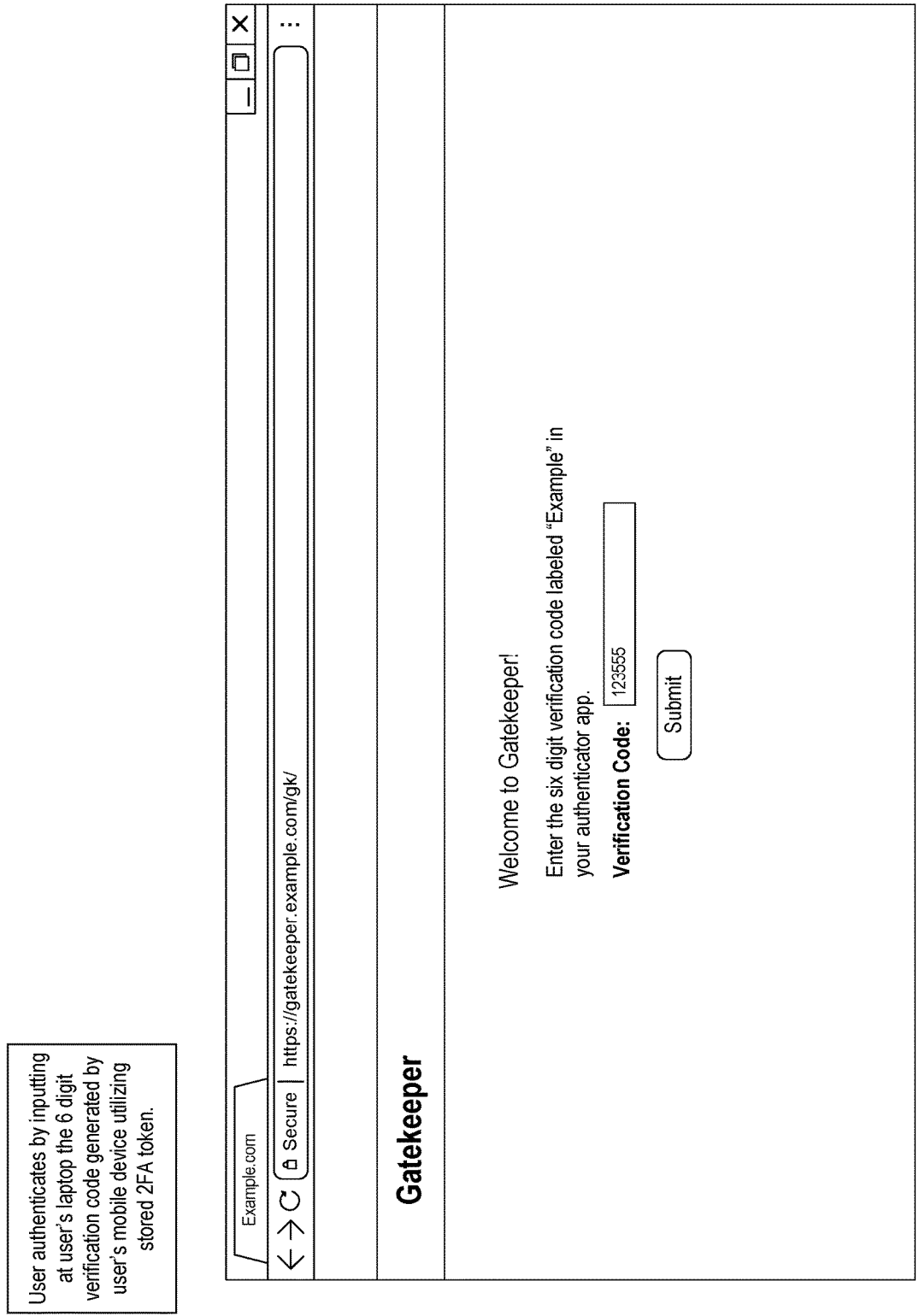

The user authenticates by inputting, at his or her laptop 120, the current verification code into the appropriate input field of the network security system portal page displayed in the web browser, as illustrated in FIG. 20B.

Figure 21A:
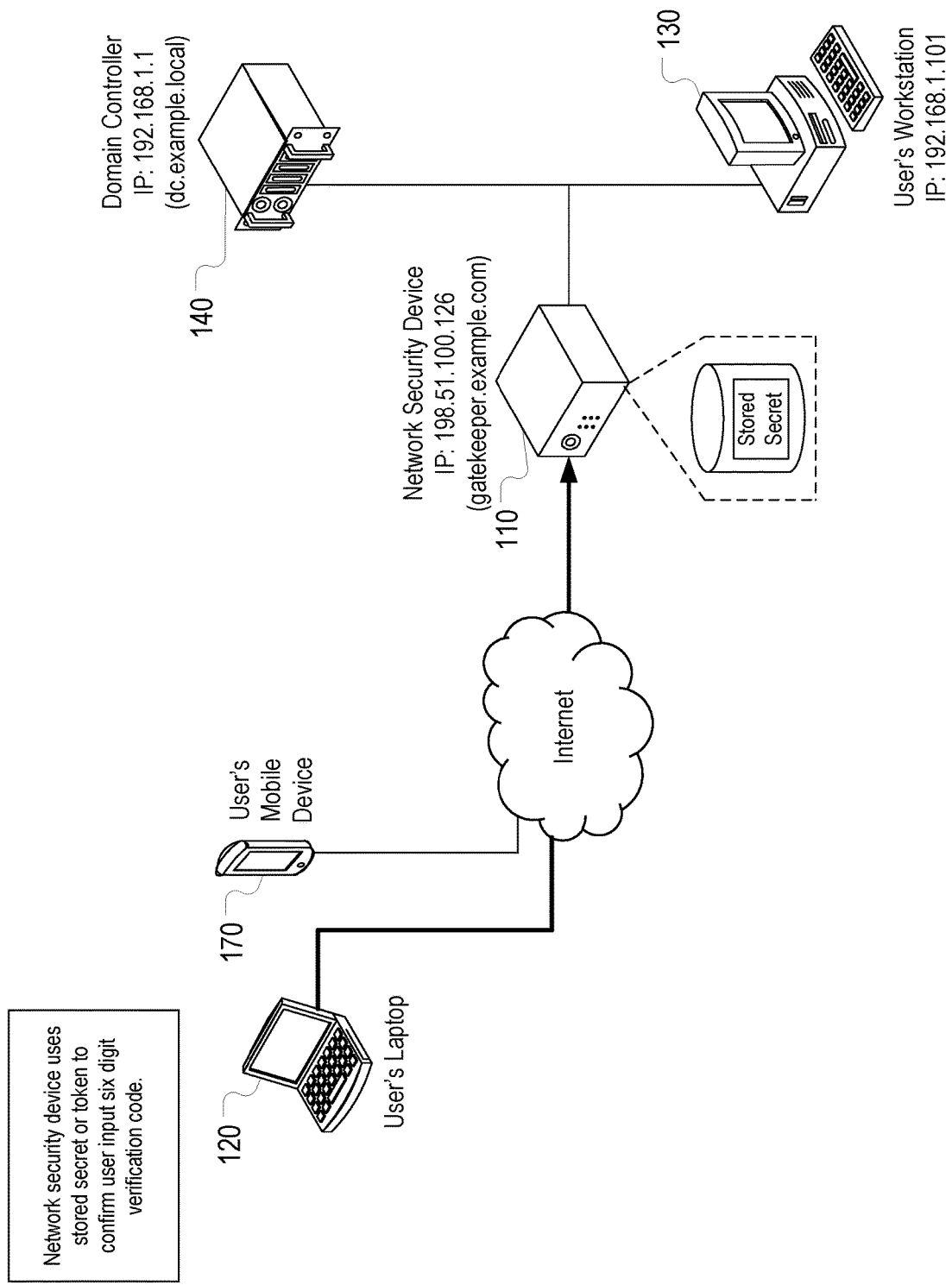

In accordance with one or more preferred implementations, the network security device 110 validates the received verification code based on a stored secret or token associated with the user, as exemplarily illustrated in FIG. 21A.

Figure 21B:
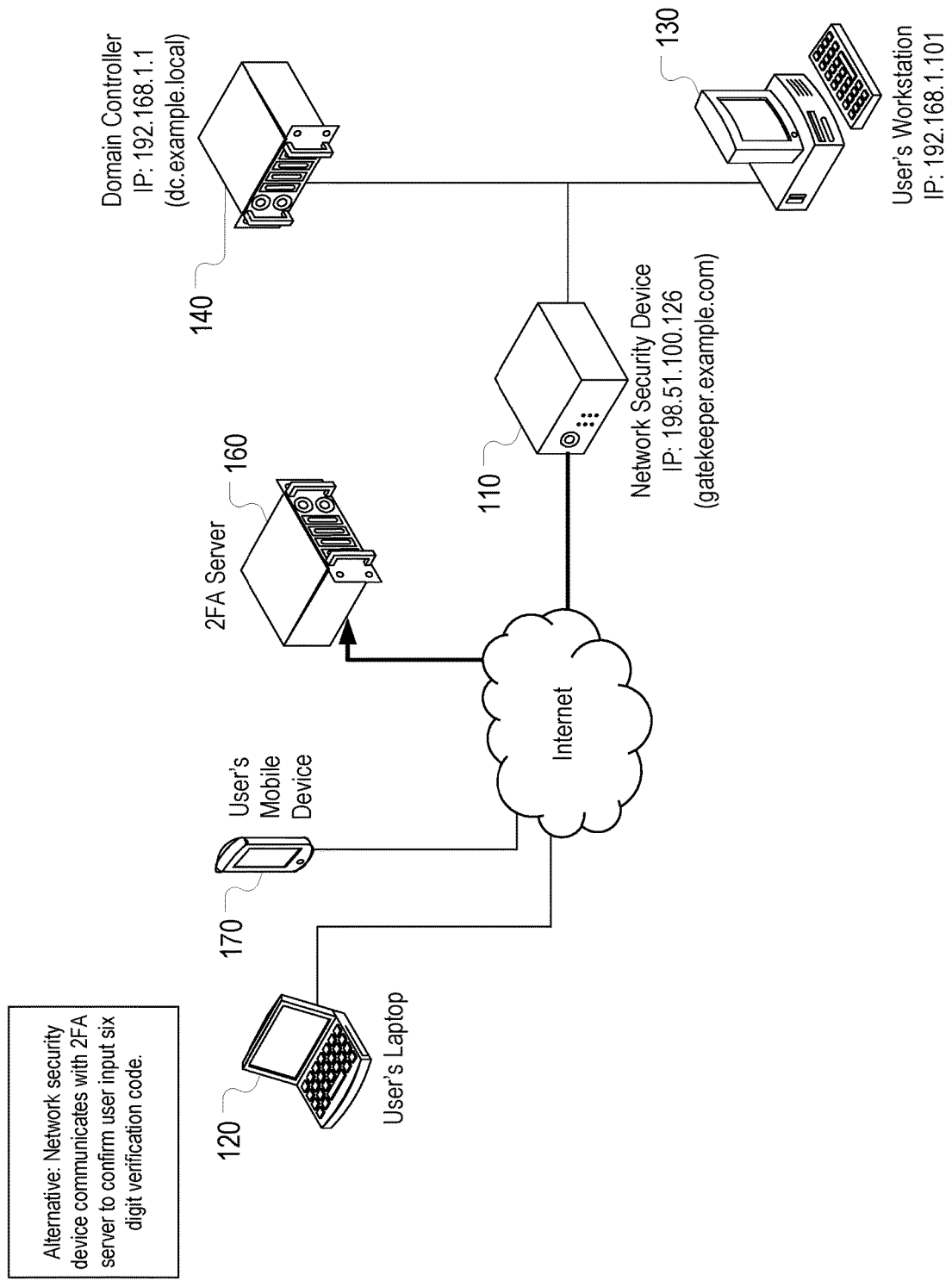
FIG. 21B illustrates an alternative second factor authentication process.

Alternatively, in accordance with one or more preferred implementations, a second factor authentication server might be involved in the process. In accordance with one or more such preferred implementations, when second factor authentication is set up, the second factor authentication server sends a secret or token to both the user's mobile device 170 and the network security device 110 or an associated server, thus allowing the network security device 110 or an associated server to subsequently validate a received verification code without having to again communicate with the second factor authentication server. Or, in accordance with one or more such preferred implementations, the network security device 110 communicates with a second factor authentication server 160 to validate an input verification code, as illustrated in FIG. 21B. This might involve, for example, communicating an indication of the user desiring to authenticate and an indication of the received verification code and receiving back an indication of whether the verification code authenticates the user.

In accordance with one or more preferred implementations, a second factor authentication methodology might involve communication of a verification code to a user via a text message, email, or phone call. In accordance with one or more preferred implementations, a user may login with a user name, at which point a system may automatically look up a verification code and send it to the user via text or email. In accordance with one or more preferred implementations, an authentication service such as Twilio is utilized.

Figure 22:
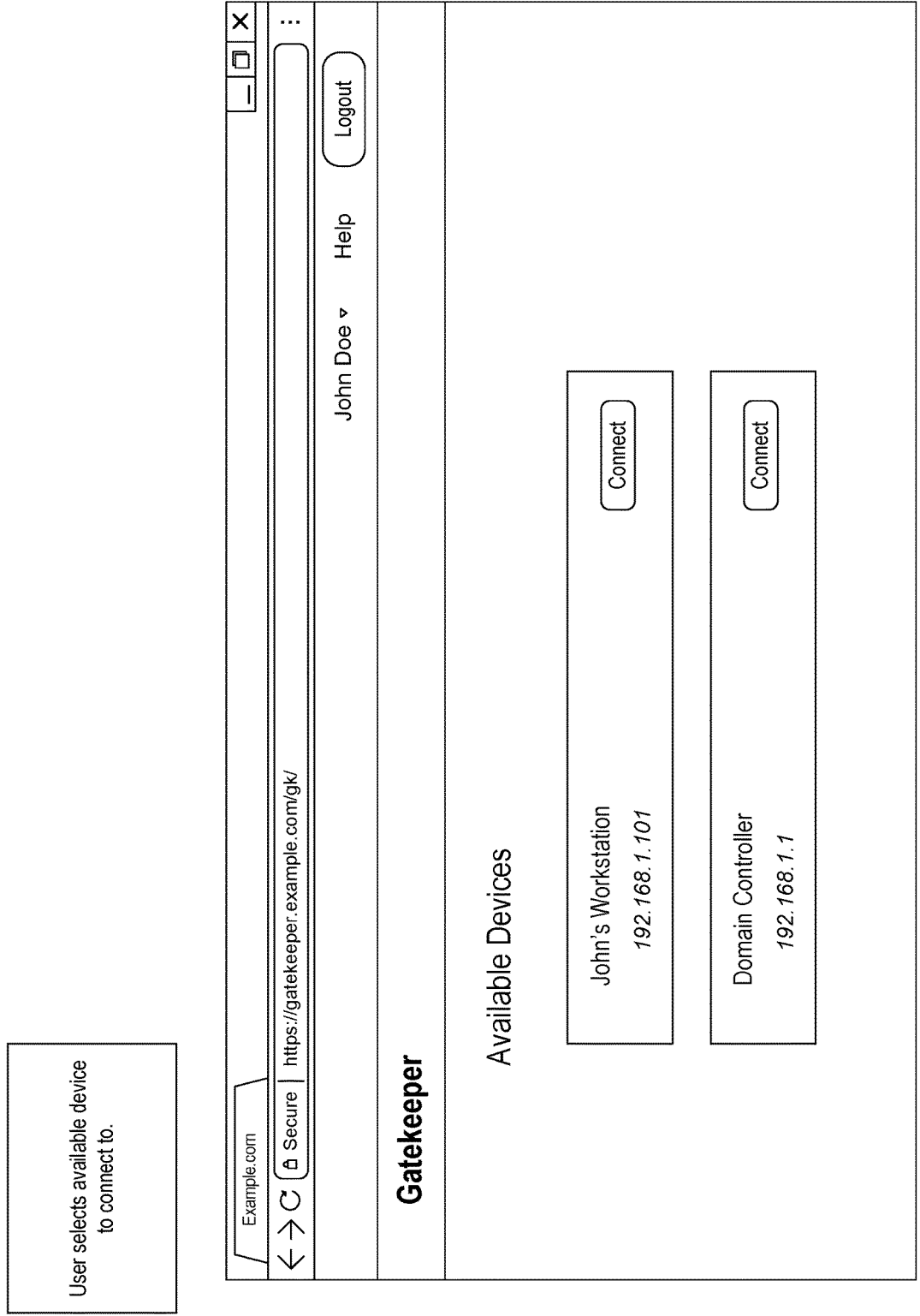

After the user successfully authenticates with both his or her AD credentials and the second factor authentication verification code, the network security device 120 determines available devices on the internal network that the user can connect to, and the network security system portal presents, to the user in the web browser running on his or her laptop 120, an interface allowing the user to select an available device, as illustrated in FIG. 22.

As described in more detail hereinbelow, in accordance with one or more preferred implementations, the availability of devices to connect to is determined based at least in part on network security system rules maintained for the network security system portal at the network security device 120. These maintained network security system rules are distinct from maintained port forwarding rules and instead can be utilized to enable the automatic creation of dynamic one-time port forwarding rules for an authorized user's current IP address following two factor authentication of the authorized user.

Returning to the example of FIG. 22, the user can select one of the available devices to connect to, such as the user's laptop 130, which is identified as "John's Workstation" in the interface of the network security system portal displayed to the user in the web browser running on his or her laptop 120.

Figure 23A:
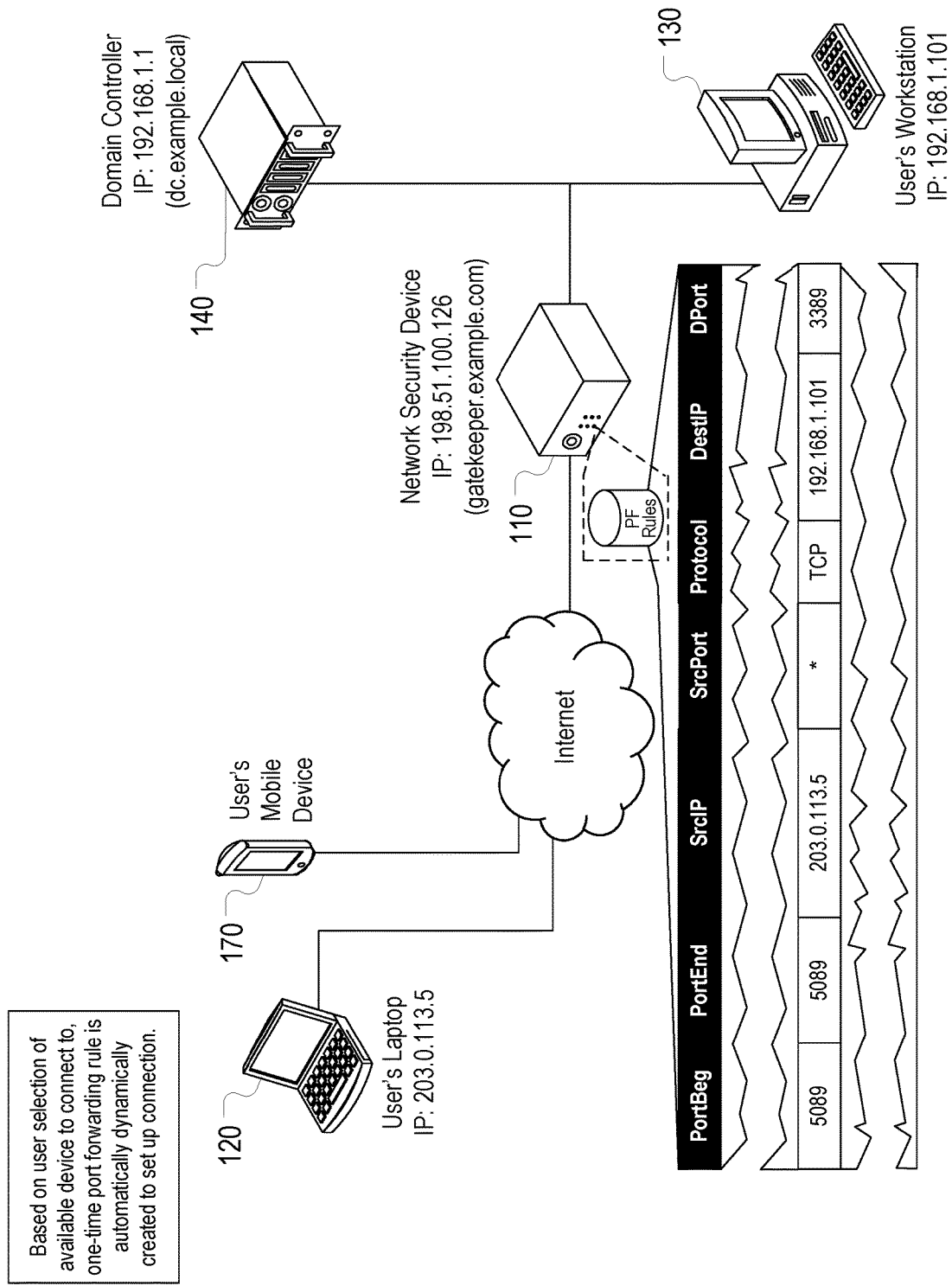

Based on user selection of an available device to connect to, a one-time (or "once") port forwarding rule is automatically dynamically created at the network security device 110 to set up a connection, as illustrated in FIG. 23A. In particular, a port forwarding rule is created that TCP packets received at a particular WAN interface having a source IP address of 161.32.41.5 and a destination address and port of 198.51.100.126 port 5089 are forwarded, or redirected, to 192.168.1.101 port 3389. This is a one-time port forwarding rule which is to be deleted once a connection has been established using this rule. (In accordance with one or more preferred implementations, such a one-time port forwarding rule will instead be deleted once a connection has been initiated using a rule, even if it has not been fully established.)

Figure 23C:
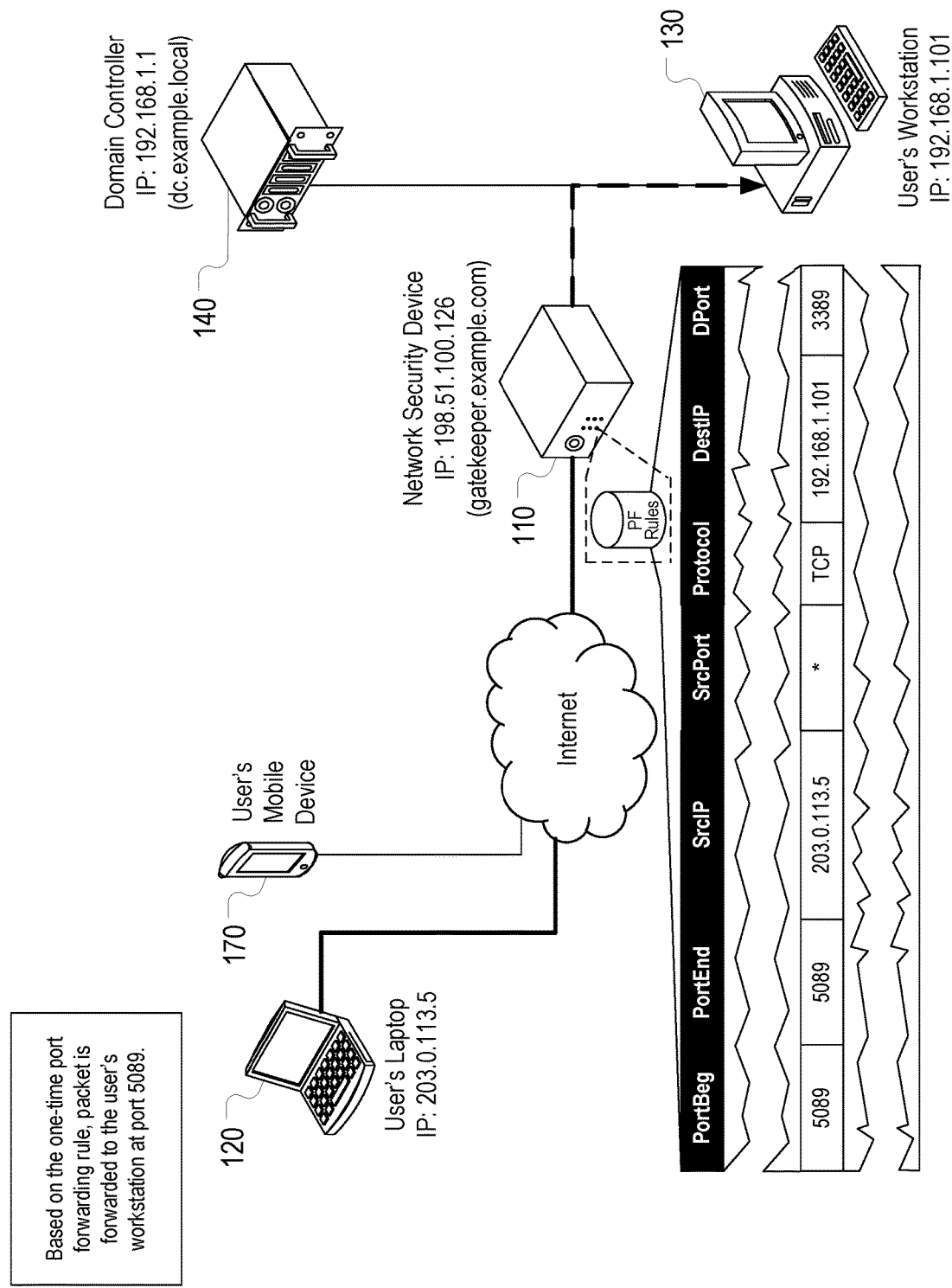

Thereafter, the user's laptop 120 sends an initial SYN packet to the network security device 110 to set up a TCP connection. FIG. 23B illustrates this SYN packet. The SYN flag is set to 1 to indicate that the packet is a first packet which is intended to initiate a TCP connection. The sequence number is set to a randomly selected sequence number. This SYN packet is received at the network security device 110, and based on the one-time port forwarding rule, the SYN packet is forwarded to the user's workstation 130, as illustrated in FIG. 23C. In particular, the network security device modifies the packet header of the SYN packet to update the destination IP address based on the one-time port forwarding rule, as illustrated in FIG. 23D.

Figure 23E:
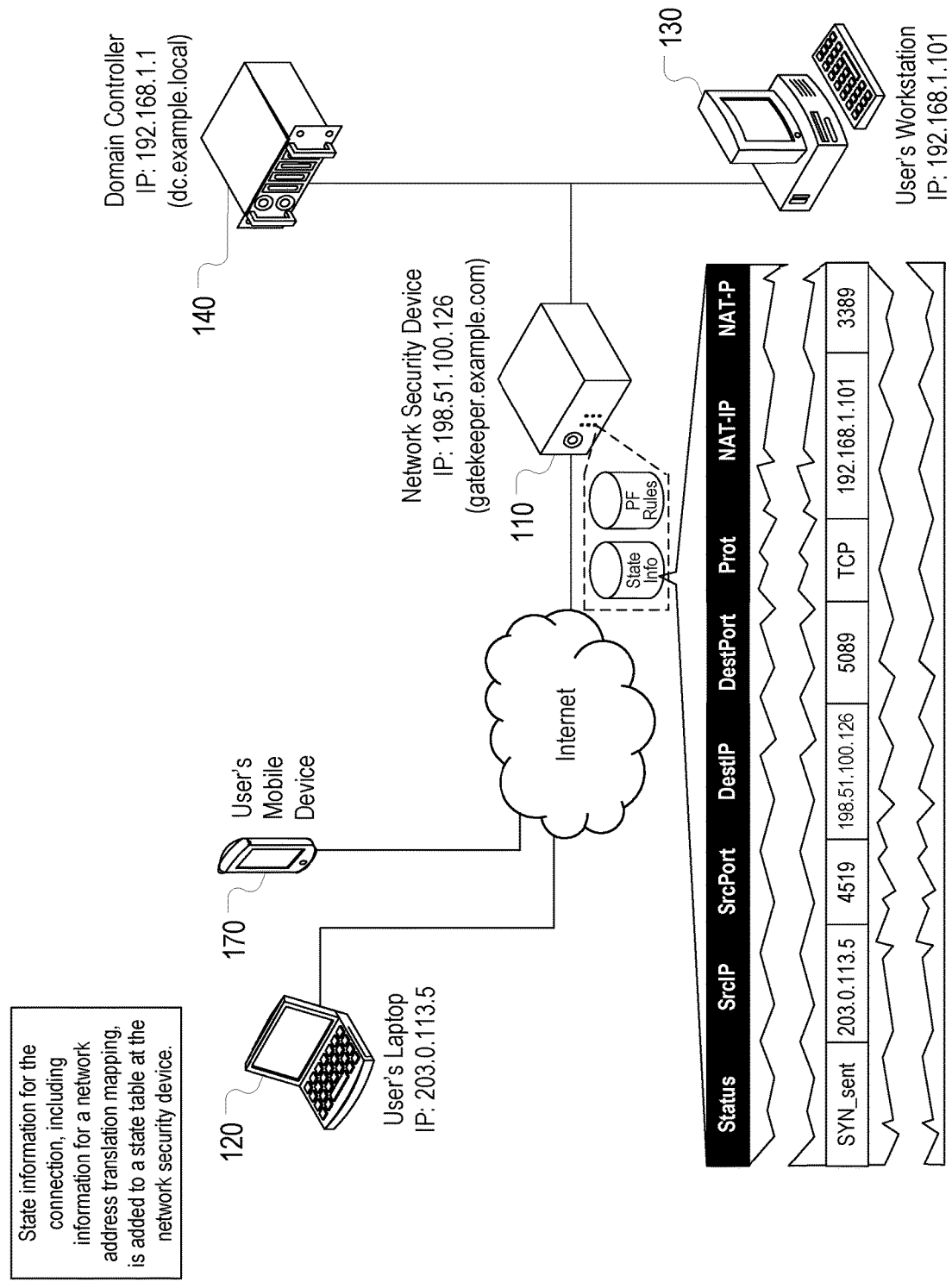

State information for the connection, including information for a network address translation mapping, is added to a state table at the network security device 120, as illustrated in FIG. 23E. A status (or state) of the connection is set to "SYN sent", to indicate that an initial SYN packet has been sent to initiate set up of a TCP connection, but the three-step handshake to do so has not been completed to establish the connection. For protocols without such a bidirectional handshake to establish a connection, such as UDP, the network security device 120 will set the status to "Established" without waiting to receive any subsequent packets.

Figure 23G:
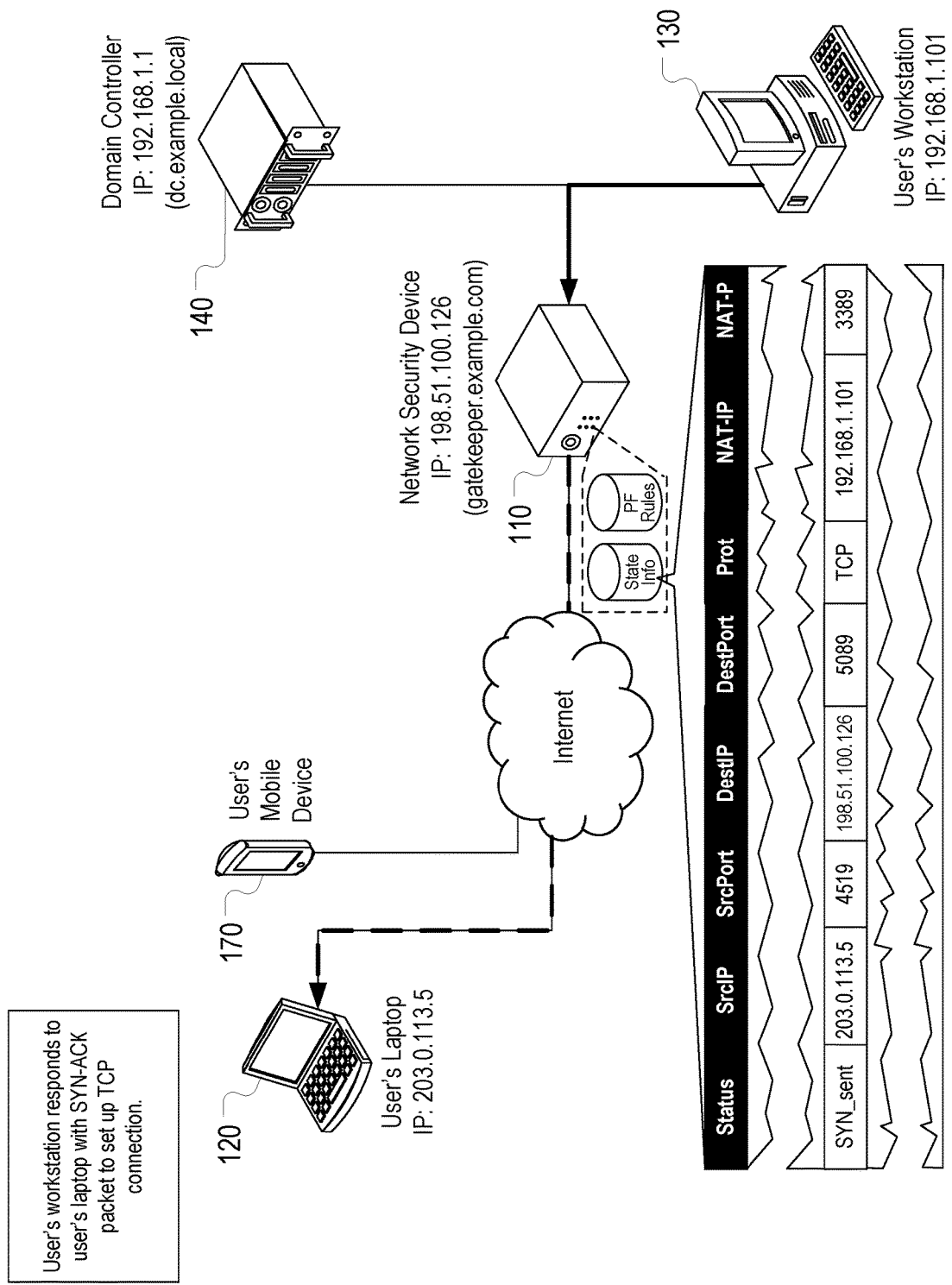

The user's workstation receives the SYN packet, and responds with a SYN-ACK packet as a second step of a three-step handshake to set up the TCP connection, as illustrated in FIG. 23G. FIG. 23F illustrates this SYN-ACK packet. The SYN flag and the ACK flag are both set to 1 to indicate that the packet is the second step of a three-step handshake to set up the TCP connection. The sequence number of the packet is set to a randomly selected number. The acknowledgment number is set to one higher than the sequence number of the received SYN packet. The network security device 110 modifies the packet header of the SYN-ACK packet to replace the source IP address with its own IP address.

Figure 23J:
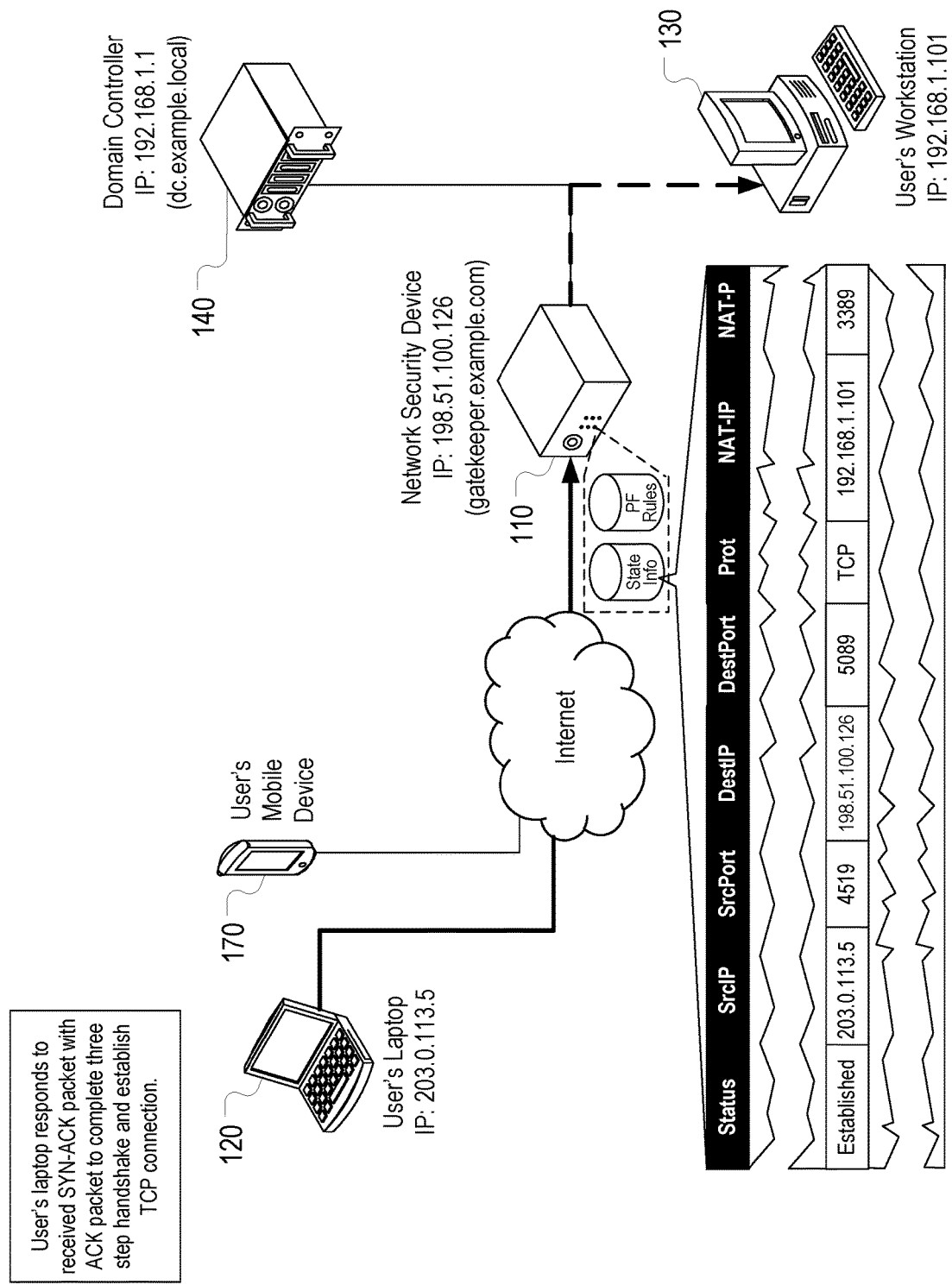

The user's laptop receives the SYN-ACK packet and responds with an ACK packet to complete the three-step handshake and set up the TCP connection, as illustrated in FIG. 23j. FIG. 23I illustrates this SYN-ACK packet. The SYN flag is set to zero and the ACK flag is set to 1 to indicate that the packet is the third step of the three-step handshake to set up the TCP connection. The sequence number of the packet is set to one higher than the sequence number of the original SYN packet, which is the same as the acknowledgment number of the received SYN-ACK packet. The acknowledgment number of the ACK packet is set to one higher than the sequence number of the received SYN-ACK packet.

When the ACK packet is received at the network security device 110, the network security device 110 determines that the three-step handshake has now been completed, and changes the status (or state) of the connection in the state table to "Established", as illustrated in FIG. 23J.

Figure 23K:
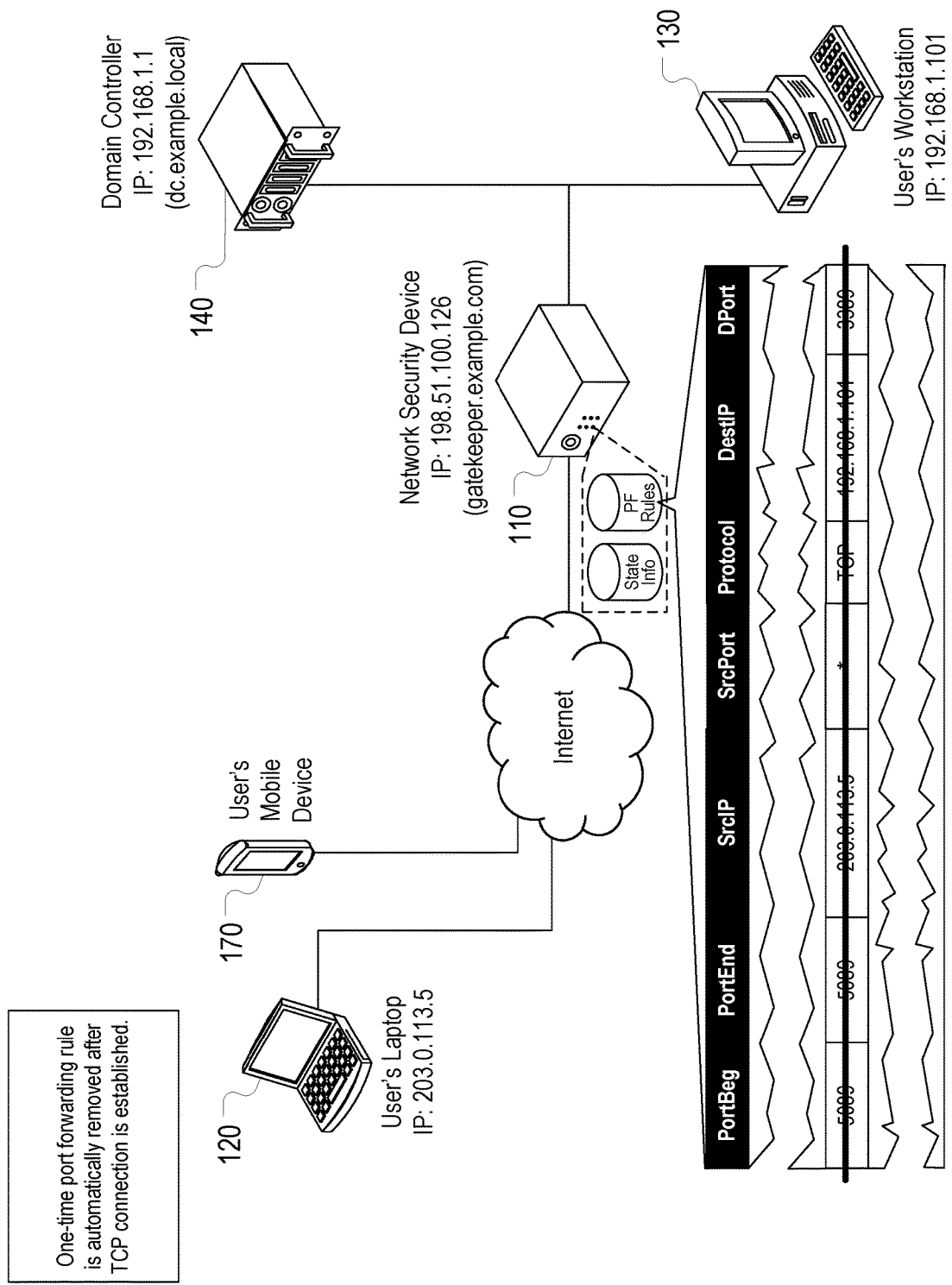

Upon determining that a connection has been established utilizing the one-time port forwarding rule, the network security device 110 automatically removes the one-time port forwarding rule, as illustrated in FIG. 23K. In accordance with one or more alternative preferred implementations, a one-time port forwarding rule is removed as soon as a connection is initiated by a first SYN packet, irrespective of whether the relevant protocol requires further packets to establish the connection.

Subsequently, when a packet sent by the user's laptop is received at the network security device 110, the network security device 110 determines whether the received packet matches an existing state or connection in its state table (if the received packet does not, the network security device 110 then determines whether the received packet matches an existing rule in its port forwarding rule table).

Figure 24B:
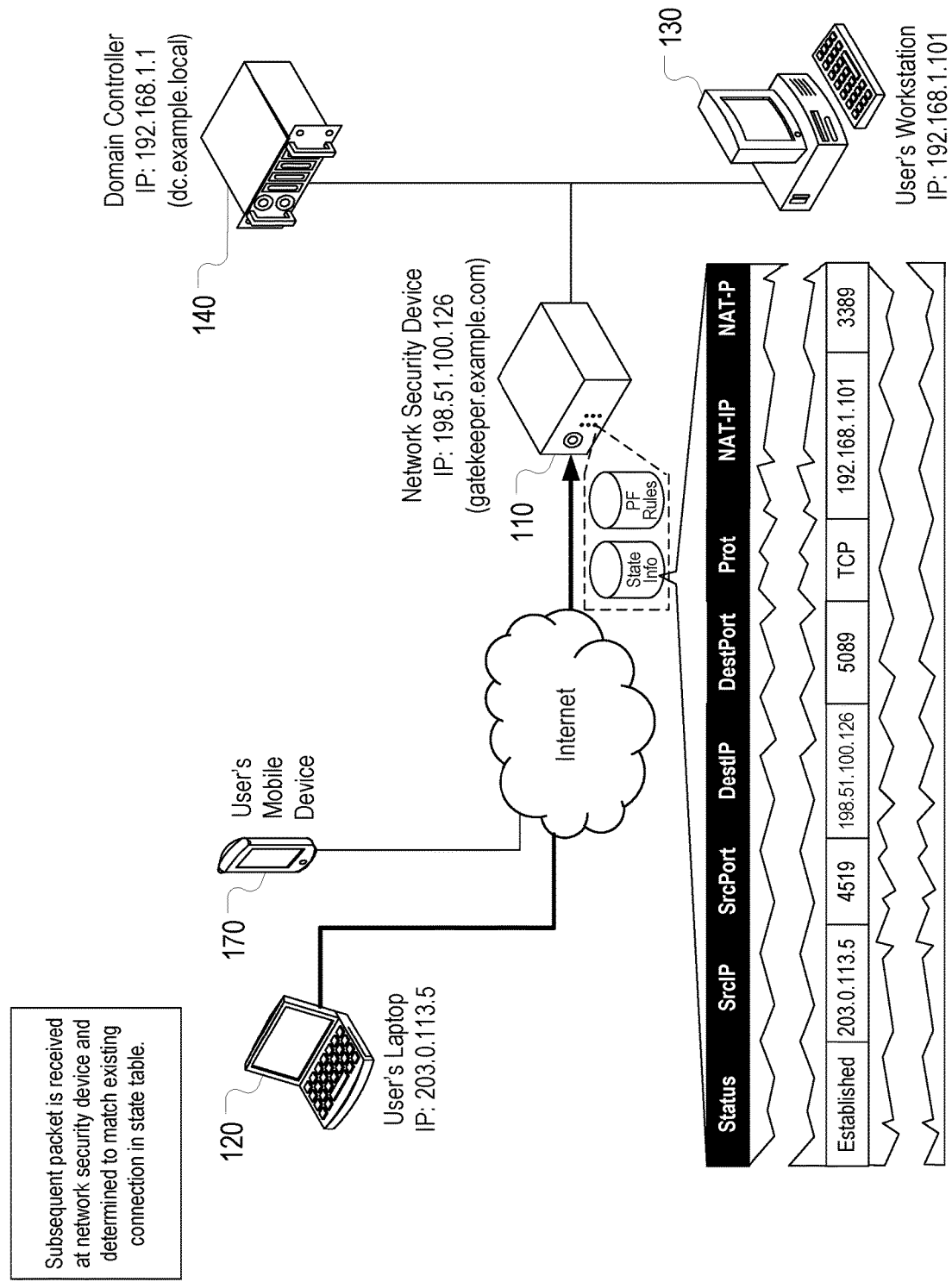
Figure 24C:
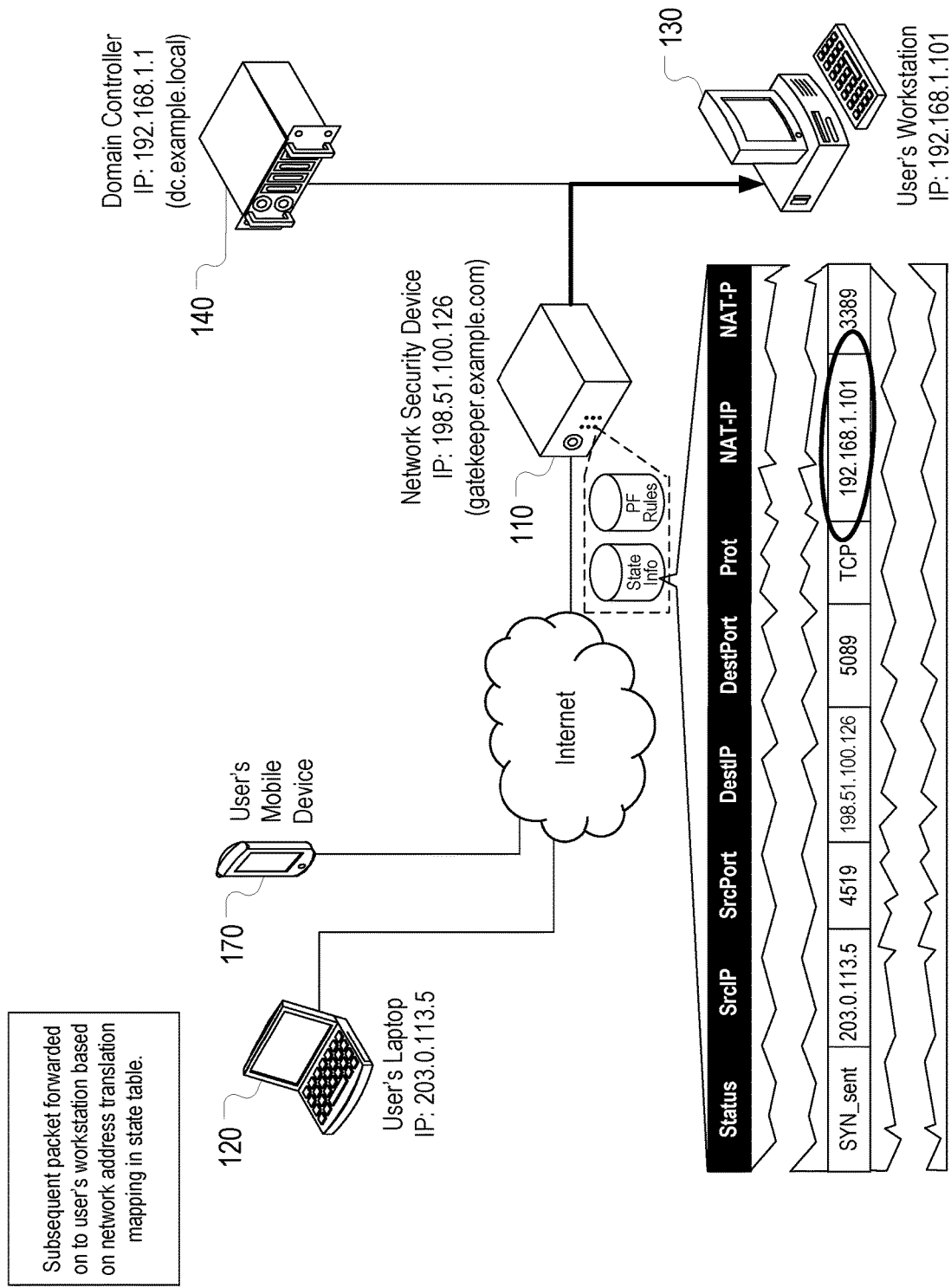

In this example, the subsequent packet illustrated in FIG. 24A sent from the user's laptop is received at the network security device 110, which determines that it matches an existing established connection in its state table, as illustrated in FIG. 24B. This subsequent packet is forwarded on to the user's workstation 130 based on the network address translation mapping in the state table. In particular, network address translation is applied by the network security device 110 to change the destination IP field in the IP header of the packet based on the NAT mapping in the state table for the established connection.

Figure 25A:
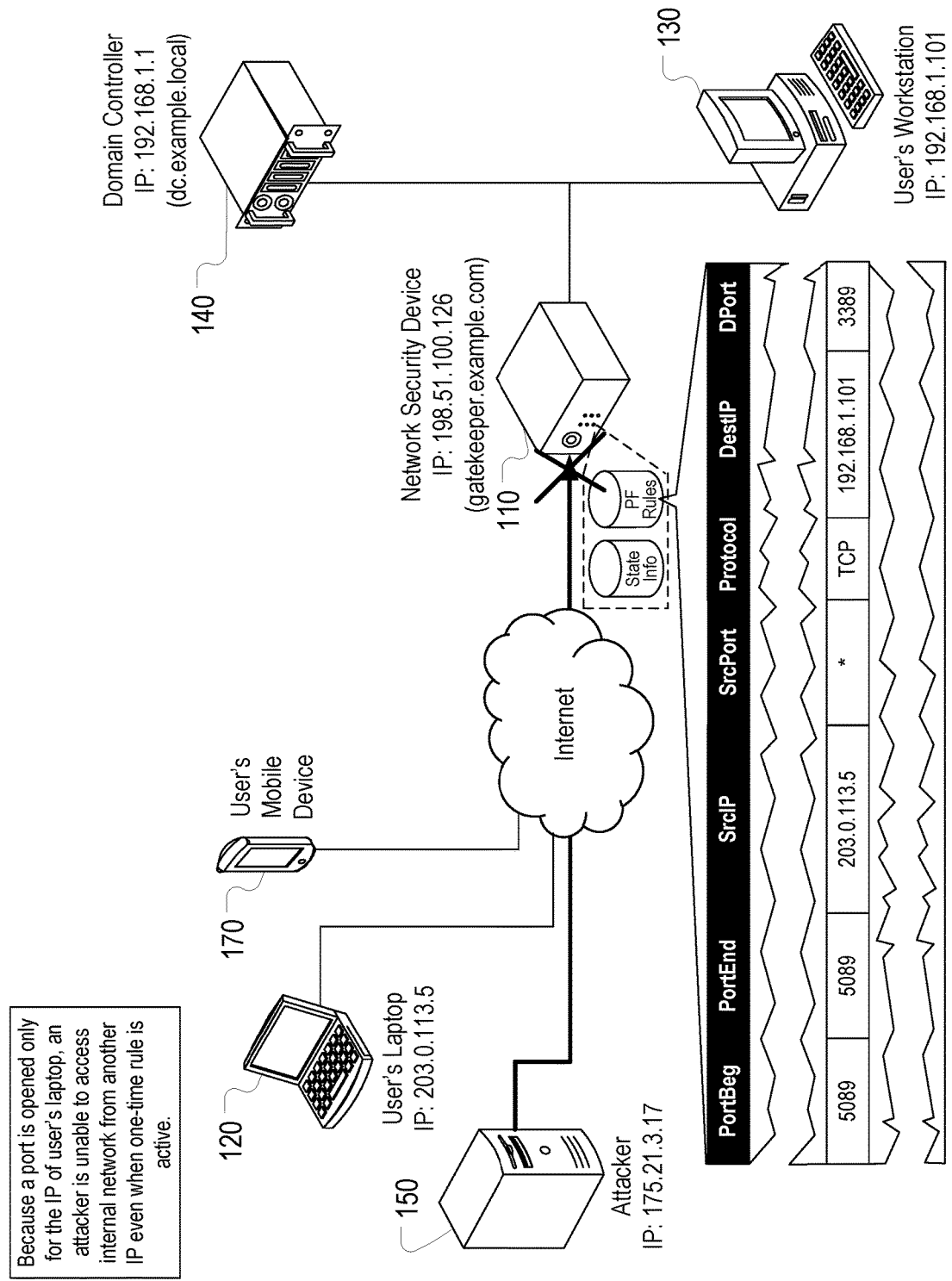
FIGS. 25A-B illustrate difficulties faced by an attacker.
Figure 25B:
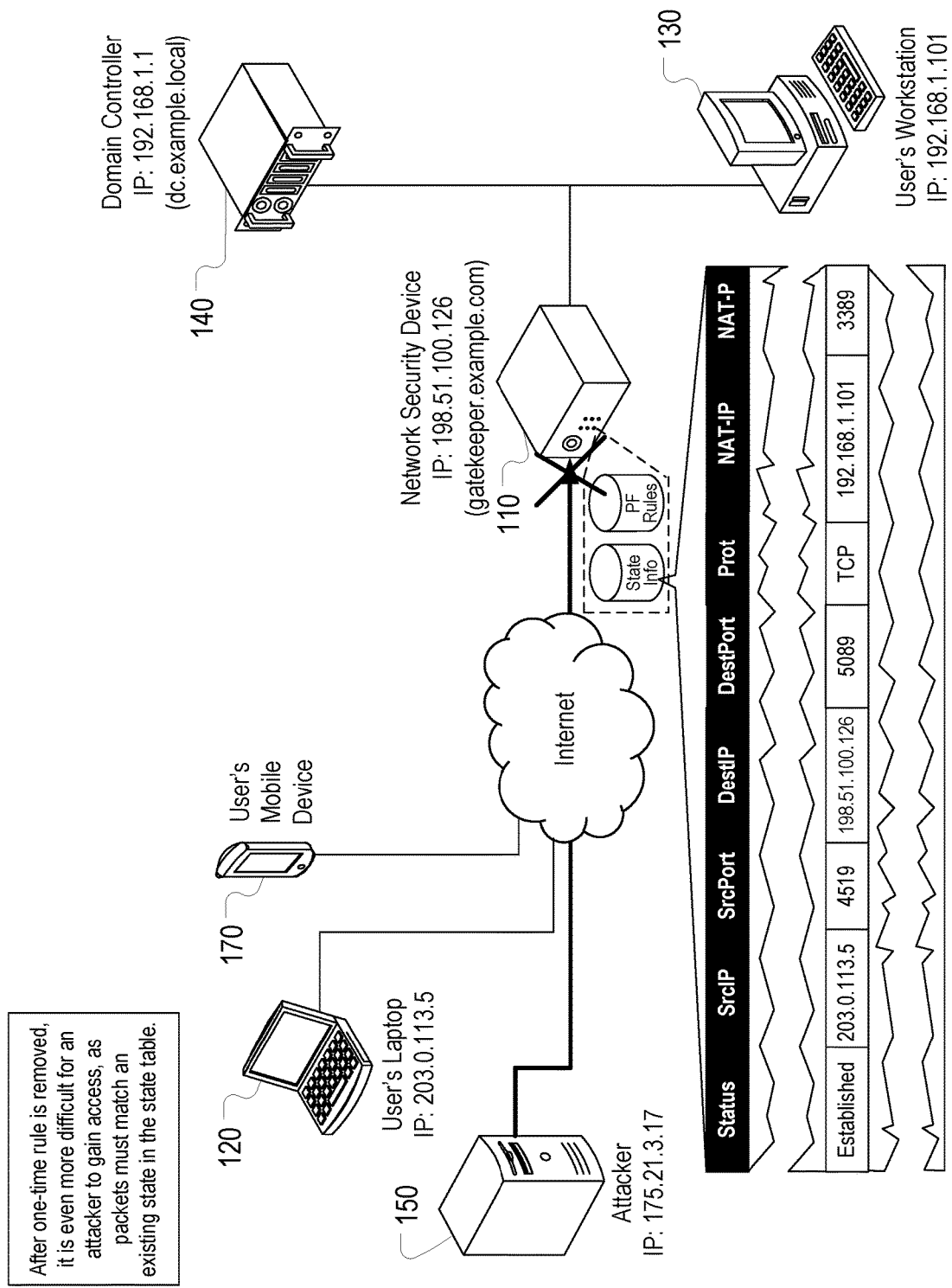

Importantly, because a one-time port forwarding rule at the network security device 110 is defined only for a particular source IP address of a user (in this case the IP address of the user's laptop), an attacker is unable to access the internal network from another IP address even when the one-time port forwarding rule is active, as illustrated in FIG. 25A. Moreover, the one-time port forwarding rule only lasts until a connection is established, and after the one-time port forwarding rule is removed it is even more difficult for an attacker to gain access because packets must match an existing state in the state table, as illustrated in FIG. 25B.

In accordance with one or more preferred implementations, destination port may be randomized.

In accordance with one or more preferred implementations, destination port may be specified, such as "443".

Figure 26:
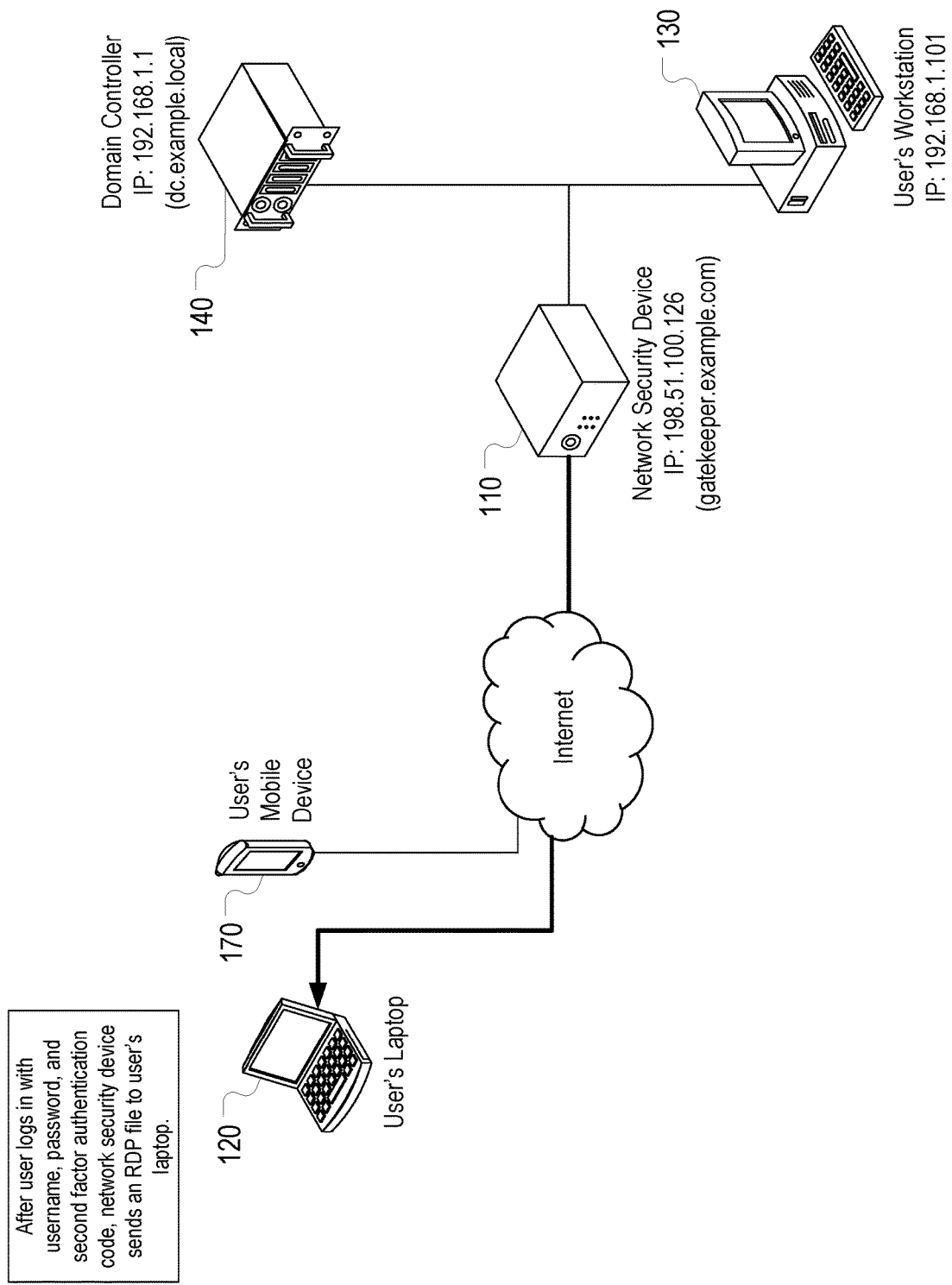
FIGS. 26-27 illustrates use of an RDP file to establish an RDP connection.
Figure 27:
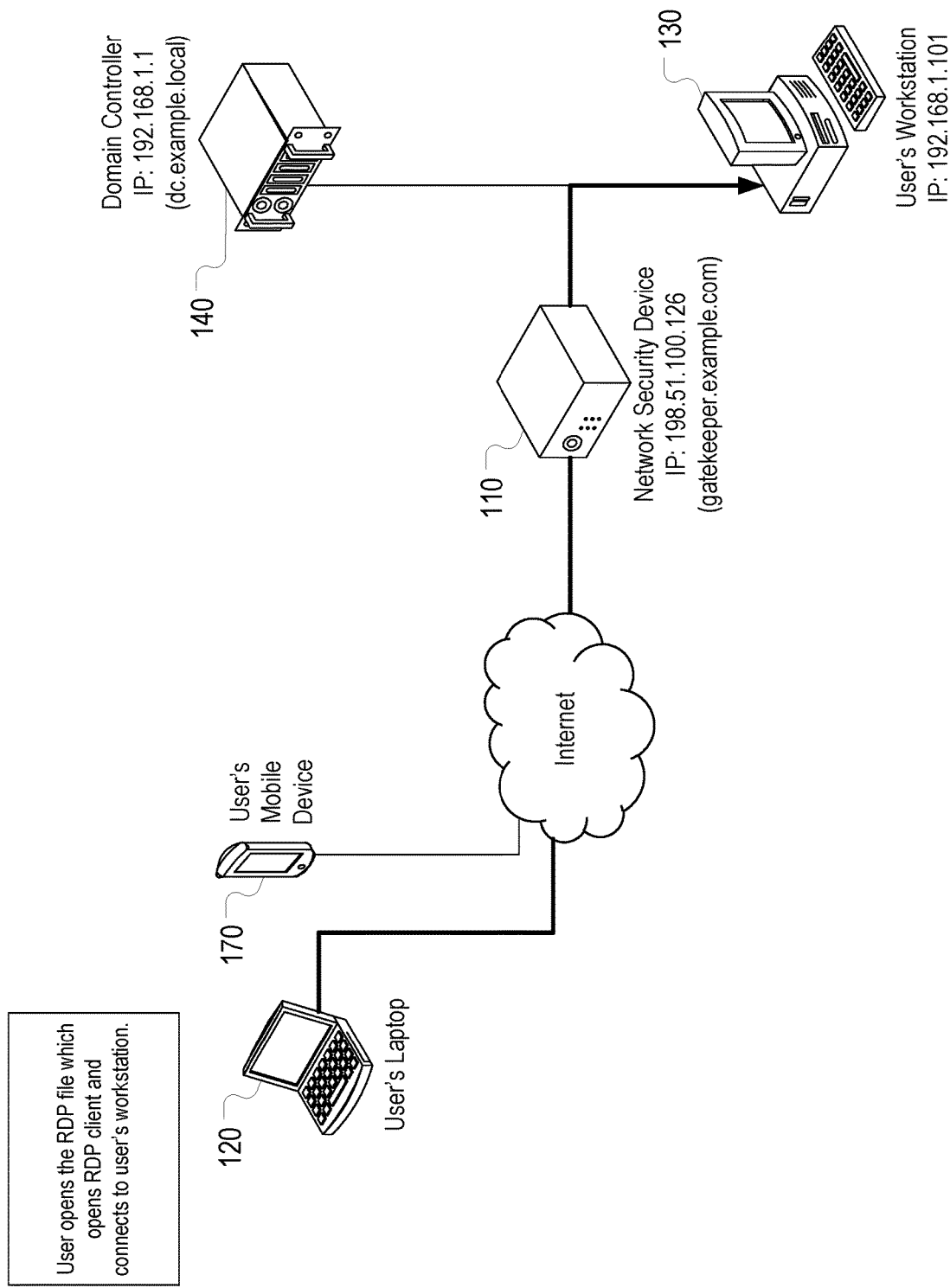

In accordance with one or more preferred implementations, a methodology in accordance with disclosure herein is utilized to set up a remote desktop protocol (RDP) connection over a TCP or UDP connection. For example, in accordance with one or more preferred implementations, after a user authenticates with a username, password, and second factor authentication verification code, the network security device 110 sends an RDP file to the user's laptop 120 which can be utilized to establish an RDP connection, as illustrated in FIG. 26. The user opens the RDP file which opens an RDP client on the user's laptop 120 that connects to the user's workstation 130, as illustrated in FIG. 27.

In accordance with one or more preferred implementations, RDP preferences can be saved for an RDP file.

Figure 28:
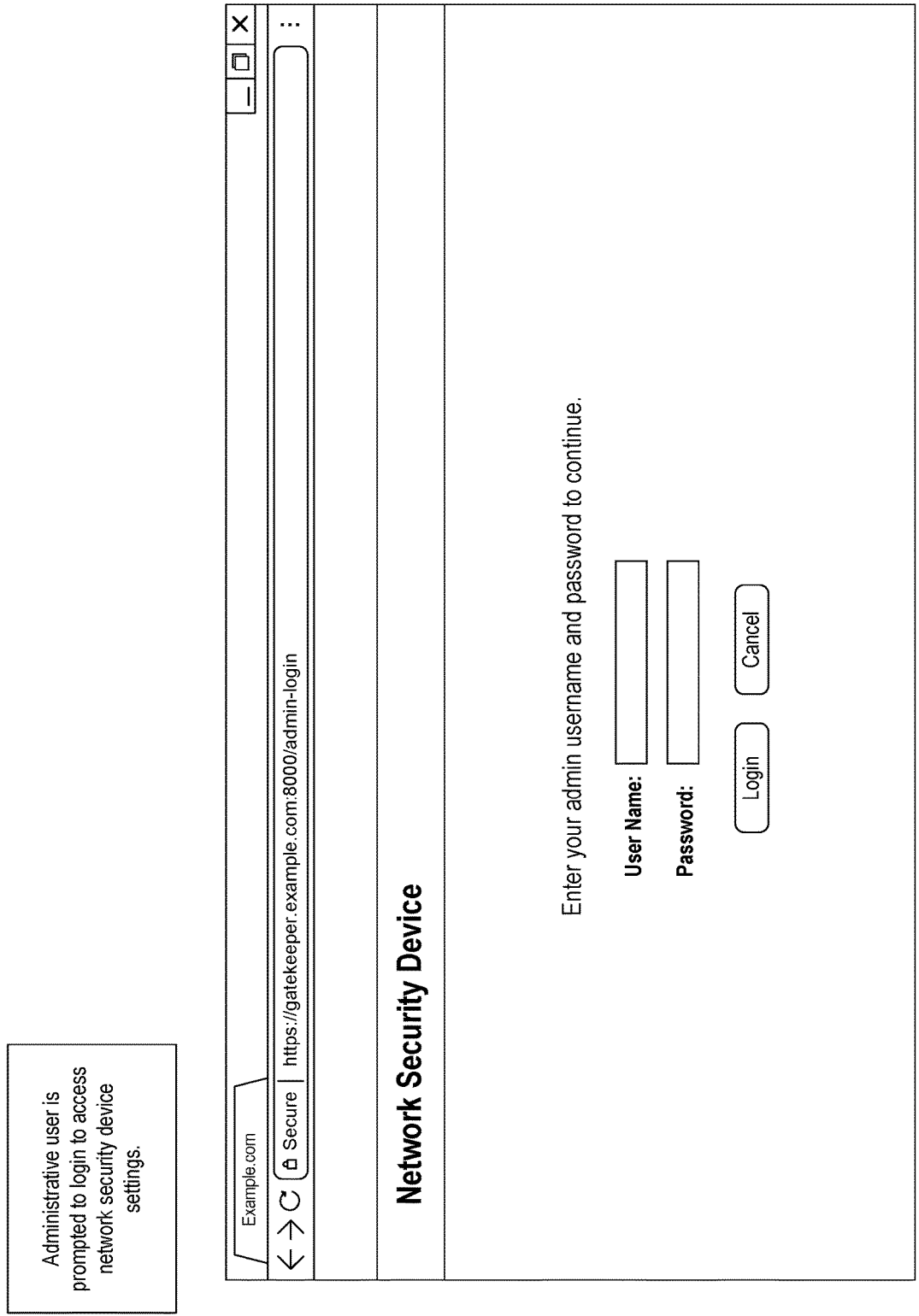

In accordance with one or more preferred implementations, a network security system includes an administrative site which can be accessed by an administrative user to configure settings for the network security system, e.g. settings for the network security device 110. FIG. 28 illustrates an exemplary administrative login page for an administrative site. Once an administrative user logs in (they may be prompted to authenticate with AD credentials, other credentials, and/or second factor authentication), he or she can view information on existing portals, such as the defined portal utilized in the example above to enable access to the user's laptop 130, as illustrated in FIG. 29.

This portal is named "Example DC", points to the server at dc.example.local at port 636, has an Active Directory domain of "example.local", and is accessible to end users at the previously noted URL of "https://gatekeeper.example.com/gk".

Figure 30:
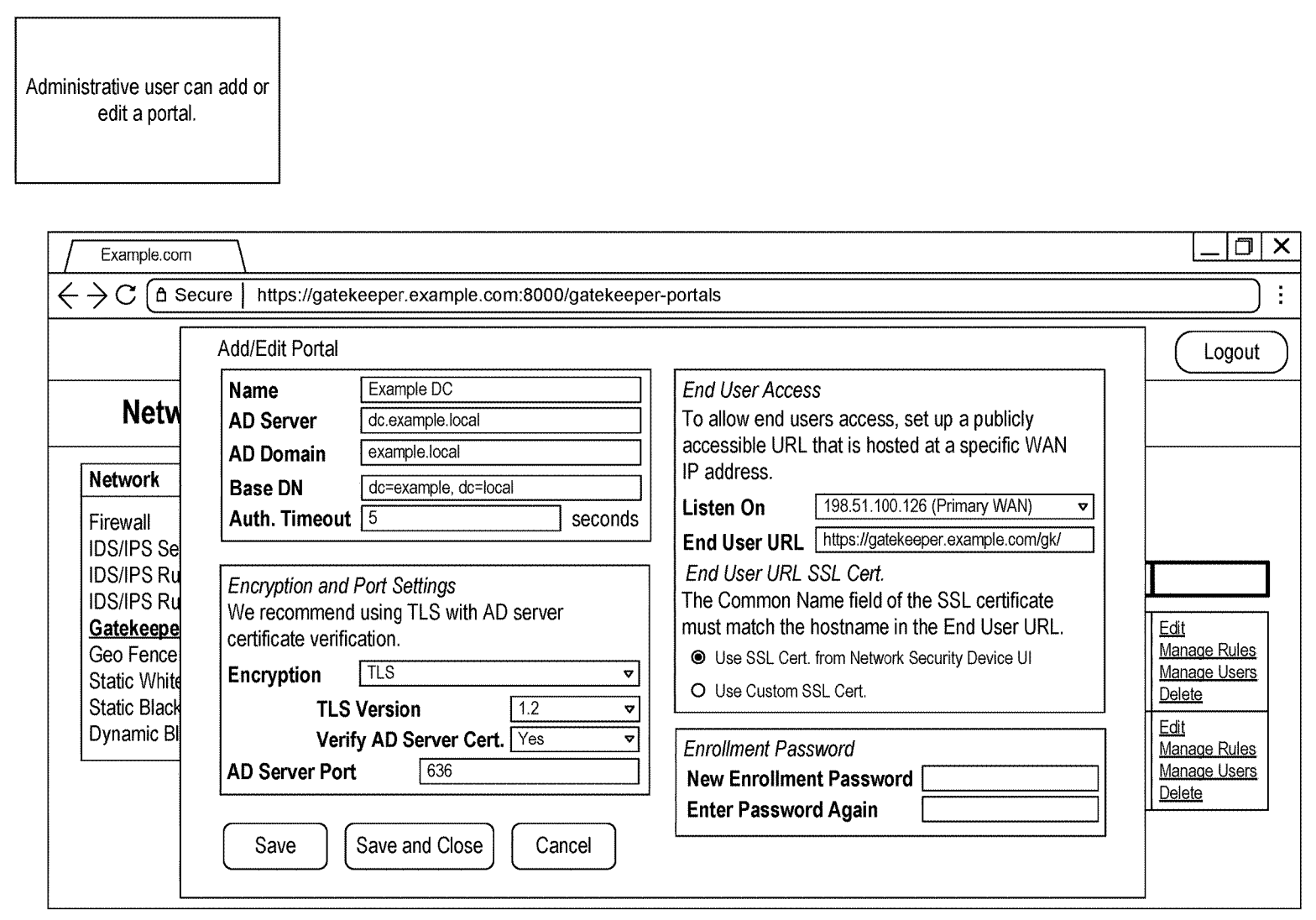

Via the administrative site, an administrative user can edit or delete existing portals, or add a new portal. FIG. 30 illustrates an exemplary interface for adding or editing a portal. An administrative user must specify a name, Active Directory server, Active Directory domain, base domain name, and an authentication timeout interval. An administrative user further can set up encryption and port settings, such as requiring TLS encryption, and requiring verification of an Active Directory server certificate. An administrative user further must specify a publicly accessible URL that is hosted at a specific WAN IP address to be set up as an end user URL. Lastly, an administrative user must set up an enrollment password.

Notably, a single network security device may be configured with multiple portals, which can provide access to various different devices to various different users. In this regard, each portal can be configured to set up the allowed users for that portal, where each portal is configured to operate in conjunction with the same authentication server or separate and distinct alternative authentication servers. In some cases, the authentication servers assigned to different portals may belong to different organizations or departments of the same organization. Further, an administrative user can send out invites to potential users associated with each portal and applicable authentication server to enroll with the network security system. An administrative user may add an enrolled or invited user to a portal to make them an allowed user for that portal.

Additionally, in accordance with one or more preferred implementations, via the administrative site, an administrative user may configure rules for a defined portal. A rule for a portal enables allowed users for that rule to connect to a particular host identified by an IP address and port, e.g. 192.168.1.101:3389 might be a defined host for an RDP connection for the user's laptop 130, as illustrated in FIG. 31.

Figure 32:
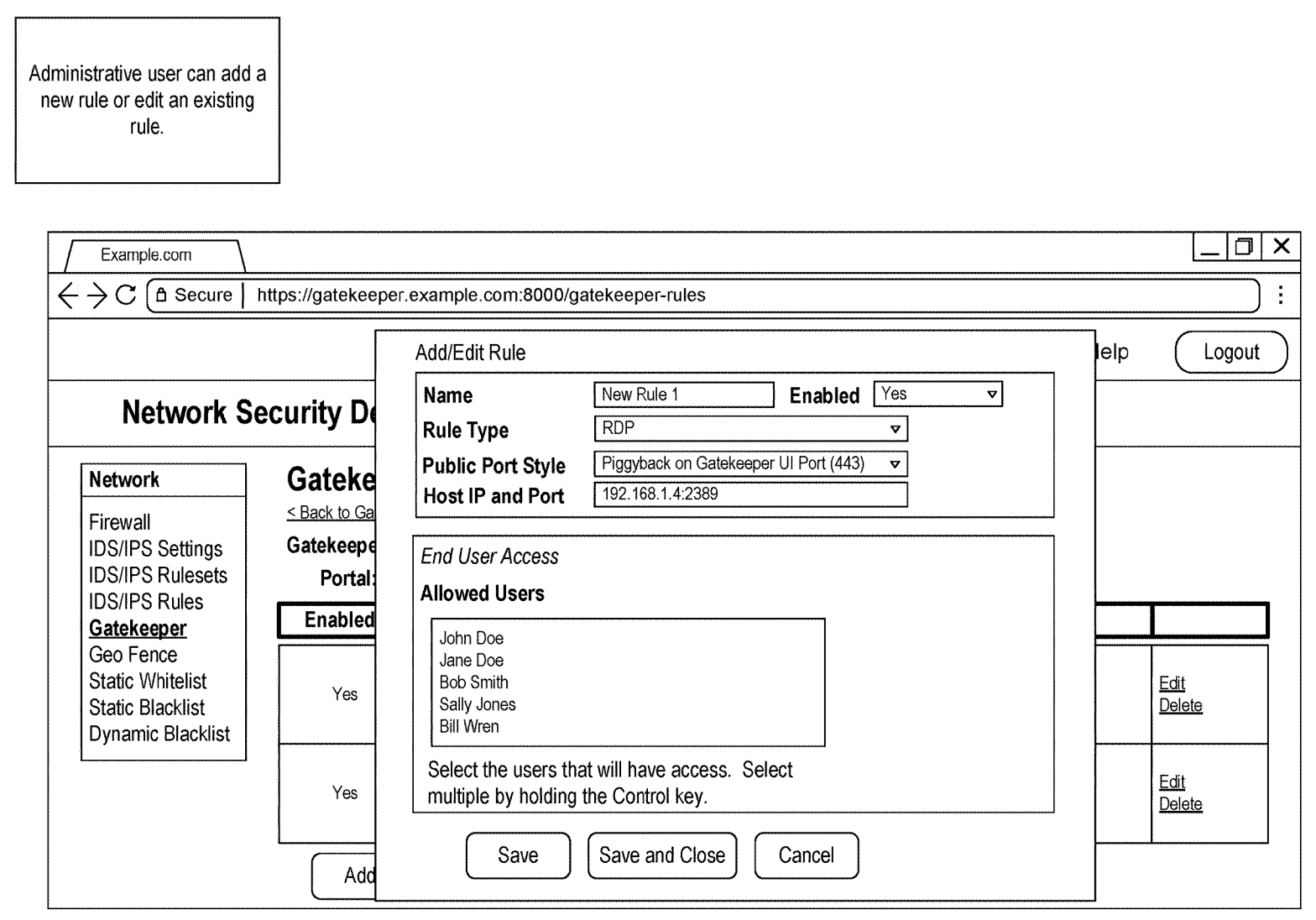
Figure 33:
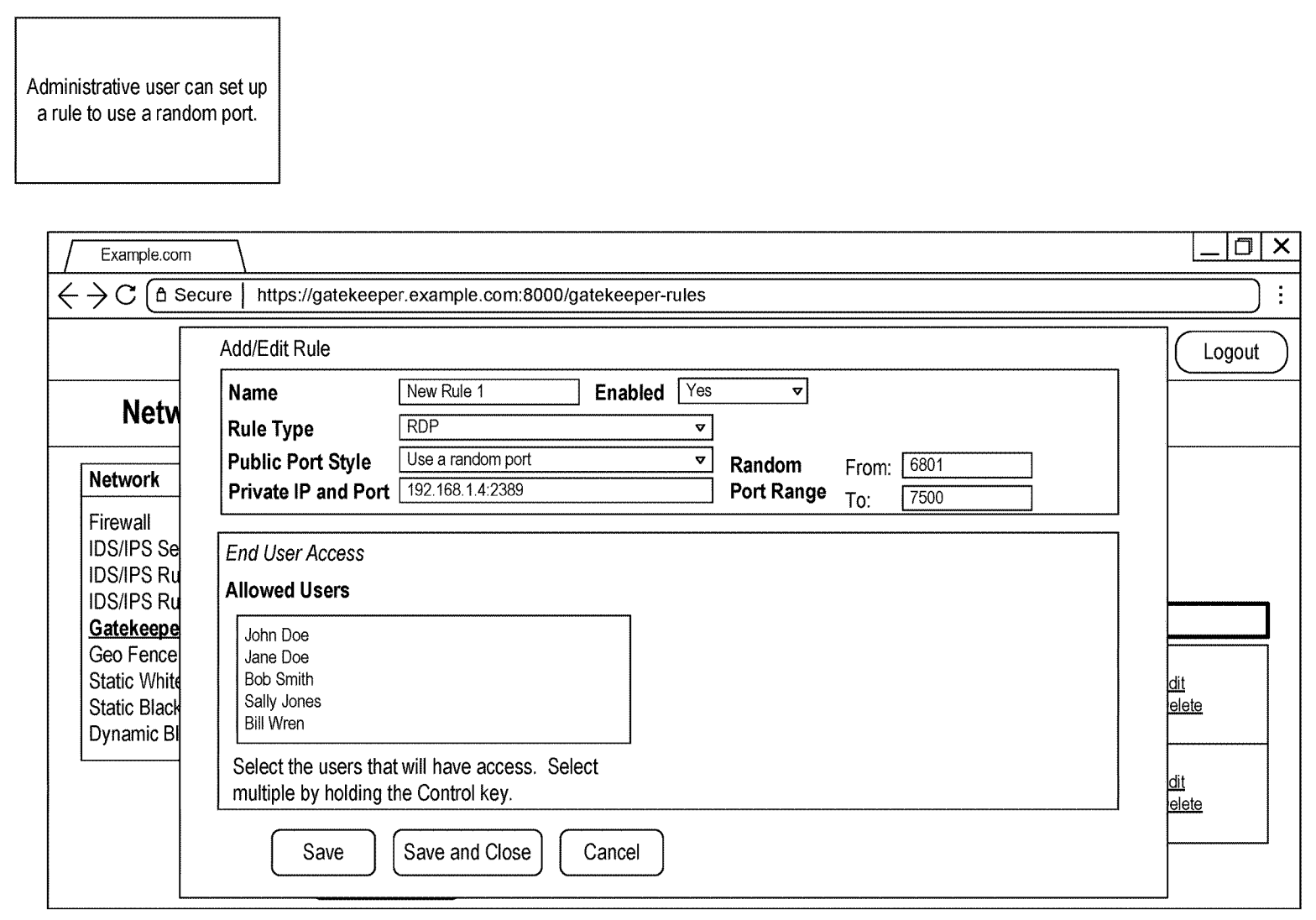

Via the administrative site, an administrative user can edit or delete existing rules for a portal, or add a new rule for a portal. FIG. 30 illustrates an exemplary interface for adding or editing a portal. An administrative user must specify a name for a rule. An administrative user further must specify a public port style for the rule, which can involve piggybacking on a User Interface port for the network security system, as illustrated in FIG. 32, or using a random port within a user-configured range, as illustrated in FIG. 33. If a rule is configured to piggyback on a User Interface port for a network security system (e.g. a User Interface port for the network security device 110), then when an authenticated user selects an available device to connect to (i.e. an available host which represents an available host based on a defined rule for the portal the user has accessed), the connection is to the User Interface port.

If a rule is configured to use a random port, then when an authenticated user selects an available device to connect to (i.e. an available host which represents an available host based on a defined rule for the portal the user has accessed), the connection is to a randomly determined port at the applicable network security device (e.g. the network security device 110).

An administrative user further must specify the IP and port for one or more hosts available to connect to under the rule. An administrative user can enable or disable a rule. Finally, an administrative user must select one or more allowed users for a rule. These are the users allowed to connect, via the network security device system portal under the rule, to the specified one or more hosts.

Figure 34:
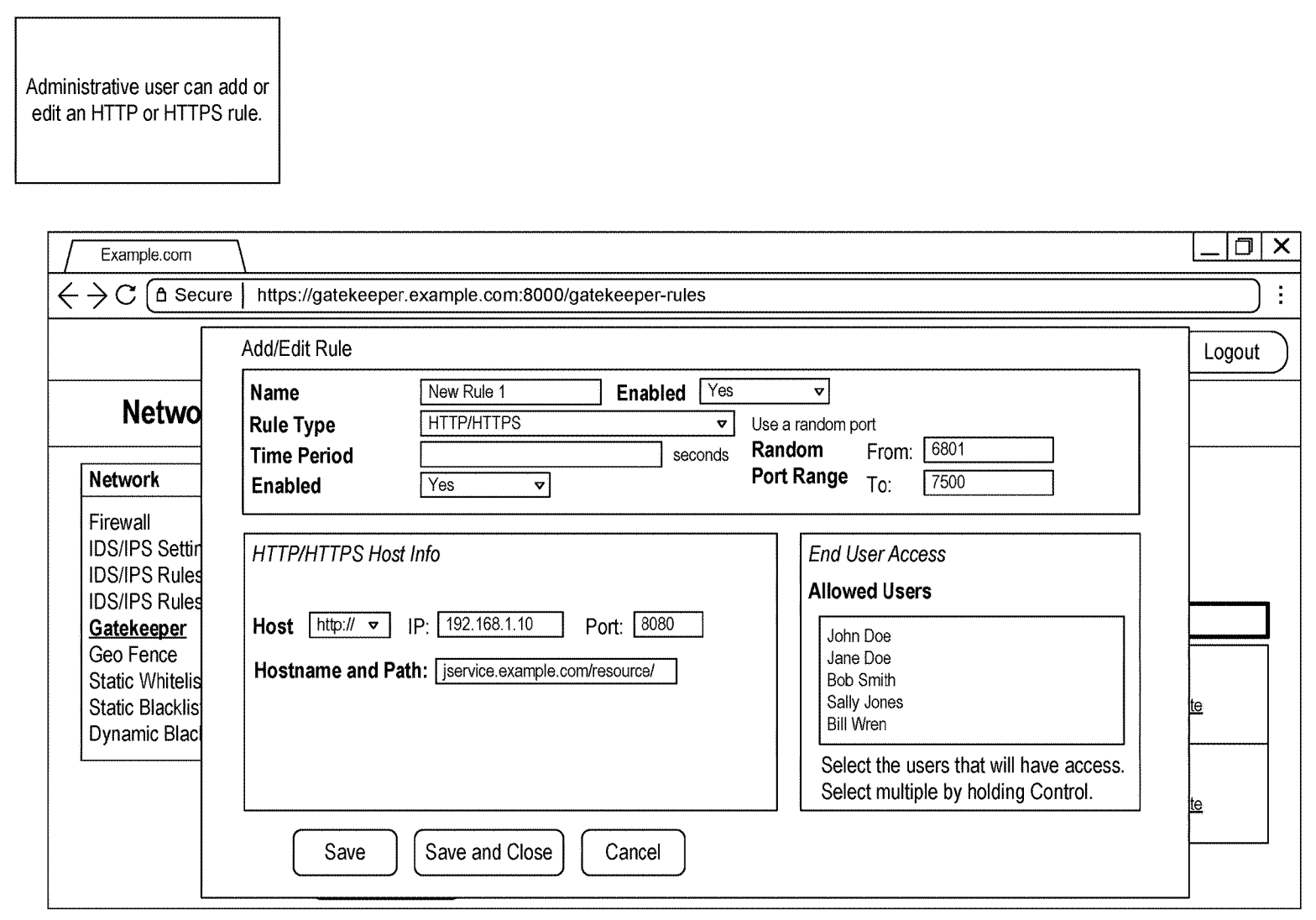

In accordance with one or more preferred implementations, an administrative site may be configured to allow an administrative user to define rules of various types, e.g. an RDP rule type, an HTTP/HTTPS rule type, or an SSH rule type. For example, FIG. 34 illustrates creation of an HTTP/HTTPS rule. An administrative user can specify a host prefix (e.g. http or https), a host IP address, and a host port. An administrative user can further specify a hostname which lets the system render the HTTP/HTTPS host as a http://hostname/path link to a user. In accordance with one or more preferred implementations, an administrative site may be configured to allow a user to define custom rules. In accordance with one or more preferred implementations, a rule type, such as an RDP, HTTP, or SSH rule type, is not necessarily tied to the underlying protocol.

Although thus far largely described as utilizing dynamic, automatically created port forwarding rules in a port forwarding rule table, in accordance with one or more preferred implementations methodologies can be understood as being implemented utilizing dynamic, automatically created firewall rules in a firewall rule table. In accordance with one or more preferred implementations, a network security device includes both firewall rules and port forwarding rules. In accordance with one or more preferred implementations, a network security device is configured such that port forwarding rules effectively function as inbound firewall rules allowing inbound packets matching a port forwarding rule. In accordance with one or more preferred implementations, a port forwarding rule can be characterized as a specific type of firewall rule which provides port forwarding functionality.

In accordance with one or more preferred implementations, a network security device operates to automatically create temporary firewall rules for set up of connections.

In accordance with one or more preferred implementations, a network security device does not include network address translation functionality, but still operates as a firewall blocking all incoming packets that do not match an existing whitelist rule in a whitelist rule table or an existing connection in a state table. In accordance with one or more such preferred implementations, a network security device is configured to automatically create a temporary (e.g. one-time) whitelist rule for set up of a connection.

Although thus far described with reference to creation of a single one-time firewall rule that is automatically deleted after a connection is established, in accordance with one or more preferred implementations a network security device is configured to create multiple one-time firewall rules to support set up of one or more connections. For example, in accordance with one or more preferred implementations configured to facilitate an RDP connection, a network security device is configured to, after successful authentication by a user and selection of a device or resource to connect to, automatically create two one-time firewall rules because RDP may need two sessions to connect when using a self-signed certificate. As another example, in accordance with one or more preferred implementations, a network security device is configured to, after successful authentication by a user and selection of a particular device or resource to connect to, automatically create a plurality (e.g. two to five) one-time firewall rules to support multiple login attempts or handle connection drops (e.g. a failed Active Directory login to the particular device or resource may terminate the initial connection). In accordance with one or more preferred implementations, such rules are removed after a timeout interval has elapsed (e.g. 30 seconds).

Further, although thus far described with reference to a one-time firewall rule that is automatically deleted after a connection is established, in accordance with one or more preferred implementations, a dynamic, temporary, self-deleting firewall rule is utilized which rather than automatically deleting after a connection is established, is instead deleted after a certain amount of time has elapsed. For example, a web browser can pull content from different sources such as getting an image and may need to create additional connections, so a firewall rule which is automatically deleted after a first connection is established may not be sufficient.

Further, in accordance with one or more preferred implementations, a dynamic, temporary, self-deleting firewall rule is utilized which identifies other indicators to confirm a connection such as a JA3 hash plus the source IP address. In accordance with one or more preferred implementations, a dynamic, temporary, self-deleting firewall rule is utilized which uses an application level proxy. In accordance with one or more preferred implementations, a dynamic, temporary, self-deleting firewall rule is utilized which uses a TCP/HTTP/HTTPS proxy. In accordance with one or more preferred implementations, a dynamic, temporary, self-deleting firewall rule is utilized which utilizes a Socks proxy. In accordance with one or more preferred implementations, a dynamic, temporary, self-deleting firewall rule is utilized which uses Web Proxy Auto-Discovery protocol for automatic configuration for a web browser. In accordance with one or more preferred implementations, a dynamic, temporary, self-deleting firewall rule is utilized which uses a web browser extension. In accordance with one or more preferred implementations, a dynamic, temporary, self-deleting firewall rule is utilized which identifies other indicators to confirm a connection such as an RDP/SSH client fingerprint plus the source IP address.

An exemplary implementation has been described herein involving the network security device 110 which provides selective access to devices on a local area network (which is sometimes characterized as an internal network) behind the network security device 110. In accordance with one or more preferred implementations, a network security device providing selective access to devices or resources may be utilized in alternative configurations.

Figure 35:
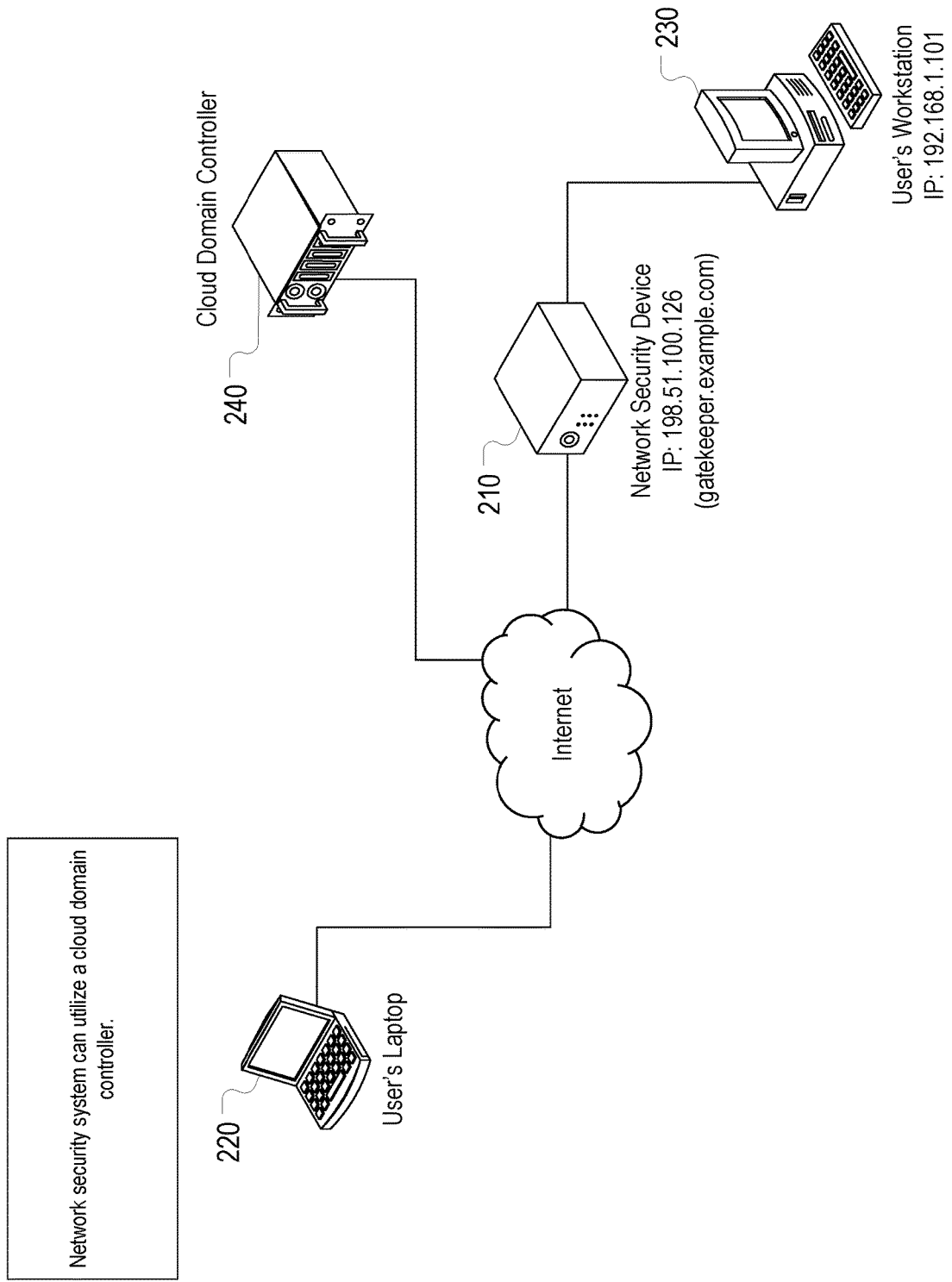
FIGS. 35-40 illustrate alternative implementations and architectures for methodologies and systems utilizing one or more network security devices configured to selectively provide access to resources utilizing dynamic, automatically created temporary firewall rules.

For example, in accordance with one or more preferred implementations, a network security system can utilize a domain controller or other authentication server that is not on a local area network behind a network security device. FIG. 35 illustrates an exemplary such system in which a network security device 210 provides selective access to devices on an internal network, such as the user's workstation 230. However, the system utilizes a cloud domain controller 240.

Figure 36:
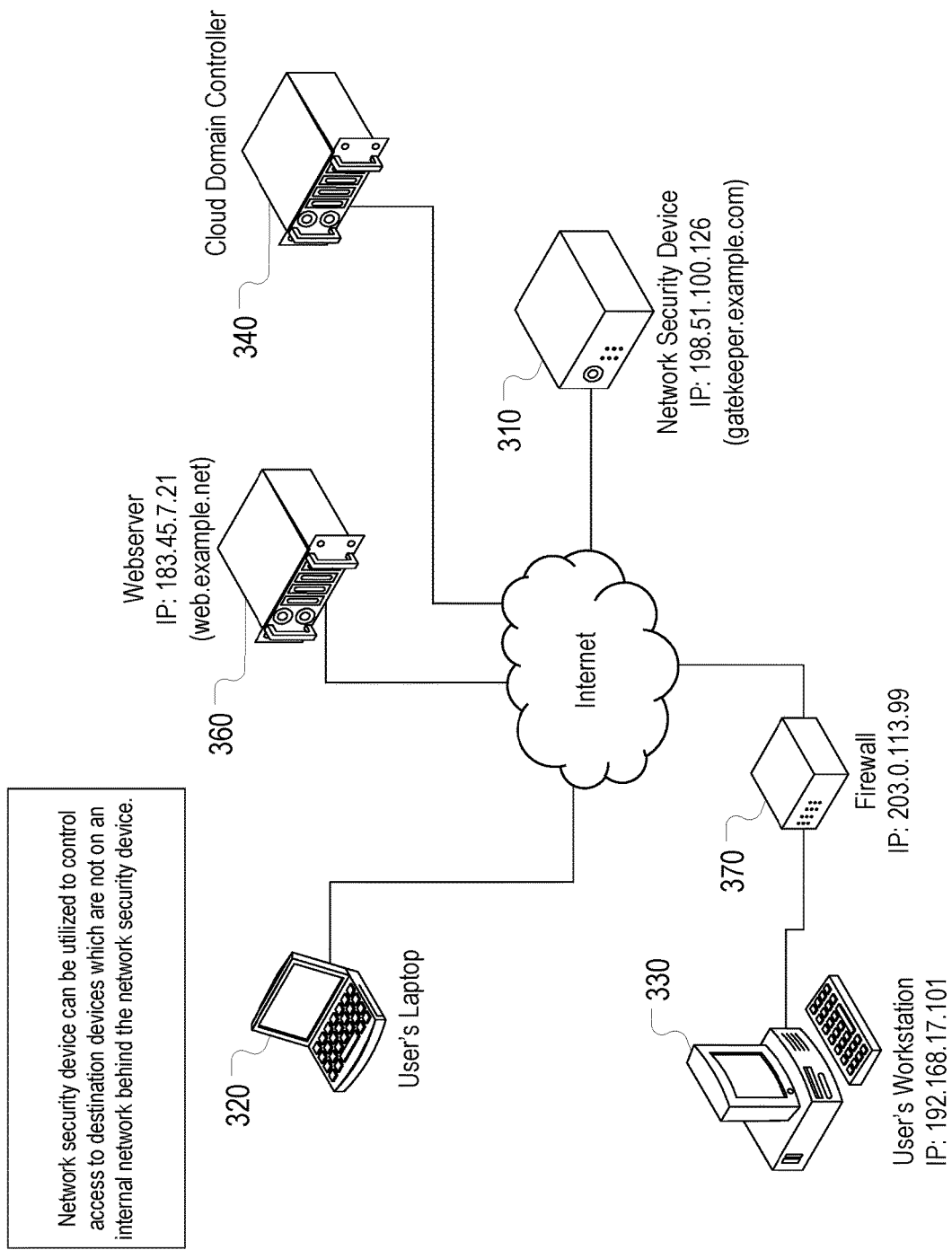

As another example, in accordance with one or more preferred implementations, a network security device can be utilized to control access to destination devices which are not on an internal network behind the network security device. FIG. 36 illustrates an exemplary such system in which a network security device 310 is configured to provide selective access to remote devices, such as the user's workstation 330 which is on another local area network behind a firewall 370, and web server 360. In accordance with one or more preferred implementations, the firewall 370 or web server 360 may be configured to only accept connections or packets from the network security device 310 (e.g. is configured to only accept packets having a source address corresponding to the network security device 310). The system utilizes a cloud domain controller 340. In accordance with one or more preferred implementations, a system utilizes an Azure domain controller.

Figure 37:
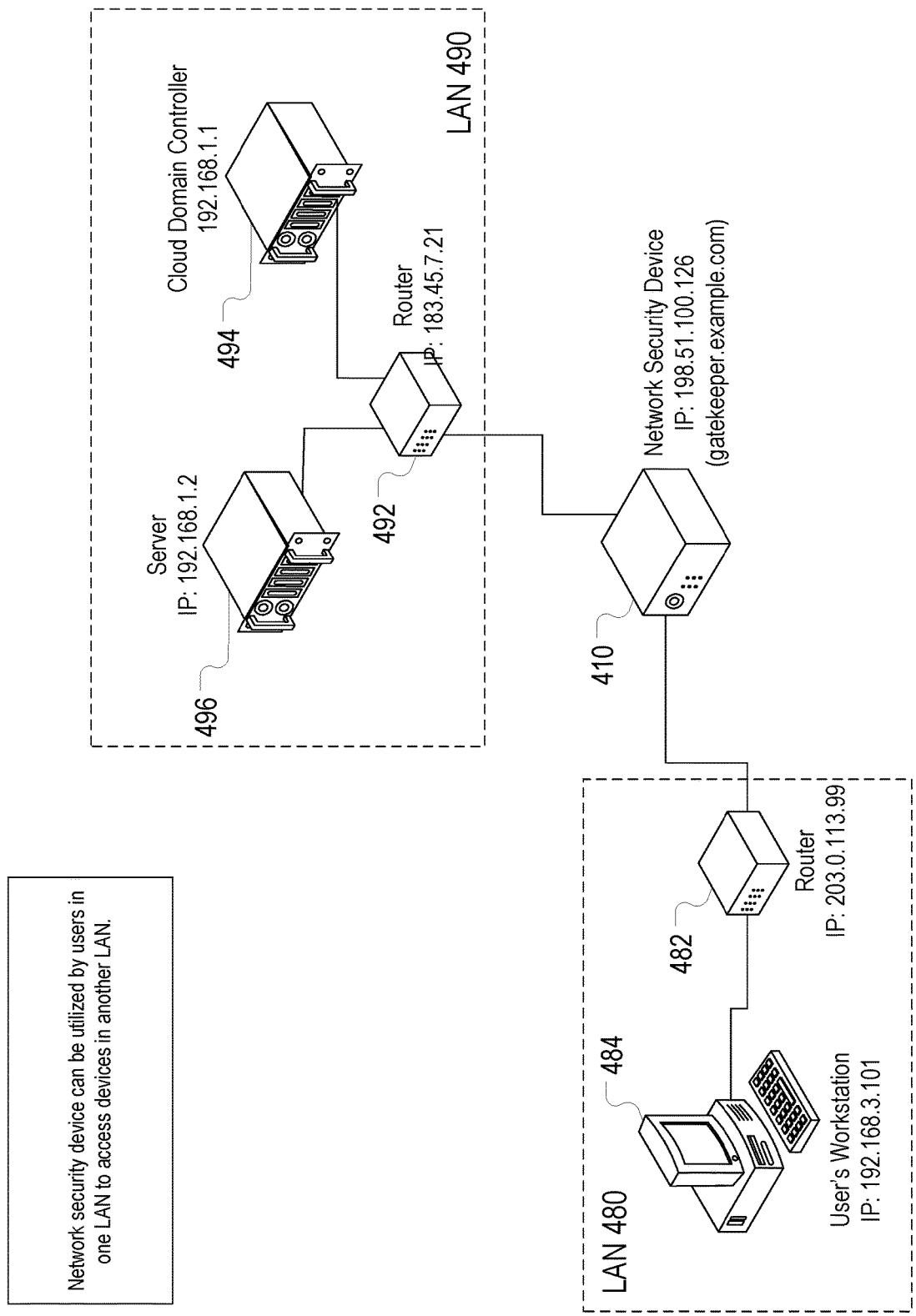

As another example, in accordance with one or more preferred implementations, a network security device is utilized by users in one local area network to access devices in another local area network. FIG. 37 illustrates an exemplary such system in which the network security device 410 is configured to selectively provide access for devices on the local area network 480, such as the user's workstation 484 behind the router 482, to devices on the local area network 490, such as the server 496 behind the router 492. The local area network 490 further includes a domain controller 494 for authentication. In accordance with one or more preferred implementations, a system may be configured such that a network security device provides bidirectional access between local area networks.

Figure 38:
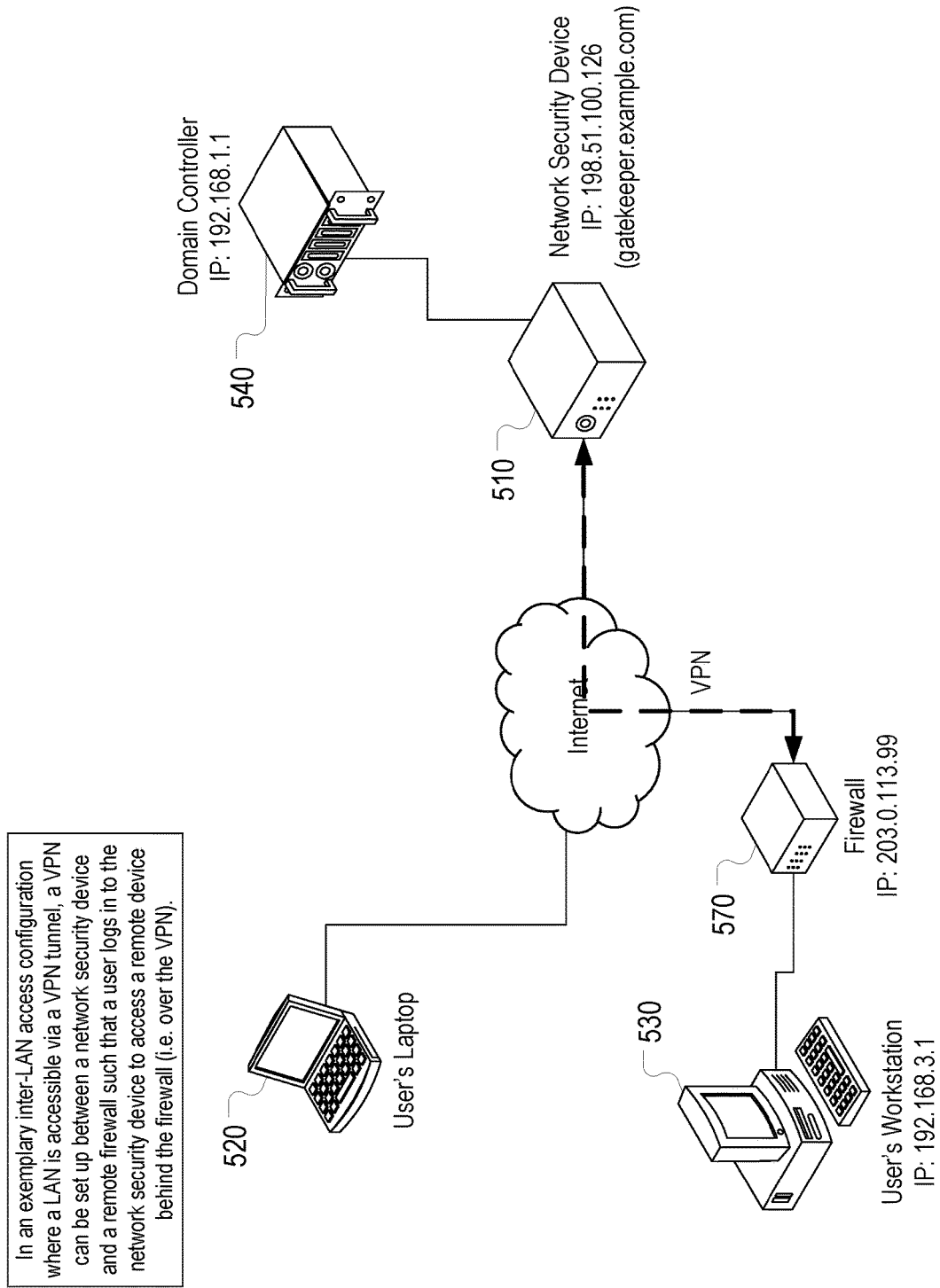

As another example, in accordance with one or more preferred implementations, a VPN can be set up between a network security device and a remote firewall such that a user logs in to the network security device to access a remote device behind the firewall (i.e. over the VPN). For example, FIG. 38 illustrates an exemplary such system in which the network security device 510 is configured to selectively provide access to devices on a local area network behind a firewall 570, such as the user's workstation 570. A remote user can use a device such as the user's laptop 520 to connect to the network security device 510, in order to access the user's workstation 530. The user must first authenticate with the network security device 510, which performs authentication utilizing the domain controller 540 and second factor authentication, at which point communications can be effected over the IPsec VPN set up between the network security device 510 and the user's workstation 530.

As another example, in accordance with one or more preferred implementations, an identity manager can be set up to manage second factor authentication (e.g. storage of secrets and generation of verification codes). The identity manager may communicate only with one or more network security devices (e.g. push user account information and second factor authentication information to a network security device), or may at times communicate directly with a user device, e.g. to set up second factor authentication or to authenticate. The identity manager may provide general authentication services based on a user name and password, or domain controller functionality, or may be utilized in combination with a domain controller.

Figure 39:
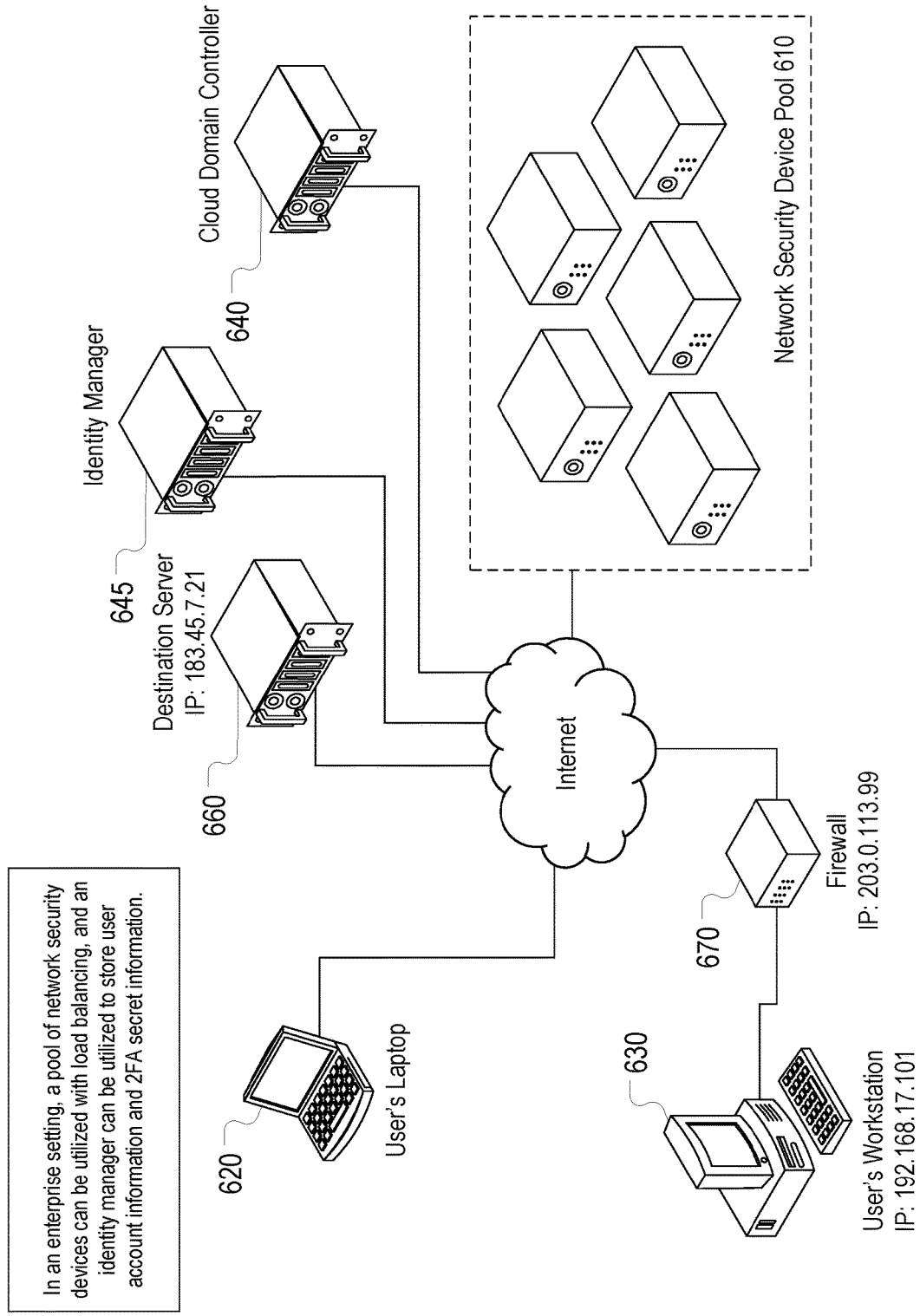

As another example, in accordance with one or more preferred implementations, a pool of network security devices is utilized in an enterprise setting to load balance access or connections for a large number of users. FIG. 39 illustrates an exemplary such system in which the pool of network security devices 610 is utilized to load balance provision of selective access to remote devices, such as the user's workstation 630 which is on another local area network behind a firewall 670, and destination server 660. In accordance with one or more preferred implementations, the firewall 670 or destination server 660 may be configured to only accept connections or packets from one of the network security devices in the pool 610 (e.g. is configured to only accept packets having a source address corresponding to one of the network security devices in the pool 610). The system utilizes a cloud domain controller 340, and a cloud identity manager 645.

Overall, a network security device can be utilized, inter alia, to selectively provide access to: a device or resource on a local area network behind the network security device, a device or resource on a different local area network behind a router or firewall, or a public facing device or resource (e.g. a device or resource that can be accessed over the Internet). In accordance with one or more preferred implementations, a device or resource, or a firewall or router which the device or resource is behind, is configured to accept connections from the network security device, optionally exclusively.

Figure 40:
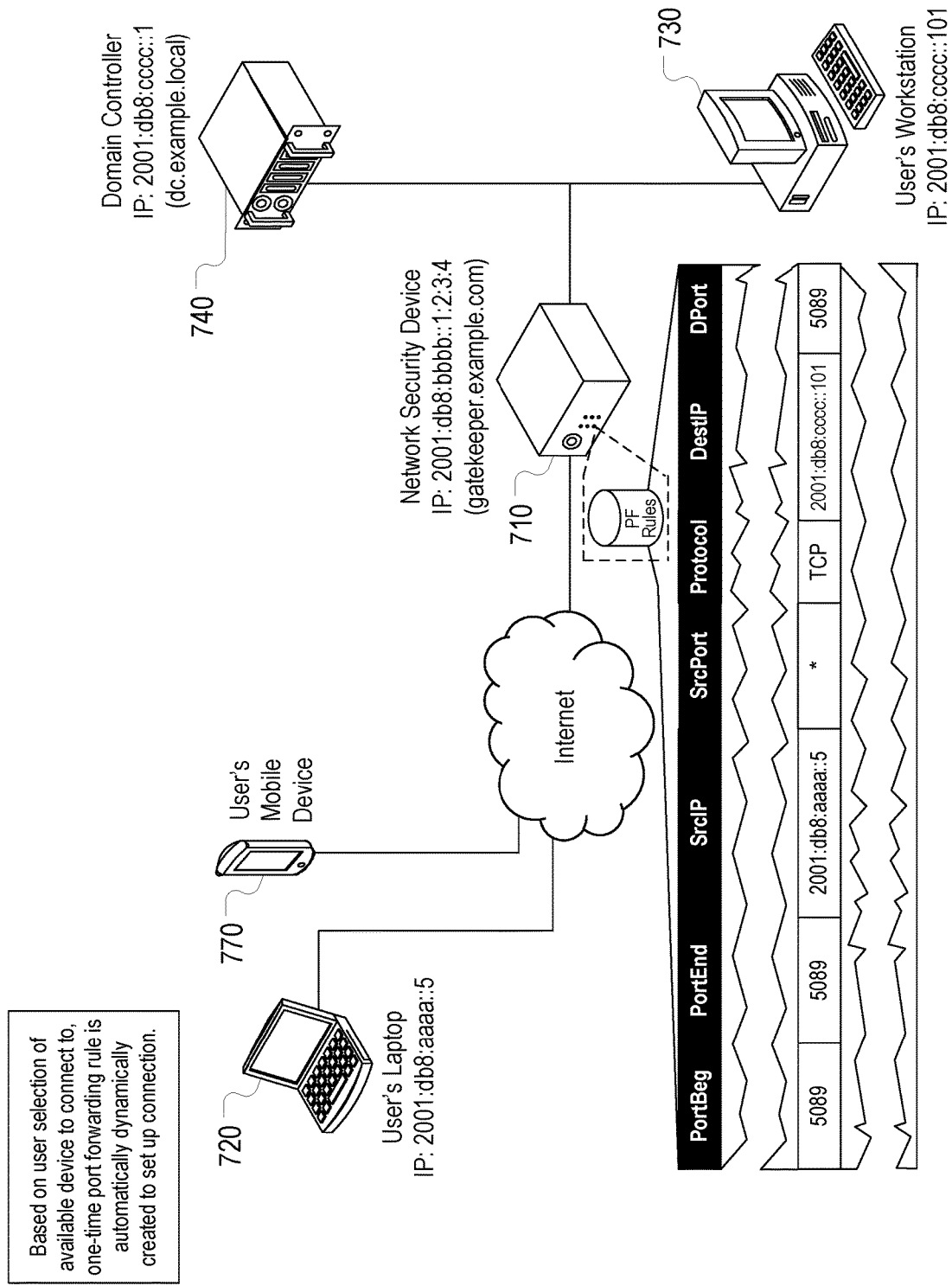

Although largely described herein in the context of use with IPv4 addressing schemes, in accordance with one or more preferred implementations, a methodology is utilized which involves use of an IPv6 addressing scheme. It will be appreciated that use of an IPv6 addressing scheme generally obviates the need for network address translation, although such may still be utilized in accordance with one or more preferred implementations. FIG. 40 illustrates an exemplary IPv6 implementation in which a network security device 710 provides selective access to devices on an internal network, such as the user's workstation 730, utilizing a domain controller 740 and second factor authentication based on a shared secret stored at the user's mobile device 770 and the network security device 710 (or an identity manager or the domain controller 740). An IPv6 implementation can be implemented with a network security device providing NAT or without providing NAT.

In accordance with one or more preferred implementations, a network security device is utilized to selectively provide access to, by way of non-limiting example, a user's workstation, a digital video recorder, a video camera, a system controller (e.g. HVAC, irrigation, security, etc.), a database server, a QuickBooks server, a Sharepoint server, a file server, an application server, a backup server, a Microsoft Exchange/OWA/Remote Web Workplace, or a supervisory control and data acquisition (SCADA) system (e.g. water system, solar panel energy device, etc.).

In accordance with one or more preferred implementations, a network security device is configured to selectively provide access to network attached storage (NAS). In accordance with one or more preferred implementations, a network security device is configured to selectively provide access to a network attached server or other network attached storage device that operates as a file server. In accordance with one or more preferred implementations, a network attached server or device operates as an identity provider, e.g. as a lightweight directory access protocol (LDAP) server.

In accordance with one or more preferred implementations, a network security device is configured to selectively provide access to a wireless controller, e.g. a UniFi controller available from Ubiquity Networks.

Although largely described herein as involving a user utilizing a web browser to access a network security system portal, in accordance with one or more preferred implementations a user utilizes an app custom client, a web manifest, or a progressive web application. In accordance with one or more preferred implementations, a user utilizes a third-party client that makes use of a published API on a network security device, or a textual interface accessed over an SSH connection. Additional authentication methods, native to the given interface medium (e.g. SSH public key authentication), may also be used along with those interfaces, providing additional layers of security.

In general, in accordance with one or more preferred implementations, to access a network security system portal, a user may utilize any hardware and/or software that can function as an API client. These alternatives to VPN software reduce complexity and, in some cases, can reduce software maintenance and related vulnerabilities.

Although largely described herein with the exemplary use of Active Directory credentials, in accordance with one or more preferred implementations, authentication may be performed with any suitable architecture and protocol, such as use of a Lightweight Directory Access Protocol (LDAP) server or other identity service.

Although largely described herein with the use of a second factor authentication app loaded on a mobile device, in accordance with one or more preferred implementations second factor authentication may be performed utilizing other software or hardware such as a desktop application or a specially configured hardware device for displaying a continually updated verification code. In accordance with one or more preferred implementations, a second factor authentication methodology may involve communication of a verification code to a registered phone number in text, or to a registered email address in an email.

In accordance with one or more preferred implementations, a network security device is utilized to facilitate an RDP connection to a remote device. In accordance with one or more preferred implementations, a network security device is utilized to facilitate HTTPS, HTTP, or Telnet communications.

Although second factor authentication is largely described herein in the context of a time based one-time password algorithm (TOTP), in accordance with one or more preferred implementations, hash-based message authentication codes (HMAC) may be utilized with a HMAC-based one-time password algorithm (HOTP).

Although generally described herein in the context of two-factor authentication, in accordance with one or more preferred implementations, a methodology and system may utilize multi-factor authentication (MFA) involving more than two factors.

In accordance with one or more preferred implementations, a physical security token, such as a Yubikey, can be utilized to authenticate a user via a physical (e.g. USB) or wireless (e.g. Bluetooth or NFC) connection.

In accordance with one or more preferred implementations, rules may be configured for limiting access to a particular portal, device, or interface. In accordance with one or more preferred implementations, rules may be configured which limit access to a particular date/time (e.g. a particular time of day, a particular day of the week, etc.). In accordance with one or more preferred implementations, rules may be configured which limit access based on a source network address (e.g. utilizing a whitelist of allowed network addresses and/or a blacklist of disallowed network addresses). In accordance with one or more preferred implementations, rules may be configured which limit access based on a device or network address location (e.g. source country).

In accordance with one or more preferred implementations, rules may be configured with whitelists and/or blacklists. In accordance with one or more preferred implementations, rules may be configured with wildcards.

In accordance with one or more preferred implementations, a network security device is a virtual machine or appliance.

In accordance with one or more preferred implementations, a network security device is external facing (e.g. accessible over the Internet at an IP address and/or web address). In accordance with one or more preferred implementations, a network security device is internal (e.g. on a local area network that is behind a firewall). In accordance with one or more preferred implementations, a network security device is hosted externally (e.g. is hosted in the cloud or at a remote site). In accordance with one or more preferred implementations, a network security device operates from local area network to local area network. In accordance with one or more preferred implementations, a network security device operates from or for a connection across the Internet. In accordance with one or more preferred implementations, a network security device operates from within a corporate network into a secure zone for control systems, etc.

Many implementations discussed herein utilize a domain controller for identity services. In accordance with one or more preferred implementations, another identity provider may be utilized. In accordance with one or more preferred implementations, an identity provider serves to define user names and passwords.

In accordance with one or more preferred implementations, an independent lightweight directory access protocol (LDAP) server may function as an identity provider.

In accordance with one or more preferred implementations, identity provider functionality may be provided by, or reside on, a network security device.

In accordance with one or more preferred implementations, a network security system may be configured to provide additional security based on source IP address information. In accordance with one or more preferred implementations, a network security system may be configured to provide geofencing based on a source IP address of incoming communications, and only allow connections from specified areas (e.g. IPs associated with a specified country, city, or region), or and/or deny connections from specified areas (e.g. IPs associated with a specified country, city, or region). In accordance with one or more preferred implementations, a network security system may be configured to provide association fencing based on a source IP address of incoming communications, and only allow connections from specified associations (e.g. IPs associated with a specified association, or and/or deny connections from specified associations (e.g. IPs associated with a specified association). In accordance with one or more preferred implementations, a network security system may be configured to provide additional security based on a source IP address of incoming communications, and block connections from suspicious IP addresses (e.g. IPs that are on a list of suspicious IP addresses provided by the system or another system). In accordance with one or more preferred implementations, a network security system may allow users to configure an individual portal to provide such security and fencing functionality.

In accordance with one or more preferred implementations, a device manager is utilized which comprises a list or database of approved devices, with the list or database being utilized to only allow access to the approved devices. In accordance with one or more preferred implementations, a host-based certificate, MAC address, or other identification system is utilized to identify or authenticate approved devices.

In accordance with one or more preferred implementations, an identity provider enables assignment of users into configurable groups and roles, with a network security device and/or portals being configurable to only allow access to configured combinations of user, group, and role (e.g. only allow access to users in the group "ACME" and the role "Administrator").

In accordance with one or more preferred implementations, a network aware network security device is configured to utilize network information to dynamically create rules. In accordance with one or more preferred implementations, a network security device which can be utilized to control access to a destination device is configured to utilize network information to determine how to reach the device in a current network topology, e.g. match an end point or approved destination device with a current IP address assigned in accordance with a dynamic host configuration protocol (DHCP). This may be accomplished based on DHCP information, a machine name, a MAC address, etc. In accordance with one or more preferred implementations, a network security device is configured to allow for configuration of destination rules regarding destination devices that are accessible to a user, group, role, or some combination thereof, etc. For example, destination devices may be identified by a MAC address or other identifier. In accordance with one or more preferred implementations, a methodology for such a configured network security device involves querying an internal local domain name server or DHCP server that provides name resolution to resolve to an IP, and then creating a dynamic rule on the fly for a connection.

Overall, in accordance with one or more preferred implementations, an administrative site allows an administrative user to configure network security system portals for use in enabling automatic creation of one or more dynamic, temporary, self-deleting firewall rules for an authorized user's current IP address following two factor authentication of the authorized user. Such one or more dynamic, temporary, self-deleting firewall rules may be utilized to set up one or more connections before being removed or expiring, preventing any attacker from subsequently taking advantage of them. Such a methodology is advantageous as compared to conventional port forwarding in that it is much more secure. Such a methodology is advantageous as compared to traditional port forwarding with access control both in that a user does not always have to utilize the same device with a static IP address, and in that the firewall rule representing a potential vulnerability is deleted after a connection is established.

Based on the foregoing description, it will be readily understood by those persons skilled in the art that the invention has broad utility and application. Many embodiments and adaptations of the invention other than those specifically described herein, as well as many variations, modifications, and equivalent arrangements, will be apparent from or reasonably suggested by the invention and the foregoing descriptions thereof, without departing from the substance or scope of the invention. Accordingly, while the invention has been described herein in detail in relation to one or more preferred embodiments, it is to be understood that this disclosure is only illustrative and exemplary of the invention and is made merely for the purpose of providing a full and enabling disclosure of the invention. The foregoing disclosure is not intended to be construed to limit the invention or otherwise exclude any such other embodiments, adaptations, variations, modifications or equivalent arrangements, the invention being limited only by the claims appended hereto and the equivalents thereof.

What is claimed is:

1. A method providing a technical solution to the technical problem of providing authenticated remote access to an electronic device on an internal network in a manner which obviates the ability of attackers to gain access via an exposed port, the method comprising:
   (a) effecting display, to a user who has utilized a web browser loaded on a first device remote from the internal network to navigate to a uniform resource locator corresponding to a network security system portal implemented at a network security system device providing selective access to the internal network, of a login page prompting the user to input first authentication credentials to authenticate, the first authentication credentials comprising a user name and password;
   (b) receiving, at the network security device, data corresponding to input by the user at the first device representing an attempt to provide the first authentication credentials;
   (c) authenticating, based on communication with a domain controller of the internal network, that the input by the user at the first device representing an attempt to provide the first authentication credentials matches valid authentication credentials;
   (d) effecting display, to the user in the web browser loaded on the first device, of a second factor authentication interface prompting the user to input a second factor authentication verification code;
   (e) receiving, at the network security device, data corresponding to input by the user at the first device representing an attempt to provide the second factor authentication verification code;
   (f) authenticating the user to the network security system portal based on the received data corresponding to input representing an attempt to provide the second factor authentication verification code by validating that such input is the correct second factor authentication verification code, the second factor authentication verification code having been generated at a mobile device of the user based on a stored second factor authentication secret;
   (g) after authenticating the user,
      (i) determining one or more network security system rules for the network security system portal for which the user is an allowed user,
      (ii) determining one or more available hosts associated with the determined one or more security system rules,
      (iii) effecting display, to the user in the web browser loaded on the first device, of an interface of the network security system portal providing a list of devices available to be connected to, each listed device corresponding to one of the determined one or more available hosts,
      (iv) receiving, at the network security device, data corresponding to input by the user at the first device representing a selection of a particular listed available device;
   (h) based on user selection of the available device, automatically creating a one-time port forwarding rule to set up a transmission control protocol (TCP) connection between the first device and the selected particular device, the one time port forwarding rule being defined to forward packets received at the network security device at a particular port determined based on the respective rule for the available host representing the selected particular device, and the one time port forwarding rule being defined to forward such packets to the IP address and port specified in the respective rule for the available host representing the selected particular device;
   (i) receiving, at the network security device, an initial SYN packet sent by the first device to the network security device at the particular port to set up the TCP connection between the first device and the particular device;
   (j) based on the one-time port forwarding rule, updating one or more destination fields of the received SYN packet to be the IP address and port specified in the respective rule for the available host representing the selected particular device, and forwarding the received SYN packet to the particular device;
   (k) adding, by the network security device to a state table, connection information for the received SYN packet, the connection information including an indication that the connection has not yet been established;
   (l) receiving, at the network security device, a response SYN-ACK packet sent by the particular device representing a second step of a three-step handshake to set up the TCP connection between the first device and the particular device;
   (m) updating one or more source fields of the SYN-ACK packet to specify the IP address of the network security device as the source IP address and the particular port as the source port, and forwarding the SYN-ACK packet to the first device;
   (n) receiving, at the network security device, a response ACK packet sent by the first device representing a third step of a three-step handshake completing set up of the TCP connection between the first device and the particular device;
   (o) updating one or more destination fields of the received ACK packet to be the IP address and port specified in the respective rule for the available host representing the selected particular device, and forwarding the received ACK packet to the particular device;
   (p) updating, by the network security device, connection information in its state table for the TCP connection by replacing the indication that the connection has not yet been established with an indication that the TCP connection is established;
   (q) based on determining that the TCP connection has been established, automatically deleting the one-time port forwarding rule; and
   (r) thereafter, upon receiving a subsequent packet at the network security device addressed to the particular port from the first device, determining that the subsequent packet belongs to the TCP connection for which connection information exists in the state table, and based thereon updating one or more destination fields of the received subsequent packet to be the IP address and port specified for the connection in the state table, and forwarding the received subsequent packet to the particular device;

(s) whereby, automatic creation of a dynamic one-time port forwarding rule for an authorized user's current IP address following two factor authentication of the authorized user is provided which enables authenticated remote access to an electronic device on an internal network in a manner which obviates the ability of attackers to gain access via an exposed port.

2. The method of claim 1, wherein the second factor authentication verification code was generated at a mobile device of the user utilizing an algorithm of a second factor authentication app, the algorithm continually generating second factor authentication codes based on a current time and the second factor authentication secret.

3. The method of claim 1, wherein the stored second factor authentication secret is based on a previously captured second factor authentication secret captured at the mobile device of the user.

4. The method of claim 1, wherein the stored second factor authentication secret is based on a previously captured QR code representing a second factor authentication secret captured at the mobile device of the user utilizing a camera of the mobile device, the QR code having been displayed on the first device after being received from the network security device.

5. The method of claim 1, wherein the stored second factor authentication secret is based on a previously input text code representing a second factor authentication secret captured at the mobile device, the text code having been displayed on the first device after being received from the network security device.

6. The method of claim 1, wherein the stored second factor authentication secret was received at the mobile device from a second factor authentication server as a part of communications initiated by scanning a QR code displayed on the first device after being received from the network security device.

7. The method of claim 1, wherein authenticating the user to the network security system portal based on the received data corresponding to input representing an attempt to provide the second factor authentication verification code by validating that such input is the correct second factor authentication verification code comprises communicating, by the network security device, with a second factor authentication server.

8. The method of claim 1, wherein the method comprises communicating a remote desktop protocol (RDP) file to the first device for establishing an RDP connection between the first device and the particular device.

9. The method of claim 1, wherein the first authentication credentials represent Active Directory credentials.

10. The method of claim 1, wherein authenticating, based on communication with a domain controller of the internal network, that the input by the user at the first device representing an attempt to provide the first authentication credentials matches valid authentication credentials comprises communicating data representing the input by the user from the network security device to the domain controller and receiving back at the network security device from the domain controller an indication of authentication.

11. The method of claim 1, wherein automatically creating a one-time port forwarding rule to set up a transmission control protocol (TCP) connection between the first device and the selected particular device comprises automatically creating a plurality of port forwarding rules to set up one or more transmission control protocol (TCP) connections between the first device and the selected particular device.

12. The method of claim 1, wherein the particular device comprises a camera.

13. The method of claim 1, wherein the particular device comprises a digital video recorder.

14. The method of claim 1, wherein the particular device comprises an irrigation controller.

15. The method of claim 1, wherein the particular device comprises a Sharepoint server.

16. The method of claim 1, wherein the particular device comprises a remote web workplace.

17. The method of claim 1, wherein the particular device comprises a water system.

18. The method of claim 1, wherein the particular device comprises a solar panel energy device.

19. A method providing a technical solution to the technical problem of providing authenticated remote access to an electronic device on an internal network in a manner which obviates the ability of attackers to gain access via an exposed port, the method comprising:

(a) effecting display, to a user who has utilized a web browser loaded on a first device remote from the internal network to navigate to a uniform resource locator corresponding to a network security system portal implemented at a network security system device providing selective access to the internal network, of a login page prompting the user to input first authentication credentials to authenticate, the first authentication credentials comprising a user name and password;

(b) receiving, at the network security device, data corresponding to input by the user at the first device representing an attempt to provide the first authentication credentials;

(c) authenticating, based on communication with a domain controller of the internal network, that the input by the user at the first device representing an attempt to provide the first authentication credentials matches valid authentication credentials;

(d) effecting display, to the user in the web browser loaded on the first device, of a second factor authentication interface prompting the user to input a second factor authentication verification code;

(e) receiving, at the network security device, data corresponding to input by the user at the first device representing an attempt to provide the second factor authentication verification code;

(f) authenticating the user to the network security system portal based on the received data corresponding to input representing an attempt to provide the second factor authentication verification code by validating that such input is the correct second factor authentication verification code, the second factor authentication verification code having been generated at a mobile device of the user based on a stored second factor authentication secret;

(g) after authenticating the user,
   (i) determining one or more network security system rules for the network security system portal for which the user is an allowed user,
   (ii) determining one or more available hosts associated with the determined one or more security system rules, (iii) effecting display, to the user in the web browser loaded on the first device, of an interface of the network security system portal providing a list of devices available to be connected to, each listed device corresponding to one of the determined one or more available hosts, (iv) receiving, at the network security device, data corresponding to input by the user at the first device representing a selection of a particular listed available device;

(h) based on user selection of the available device, automatically creating a one-time port forwarding rule to set up a connection between the first device and the selected particular device, the one-time port forwarding rule being defined to forward packets received at the network security device at a particular port determined based on the respective rule for the available host representing the selected particular device, and the one time port forwarding rule being defined to forward such packets to the IP address and port specified in the respective rule for the available host representing the selected particular device;

(i) receiving, at the network security device, an initial packet sent by the first device to the network security device at the particular port to set up the connection between the first device and the particular device;

(j) based on the one-time port forwarding rule, updating one or more destination fields of the received initial packet to be the IP address and port specified in the respective rule for the available host representing the selected particular device, and forwarding the received initial packet to the particular device;

(k) adding, by the network security device to a state table, connection information for the received initial packet, the connection information including an indication that the connection has been established;

(l) based on determining that the connection has been established, automatically deleting the one-time port forwarding rule; and (m) thereafter, upon receiving a subsequent packet at the network security device addressed to the particular port from the first device, determining that the subsequent packet belongs to the connection for which connection information exists in the state table, and based thereon updating one or more destination fields of the received subsequent packet to be the IP address and port specified for the connection in the state table, and forwarding the received subsequent packet to the particular device;

(n) whereby, automatic creation of a dynamic one-time port forwarding rule for an authorized user's current IP address following two factor authentication of the authorized user is provided which enables authenticated remote access to an electronic device on an internal network in a manner which obviates the ability of attackers to gain access via an exposed port.

20. A method providing a technical solution to the technical problem of providing authenticated remote access to a remote electronic device in a manner which obviates the ability of attackers to gain access, the method comprising:

(a) effecting display, to a user who has utilized a web browser loaded on a first device remote from the internal network to navigate to a uniform resource locator corresponding to a network security system portal implemented at a network security system device providing selective access to one or more remote electronic resources, of a login page prompting the user to input first authentication credentials to authenticate, the first authentication credentials comprising a user name and password;

(b) receiving, at the network security device, data corresponding to input by the user at the first device representing an attempt to provide the first authentication credentials;

(c) authenticating, based on communication with a domain controller of the internal network, that the input by the user at the first device representing an attempt to provide the first authentication credentials matches valid authentication credentials;

(d) effecting display, to the user in the web browser loaded on the first device, of a second factor authentication interface prompting the user to input a second factor authentication verification code;

(e) receiving, at the network security device, data corresponding to input by the user at the first device representing an attempt to provide the second factor authentication verification code;

(f) authenticating the user to the network security system portal based on the received data corresponding to input representing an attempt to provide the second factor authentication verification code by validating that such input is the correct second factor authentication verification code, the second factor authentication verification code having been generated at a mobile device of the user based on a stored second factor authentication secret;

(g) after authenticating the user,
  (i) determining one or more network security system rules for the network security system portal for which the user is an allowed user,
  (ii) determining one or more available hosts associated with the determined one or more security system rules,
  (iii) effecting display, to the user in the web browser loaded on the first device, of an interface of the network security system portal providing a list of devices available to be connected to, each listed device corresponding to one of the determined one or more available hosts,
  (iv) receiving, at the network security device, data corresponding to input by the user at the first device representing a selection of a particular listed available device;

(h) based on user selection of the available device, automatically creating a one-time firewall rule to set up a transmission control protocol (TCP) connection between the first device and the selected particular device, the one-time firewall rule being defined to allow packets received at the network security device addressed to the selected particular device at a particular port determined based on the respective rule for the available host representing the selected particular device;

(i) receiving, at the network security device, an initial SYN packet sent by the first device addressed to the particular device at the particular port to set up the TCP connection between the first device and the particular device;

(j) based on the one-time port firewall rule, allowing the received SYN packet to pass through on its way to the particular device;

(k) adding, by the network security device to a state table, connection information for the received SYN packet, the connection information including an indication that the connection has not yet been established;
(l) receiving, at the network security device, a response SYN-ACK packet sent by the particular device representing a second step of a three-step handshake to set up the TCP connection between the first device and the particular device;
(m) allowing the received SYN-ACK packet to pass through on its way to the first device;
(n) receiving, at the network security device, a response ACK packet sent by the first device representing a third step of a three-step handshake completing set up of the TCP connection between the first device and the particular device;
(o) allowing the received ACK packet to pass through on its way to the particular device;
(p) updating, by the network security device, connection information in its state table for the TCP connection by replacing the indication that the connection has not yet been established with an indication that the TCP connection is established;
(q) based on determining that the TCP connection has been established, automatically deleting the one-time port forwarding rule; and
(r) thereafter, upon receiving a subsequent packet at the network security device addressed to the particular device at the particular port from the first device, determining that the subsequent packet belongs to the TCP connection for which connection information exists in the state table, and based thereon allowing the received subsequent packet to pass through on its way to the particular device;
(s) whereby, automatic creation of a dynamic one-time firewall rule for an authorized user's current IP address following two factor authentication of the authorized user is provided which enables authenticated remote access to a remote electronic device in a manner which obviates the ability of attackers to gain access via an exposed port.

* * * * *